(12) United States Patent
Brady

(10) Patent No.: US 11,413,668 B2
(45) Date of Patent: Aug. 16, 2022

(54) SINTERED WAVE MULTI-MEDIA POLARITY CONVERSION TREATMENT APPARATUS AND PROCESS FOR NONDESTRUCTIVE REMOVAL AND CONDENSATION OF PER- AND POLYFLUOROALKYL SUBSTANCES (PFAS) AND OTHER DANGEROUS COMPOUNDS

(71) Applicant: Ezraterra, LLC, Sisters, OR (US)

(72) Inventor: Patrick Richard Brady, Sisters, OR (US)

(73) Assignee: EZRATERRA, LLC, Bend, OR (US)

( * ) Notice: Subject to any disclaimer, the term of this patent is extended or adjusted under 35 U.S.C. 154(b) by 125 days.

(21) Appl. No.: 16/788,650

(22) Filed: Feb. 12, 2020

(65) Prior Publication Data
US 2020/0206793 A1 Jul. 2, 2020

(51) Int. Cl.
*B09C 1/08* (2006.01)
*C02F 1/58* (2006.01)
*B09C 1/06* (2006.01)
*C02F 1/461* (2006.01)
*C02F 1/04* (2006.01)
*C02F 101/36* (2006.01)

(52) U.S. Cl.
CPC ............. *B09C 1/085* (2013.01); *B09C 1/06* (2013.01); *C02F 1/041* (2013.01); *C02F 1/46176* (2013.01); *C02F 1/583* (2013.01); *C02F 2101/36* (2013.01)

(58) Field of Classification Search
CPC ........... B09C 1/00; B09C 1/005; B09C 1/007; B09C 1/02; B09C 1/025; B09C 1/062; B09C 1/065; B09C 1/067; B09C 1/08; B09C 1/06; B09C 1/085; C02F 1/041; C02F 1/46176; C02F 1/583; C02F 2101/36
USPC ... 405/128.15, 128.45, 128.5, 128.55, 128.6, 405/128.7, 128.85
See application file for complete search history.

(56) References Cited

U.S. PATENT DOCUMENTS

| 4,738,206 A | 4/1988 | Noland |
| 4,864,942 A | 9/1989 | Fochtman et al. |
| 4,977,839 A | 12/1990 | Fochtman et al. |
| 5,067,852 A | 11/1991 | Plunkett |
| 5,098,481 A | 3/1992 | Monlux |

(Continued)

FOREIGN PATENT DOCUMENTS

| EP | 0546649 A2 | 6/1993 |
| WO | 20190111238 A1 | 6/2019 |

OTHER PUBLICATIONS

Invitation to Pay Additional Fees, corresponding appl. PCT/US21/16413 to Ezraterra LLC, dated Apr. 5, 2021.

(Continued)

*Primary Examiner* — William V Gilbert
(74) *Attorney, Agent, or Firm* — Raven Patents, LLC; Anton E. Skaugset

(57) ABSTRACT

Apparatus and methods for a non-destructive recovery of PFAS contaminants from a variety of media, the apparatus including 1) a polarity conversion unit for non-destructive PFAS removal from soil, sludges, filter media, and objects; 2) a brine pot evaporator for recovering PFAS from foams and fluids; 3) a fluids treatment system for PFAS removal from treated fluids; and 4) an amphiphilic decontamination wand for PFAS removal from hard surfaces.

23 Claims, 44 Drawing Sheets

(56) References Cited

U.S. PATENT DOCUMENTS

Figure 1:
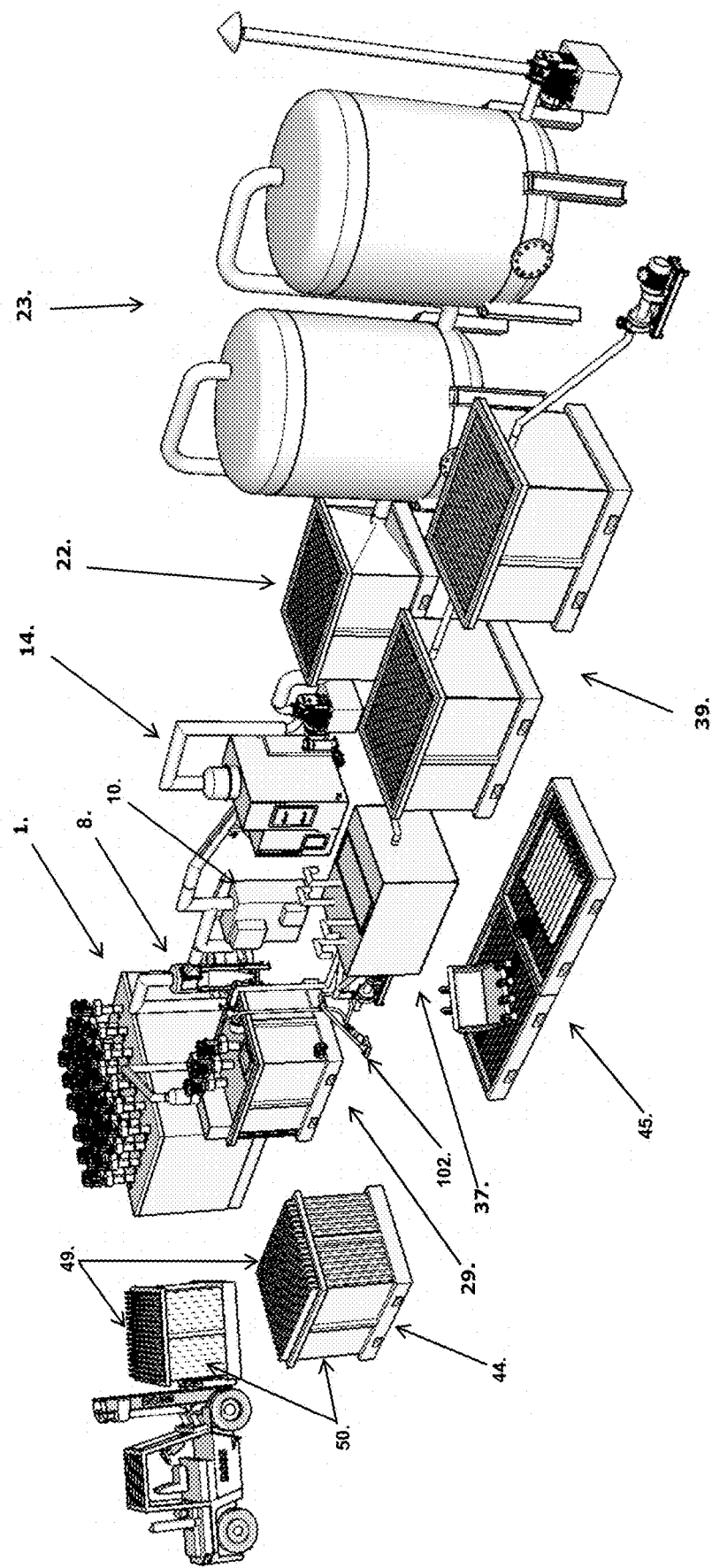

| | | | |
|---|---|---|---|
| 5,213,445 | A | 5/1993 | Ikenberry et al. |
| 5,228,804 | A | 7/1993 | Balch |
| 5,230,167 | A | 7/1993 | Lahoda et al. |
| 5,302,118 | A | 4/1994 | Renegar et al. |
| 5,361,514 | A | 11/1994 | Lahoda et al. |
| 5,836,718 | A | 11/1998 | Price |
| RE36,222 | E | 6/1999 | O'Ham |
| 6,000,430 | A | 12/1999 | Bova et al. |
| 6,110,430 | A | 8/2000 | Swisher, Jr. et al. |
| 6,146,596 | A | 11/2000 | Hill et al. |
| 6,296,815 | B1 | 10/2001 | Walker et al. |
| 6,829,844 | B2 | 12/2004 | Brady et al. |
| 7,618,215 | B2 | 11/2009 | Haemers et al. |
| 8,348,551 | B2 | 1/2013 | Baker et al. |
| 9,636,723 | B2 | 5/2017 | Brady |
| 10,875,062 | B2 | 12/2020 | Brady |
| 2017/0297926 | A1 | 10/2017 | Nickelsen |
| 2019/0241452 | A1 | 8/2019 | Ball |
| 2019/0314876 | A1 | 10/2019 | Oberle |
| 2020/0108429 | A1 | 4/2020 | Brady |
| 2020/0179997 | A1 | 6/2020 | Ross et al. |
| 2020/0206793 | A1 | 7/2020 | Brady |
| 2020/0376406 | A1* | 12/2020 | Clerkin ............... C02F 1/10 |

OTHER PUBLICATIONS

International Search Report, corresponding appl. PCT/US21/16413 to Ezraterra LLC, dated Jun. 11, 2021.

* cited by examiner

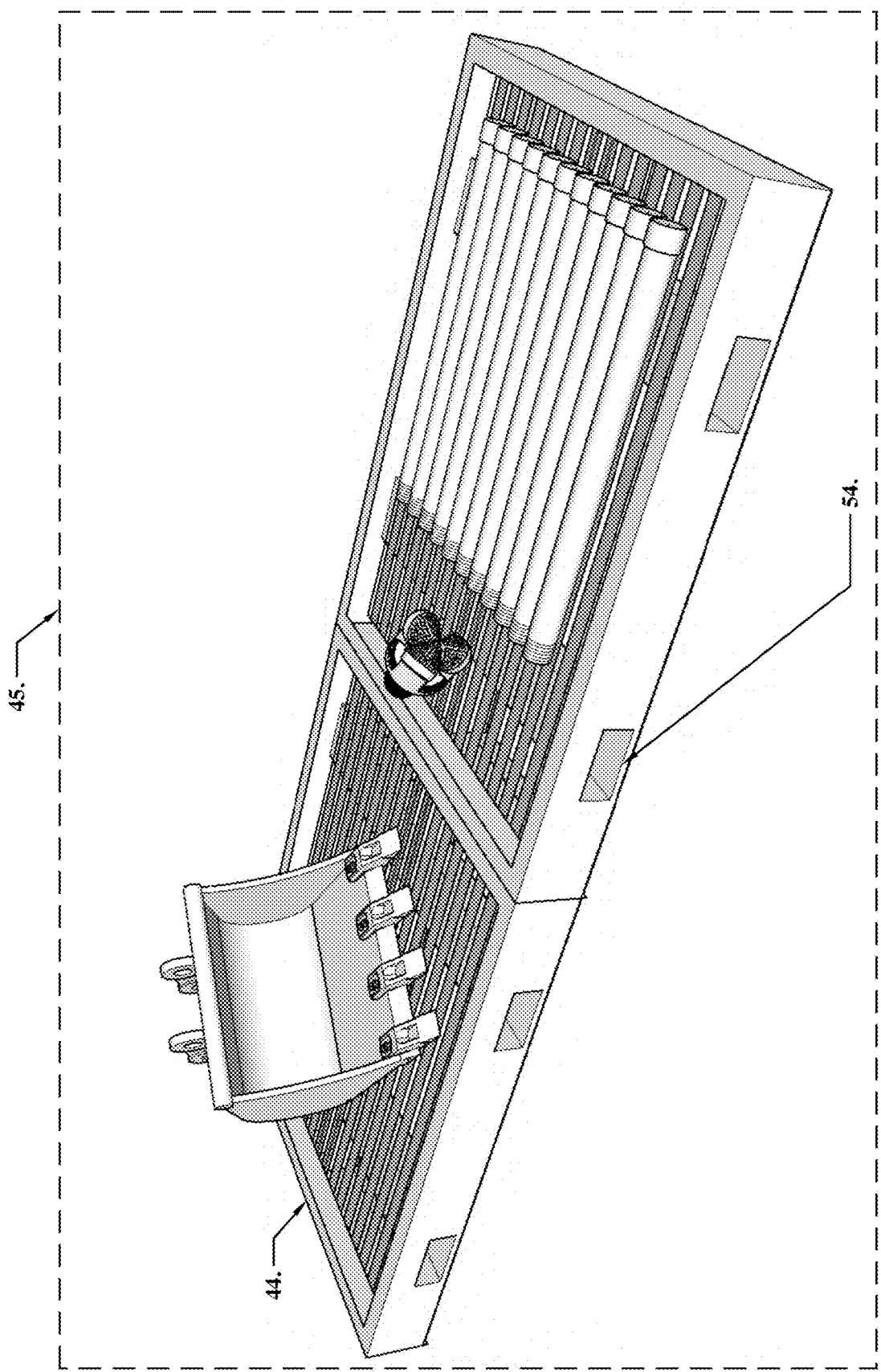

SINTERED WAVE MULTI-MEDIA POLARITY CONVERSION TREATMENT APPARATUS AND PROCESS FOR NONDESTRUCTIVE REMOVAL AND CONDENSATION OF PER- AND POLYFLUOROALKYL SUBSTANCES (PFAS) AND OTHER DANGEROUS COMPOUNDS

TECHNICAL FIELD

The present disclosure relates to methods of environmental remediation, and in particular to methods of removing Per- and Polyfluoroalkyl Substances (PFAS) from soil, sludge, colloids, fluids, air, metallic objects, and hard surfaces.

BACKGROUND

Per- and Polyfluoroalkyl Substances (PFAS) have become a global crisis over the past few years due to their extreme toxicity and the discovery of their presence throughout the environment including within food and drinking water supplies. There are over 5,000 compounds classified in the PFAS family of compounds. PFAS is found in human blood in practically all the population of the United States. Practically all babies born today have PFAS in their bodies. PFAS bioaccumulates in the human body and does not degrade. PFAS is present in consumer products, food packaging, water repellent, oil repellent, industrial processes, aqueous film forming foam (AFFF) for firefighting, TEFLON products and other common items. The waste infrastructure in the United States and globally was not designed to remove or contain PFAS; and PFAS passes through existing infrastructure directly into the environment. PFAS exposure pathways to humans are complete.

Thermal technologies applied for removal of amphiphilic PFAS and associated mixtures have special considerations associated with temperature application. Amphiphilic compounds are attracted to high energy interfaces. All polar mineral crystal systems including certain phyllosilicate minerals present in soil when heated are susceptible to pyroelectrical current generation; spontaneous polarity can occur or change when there is a significant temperature gradient across a soil bed. The change in temperature slightly modifies the position of certain atoms within the crystal structure, which result in a temporary change in surface polarity. In addition, thermal elasticity of a crystal lattice during heating causes stress induced polarity or piezoelectric currents. Pyroelectric and piezoelectric currents commonly occur together. Amphiphilic compounds react physiochemically; they relate physically not chemically. The momentary heat induced change in surface polarity causes a temporary voltage across the mineral crystal face causing movement of amphiphilic compounds. Uneven heating can cause amphiphilic compounds to move when pyroelectric and piezoelectric currents are generated during the heating process. Once movement occurs, the amphiphilic compounds will move to cooler portions of the soil bed and accumulate. Even heat distribution is an important aspect of treatment. Incineration overcomes this phenomenon through the excessive application of high temperatures; however, HF is formed and is immediately dangerous to human life and damages equipment.

In situ thermal technologies create large thermal gradients in soil that generate pyroelectric and piezoelectric currents, which move amphiphilic compounds and mixtures away from the treatment area. Further, when naturally occurring organic compounds in soil are heated, they degrade to simple alcohols such as acetone and methyl ethyl ketone. These alcohols act as co-surfactants and will trigger liquid crystal formation at the outer edges of the treatment zone. The resulting liquid crystal structure serves as a source for continued amphiphilic compound groundwater contamination. Pyroelectric and piezoelectric currents are important considerations in designing a safe system to remove PFAS amphiphilic compounds and associated mixtures.

A variety of thermal treatments of soils have been previously described. U.S. Pat. No. 4,738,206 (Noland), U.S. Pat. No. 4,864,942 (Fochtman), U.S. Pat. No. 4,977,839 (Fochtman) and U.S. Pat. No. 7,618,215 (Haemers) describes continuous process apparatus that make use of combustion gas for heat. The processes vary greatly in the temperature used with U.S. Pat. No. 4,738,206 teaching a range of 120 to 450 degrees F. and U.S. Pat. Nos. 4,864,942 and 4,977,839 claiming a range of 300 to 400 degrees C., which is 572 to 752 degrees F. They also vary in the treatment gas with U.S. Pat. No. 4,738,206 using combustion gas and U.S. Pat. Nos. 4,864,942 and 4,977,839 teaching the use of an inert gas such as Nitrogen and the addition of water. All these Patents rely on moving treatment gases through the soil under porous flow conditions to cause boiling and/or evaporation of contaminants. In addition, there is no mention in the prior art as to temperature limitation as a means to prevent unintended byproducts such as HF. Most prior art views higher application temperatures to heat porous media faster by increasing the thermal gradient.

A characteristic of continuous processes is the use of heavy material handling equipment that uses large amounts of energy in moving the material through the treatment process. This energy use is in addition to that expended in treating and in excavating the material and returning it to its final state. Further, continuous processes treat soil in a very short period of time (in minutes), which result is using large amounts of energy. There is no precision in the application of energy due to the short treatment times. The lack of precision in energy application creates a cumulative waste in energy through a large project and creates the risk of HF generation from thermal degradation of PFAS compounds. Steep thermal gradients within porous media create pyroelectric and piezoelectric currents that can redistribute PFAS rather than remove PFAS.

Static thermal processes that use a pile arrangement are described in U.S. Pat. No. 5,067,852 (Plunkett), U.S. Pat. No. 5,213,445 (Ikenberry), U.S. Pat. No. 5,228,804 (Balch), U.S. Pat. No. 5,836,718 (Price), U.S. Pat. No. 6,000,882 (Bova) and U.S. Pat. No. 9,914,158 B2 (Baker et al). The apparatus of each of these consists of soil that is placed on a treatment surface then layered with differing configurations of piping until the desired configuration is attained. The pile is then covered with a vapor proof covering prior to treatment. These processes also vary greatly in temperature used. U.S. Pat. No. 5,067,852 uses unheated air as the treatment gas, but teaches some heat is advantageous. At the other end of the temperature range U.S. Pat. No. 5,228,804 teaches the use of air heated in a heat exchanger to 1,200 to 1,400 degrees F. as a treatment gas. More moderate treatment gas temperatures, to 300 degrees F., are used in U.S. Pat. No. 5,213,445 using the treatment gas of combustion products from recirculating the off gas, while U.S. Pat. No. 6,000,882 injects combustion gas of at least 800 degrees F. and perhaps as high as 2,500 degrees F. to raise the soil temperature to the 212 to 350 degrees F. range, then exhausts the off gas through the same piping. Another approach is taken by U.S. Pat. Nos. 5,836,718 and 7,618,215 in that the soil is heated by conduction through the walls of the piping in the soil pile to a temperature of 90 to 250 degrees C. (194 to 452 degrees F.) and the fresh air treatment gas is not heated. U.S. Pat. No. 9,914,158 B2 uses heaters attached to the walls and floor to distribute heat into porous media. No attempts are made to flatten thermal gradients to minimize pyroelectric and piezoelectric currents nor does the patent mention any method to treat PFAS vapor emissions.

Yet another approach is taken by U.S. Pat. No. 10,016,795 (Rockwell et al.) where a smoldering process is enabled or enhanced by adding at least 25% total organic carbon to the soil and igniting the mixture to destroy contaminants. The smoldering process can take place in situ or ex situ. The range of treatment gas application temperatures and lack of precise energy application show a general lack of understanding of how hot air moves through porous media. Further, the application temperatures were not designed for removal of PFAS as the higher temperature ranges cause HF generation. No attempts are undertaken to reduce thermal gradients to reduce pyroelectric and piezoelectric current generation, which can redistribute PFAS within the porous media. All of the referenced patents do not contain any means to remove PFAS from their treatment gas emissions. Nor do these patents contemplate treatment of media other than porous media such as soil.

The pile arrangement processes do not require energy intensive material handling during treatment; however, they may be characterized as requiring labor intensive setup and disassembly in the activity of layering the piping system within the soil pile and removing it after treatment and also covering and uncovering the completed pile.

Static processes that use container arrangements are not as prevalent in the prior art. One example is US Patent Reissue No. 36,222 (O'Ham) that has the contaminated soil loaded into a tray shaped treatment container, and then directs combustion heat and gases on the surface of the soil while the off gas is removed from the bottom of the container. Temperatures are not given, but the inlet gas temperatures may be assumed to be in the upper end of the temperature range. U.S. Pat. No. 6,296,815 (Walker) takes another approach. The soil is loaded into tall-insulated containers and then electric resistance heaters are inserted into the soil. The containers are moved into an insulated treatment vessel and the soil heated directly. The details of the process are not given. Another container arrangement is described in U.S. Pat. No. 6,829,844 B2 (Brady et al) describes the use of a thermally conductive vessel that fits within an insulated treatment chamber. Desiccated electrically heated air is introduced to the treatment chamber where the air is drawn through the thermally conductive vessel via vacuum lines located near the bottom; treatment gases are drawn through the soil under porous flow conditions. The electrically heated treatment gas is maintained below 1,300 F to prevent the formation of oxides of nitrogen and oxides of Sulphur. U.S. Pat. No. 8,348,551 teaches a vehicle can drive in a treatment chamber where sacks, cartons and drums can be loaded and unloaded directly into a treatment chamber, which is subsequently heated. U.S. Pat. No. 9,914,158 B2 also teaches a moving vehicle can access the interior of the treatment chamber to facilitate loading and unloading. U.S. Pat. No. 9,636,723 (Brady) teaches bulk soil in a container can be treated in horizontal sections inside a thermally conductive vessel placed inside an evaporative desorption treatment chamber.

None of the previous evaporative desorption techniques contemplated treatment of nonvolatile amphiphilic PFAS contaminants, nor did they describe any emissions treatment system or treatment for anything other than porous media such as soil. Furthermore, the steep thermal gradients, the associated pyroelectric and piezoelectric currents and cooler areas within the soil box render it impossible for the conventional evaporative desorption technology to remove nonvolatile amphiphilic PFAS and associated mixtures from porous media.

The review of the prior art summarized above indicates a need for a multimedia technology that can safely remove PFAS from porous media (soil, sediment, and other porous media), sludge, colloidal matter, biosolids, PFAS foams, PFAS fluids, metallic objects, hard surfaces and air.

SUMMARY

The present disclosure is directed to apparatus and methods for a non-destructive recovery of PFAS contaminants from a variety of media, the apparatus including 1) a polarity conversion unit for non-destructive PFAS removal from soil, sludges, filter media, and objects; 2) a vapor emissions treatment system that causes the formation of pre-micellar aggregates and liquid crystals; 3) a fluids treatment system for PFAS removal from water, brines, foams and colloids; and 4) an amphiphilic decontamination wand for PFAS removal from hard surfaces.

In some embodiments, the disclosure can provide an apparatus for recovering PFAS contaminants, the apparatus including a vapor conversion assembly that includes a cooling chase that receives heated vapor containing PFAS from one or more sources of PFAS-containing vapor; a misting chamber that receives PFAS-containing vapor from the cooling chase; a cooling fluid line that injects droplets of cooling fluid into the cooling chase and the misting chamber to cool the PFAS-containing vapor, the cooling fluid having a temperature that is cooler than the incoming PFAS-containing vapor and warmer than ambient temperature. The vapor conversion assembly can additionally include a permeable Gibbs energy curtain disposed so that the cooled PFAS-containing vapor passes through the Gibbs energy curtain before entering the vapor conversion tank, the Gibbs energy curtain providing an enhanced surface area configured to promote condensation of PFAS onto and/or into the Gibbs energy curtain; a supply of recycled cooling fluid disposed within the vapor conversion tank that is cooled and aerated by one or more internal purge lines delivering outside air to the cooling fluid, while maintaining a cooling fluid temperature above ambient temperature; a demister tower, including a demister screen, coupled to the vapor conversion tank so that droplets of fluid are removed from a mixture of treated PFAS-containing vapor and air from the one or more internal purge lines as the mixture passes through the demister tower; and a filter within a filter housing that removes PFAS pre-micellar aggregates and liquid crystals from the cooling fluid as it is cooled within the vapor conversion tank. The vapor conversion assembly can additionally include a brine pot evaporator assembly that receives the PFAS pre-micellar aggregates and liquid crystals removed by the vapor conversion assembly filter, in combination with additional PFAS-containing fluids and foams, and treats the resulting mixture with heated gas flow in combination with an applied vacuum in a batch process that yields dried PFAS-containing powder.

Figure 39:
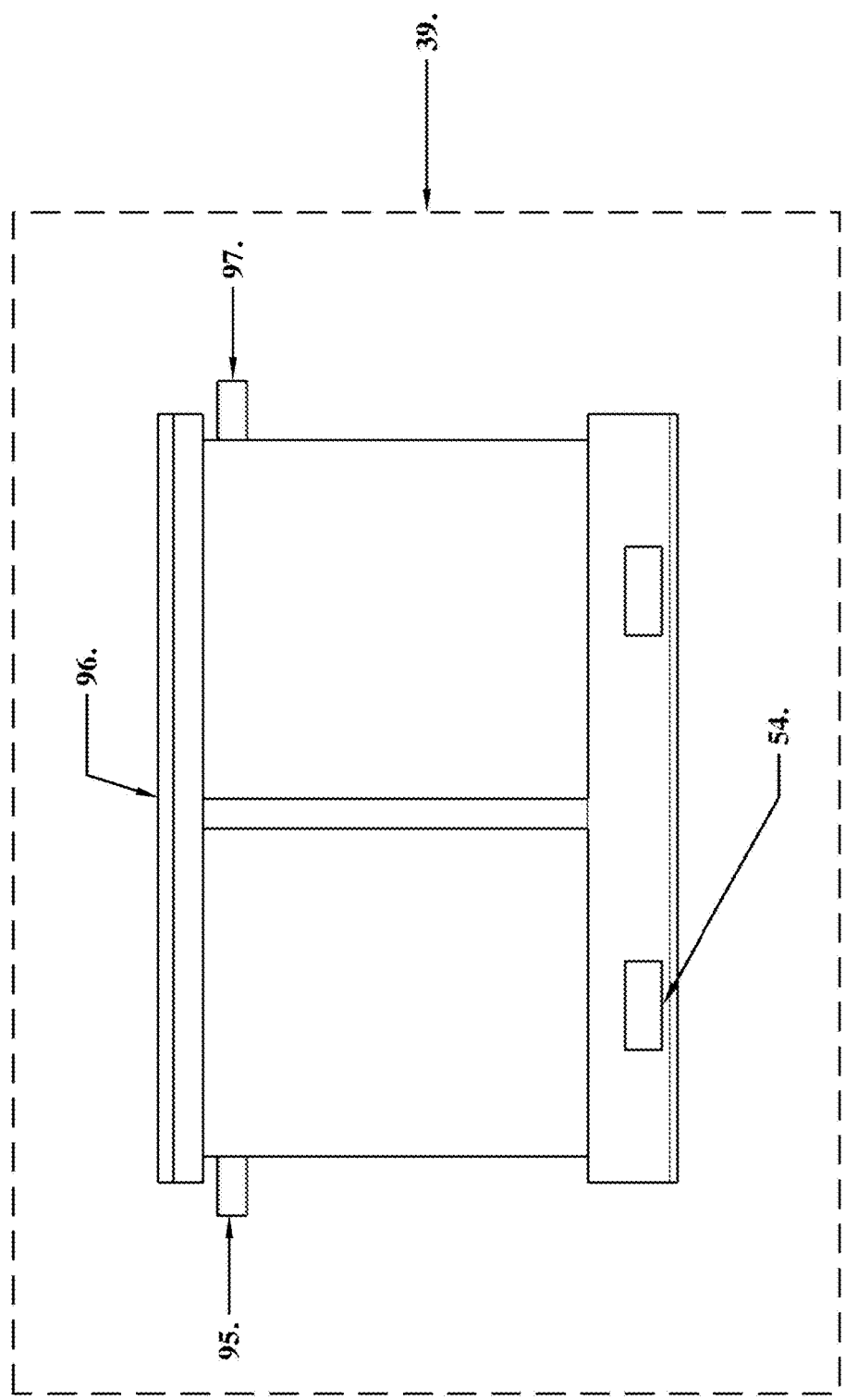

In some embodiments, the disclosure can provide a method for recovering PFAS contaminants from a medium, the method including loading the medium into a sealable media treatment vessel of a polarity conversion unit, where the sealable media treatment vessel includes two pairs of opposed side walls, an upper lid including a plurality of air injection heads, a lower extraction pad, and a shaping screen assembly; where the plurality of air injection heads are configured to deliver heated treatment air to the sealable treatment vessel; the shaping screen assembly includes a plurality of planar, vertically oriented, and parallel shaping screens; the extraction pad includes a plurality of vapor extraction lines each extending across a width of the extraction pad, each vapor extraction line being capable of drawing heated treatment from the sealable media treatment vessel, and each vapor extraction line being capable of being activated individually and in a sequence; and where when the sealable media treatment vessel is loaded with media to be treated the media is disposed between adjacent shaping screens of the plurality of shaping screens, and heated treatment air delivered by the plurality of air injection heads is is drawn by the vapor extraction lines through the shaping screen assembly within the media and removed from the vapor conversion assembly. The method can further include treating the medium in the sealable media treatment vessel with heated air and transporting the treatment air from the polarity conversion unit to a vapor conversion assembly; where the vapor conversion assembly can include a cooling chase that receives the treatment air from the polarity conversion unit; a misting chamber that receives the treatment air from the cooling chase; a cooling fluid line that injects droplets of cooling fluid into the cooling chase and the misting chamber to cool the treatment air, where the cooling fluid has a temperature that is cooler than the incoming treatment air and warmer than ambient temperature; a permeable Gibbs energy curtain disposed so that the cooled treatment air passes through the Gibbs energy curtain before entering a vapor conversion tank, where the Gibbs energy curtain provides an enhanced surface area that is configured to promote condensation of PFAS onto and/or into the Gibbs energy curtain; a supply of recycled cooling fluid that is disposed within the vapor conversion tank and that is cooled and aerated by one or more internal purge lines delivering outside air to the cooling fluid, maintaining a cooling fluid temperature above ambient temperature; a demister tower, including a demister screen, coupled to the vapor conversion tank so that droplets of fluid are removed from a mixture of purging air from the cooling fluid supply and treatment air as the mixture passes through the demister tower; and a filter within a filter housing that removes PFAS pre-micellar aggregates and liquid crystals from the cooling fluid as it is cooled within the vapor conversion tank. The method can further include drying the removed PFAS pre-micellar aggregates and liquid crystals using a brine pot evaporator assembly by treating the removed PFAS pre-micellar aggregates and liquid crystals with a heated gas flow in combination with an applied vacuum in a batch process to yield dried PFAS-containing powders.

In some embodiments, the disclosure can provide a method for recovering PFAS contaminants from a contaminated surface, the method including treating the contaminated surface with heated treatment gas using a decontamination wand and recovering a resulting PFAS-containing vapor; transporting the PFAS-containing vapor to a vapor conversion assembly to remove at least some PFAS from the PFAS-containing vapor and generate a gas mixture; and passing the gas mixture through a vapor phase galvanic separator vapor phase to promote amphiphilic self-assembly of PFAS monolayers from residual PFAS present in the received gas mixture to yield treated vapor.

BRIEF DESCRIPTION OF THE DRAWINGS

FIG. 1: Sintered Wave Multimedia Polarity Conversion Apparatus

FIG. 2: General Cross Section Including Implements, Vapor Line and Fluids Line Assembly FIG. 3: General Map View including Implements, Vapor Line and Fluids Line Assemblies FIG. 4: Polarity Conversion Unit FIG. 5: Polarity Conversion Unit w/Soil Slip Assemblies Cross Section FIG. 6: Modified Sintercraft Pad Perspective View FIG. 7: Modified Sintercraft Pad Map View FIG. 8: Soil Slip Base Framework Perspective View FIG. 9: Soil Slip Base Framework Cross Section FIG. 10: Soil Slip Base Framework Map View FIG. 11: Soil Slip Perspective View FIG. 12: Static Soil Shaping Screen Assembly Perspective View FIG. 13: Static Soil Shaping Screen Assembly Cross Section FIG. 14: Vapor Conversion Tank Perspective View FIG. 15: Vapor Conversion Tank Entrance Cross Section FIG. 16: Vapor Conversion Tank Front View Cross Section FIG. 17: Vapor Conversion Tank Exit Cross Section FIG. 18: Vapor Conversion Tank Rear Cross Section FIG. 19: Vapor Conversion Tank Map View FIG. 20: Vapor Conversion Tank Interior Elements Perspective View FIG. 21: Vapor Conversion Tank Interior Elements Cross Section FIG. 22: Gibbs Energy Curtain Perspective View FIG. 23: Vapor Phase Galvanic Separator Perspective View FIG. 24: Vapor Phase Galvanic Separator Housing Cross Section FIG. 25: Vapor Phase Galvanic Separator Housing Map View without Lid FIG. 26: Vapor Phase Galvanic Separator Assemblies Cross Section FIG. 27: Vapor Phase Galvanic Separator Filter Media Cross Section FIG. 28: Brine Pot Evaporator Assembly Perspective View FIG. 29: Brine Pot Evaporator Assembly Cross Section FIG. 30: Brine Pot Evaporator Assembly Map View FIG. 31: Brine Pot Evaporator Interior Elements Perspective View FIG. 32: Brine Pot Evaporator Interior Elements Cross Section FIG. 33: Surface Excess Concentrator Assemblies Perspective View FIG. 34: Surface Excess Concentrator Assemblies Cross Section FIG. 35: Surface Excess Concentrator Map View without Lid FIG. 36: Surface Excess Concentrator Interior Elements Perspective View FIG. 37: Surface Excess Concentrator Interior Elements Cross Section FIG. 38: Aqueous Phase Galvanic Separator Perspective View FIG. 39: Aqueous Phase Galvanic Separator Cross Section FIG. 40: Aqueous Phase Galvanic Separator Map View without Lid FIG. 41: Aqueous Phase Galvanic Separator Assemblies Cross Section FIG. 42: Aqueous Phase Galvanic Separator Filter Media Cross Section FIG. 43: Amphiphilic Decontamination Wand Perspective View FIG. 44: Implement and Object Decontamination Base Framework Perspective View

DETAILED DESCRIPTION

PFAS has received significant public scrutiny especially over the past year. To understand the context of, and the need for, the presently disclosed apparatus and method, it is necessary to understand that PFAS behaves differently than classic regulated chemicals. Further, it is necessary to look at the evolution of the environmental regulations within the United States and how the PFAS crisis came to be. This current apparatus and method are intended to retrofit into existing classic regulated waste infrastructure. PFAS are amphiphilic compounds, which are invisible to the naked eye and are attracted to high energy interfaces where they self-assemble across those interfaces (forming films). The mere presence of PFAS compounds will cause water to move. PFAS formulations are created through a physiochemical process, which means they associate physically and not chemically. The toxicity of PFAS is significantly higher than most classic regulated classic chemicals.

PFAS were generally used for their surfactant (surface reactive agents) characteristics, which have a broad range of applications. Amphiphilic compounds like PFAS contain a charged head group with a lipophilic alkyl carbon tail (ball and stick structure); the head group is attracted to water (hydrophilic) while the alkyl carbon tail is attracted to oil/fat and repulsive to water (hydrophobic). The charged head group can have a negative charge, a positive charge or both a positive and negative charge, which depends on the ph. Surfactants reduce the surface tension of fluids. When surfactants reach a certain concentration (critical micelle concentration), surface tension stabilizes and micelles are formed in the bulk of the fluids. Micelles are aggregates with a hydrophobic nucleus; alkyl carbon tails point inward with charged heads facing outward in water. Micelles have the opposite structure when immersed in oil.

Perfluoroalkyl Substances are fully fluorinated compounds (fluorine atoms attach to all carbon atoms in the alkyl carbon tail structure) and are typically the end degradation product of precursor partially fluorinated PFAS. Polyfluoroalkyl Substances are partially fluorinated compounds where some hydrogens are bonded to the alkyl carbon chain structure. Both classes of PFAS can form linear and branched isomers.

When partially fluorinated compounds degrade in the environment the hydrogen-carbon structures (hydrocarbon portion) of the alkyl carbon tail structure typically cleaves off. The degradation process is not reversable in nature due to the extreme energy requirement to fully fluorinate a compound. This degradation phenomenon causes Perfluoroalkyl Substances (fully fluorinated compounds) to increase in concentration over time due to hydrocarbon cleaving during conventional classic contaminant treatment processes. With thousands of PFAS compounds that can be partially fluorinated, there is a need for a treatment technology to remove both Perfluoroalkyl and Polyfluoroalkyl Substances along with cleaved hydrocarbon from a variety of media. Measurement of the cleaved hydrocarbon mass and the increased Perfluoroalkyl Substances concentration is an indirect method to quantify PFAS mass that are undetectable with modern analytical methods. Less than 29 individual PFAS out of over 5,000 PFAS compounds have an analytical method to measure their presence and concentration. These undetectable PFAS are commonly referred to PFAS Dark Matter. PFAS and PFAS mixtures interact with Gibbs free energy found on surfaces and interfaces through Van Der Waals forces. Gibbs free energy are uncompleted molecular bonds found at an interface that is characterized by the molecular structure of the bulk and smoothness of the interface. Van Der Waal forces are attractive and repulsive forces interacting with atoms, molecules and surface polarities (surface charges). Van Der Waal forces differ from covalent and ionic bonds as they are caused by correlations in fluctuating polarizations (charges) of nearby particles.

The intramolecular forces holding PFAS molecules together consist of the strongest bonds in nature (covalent bonds), which is why PFAS molecules are stable and resistant to destruction. The high Pauling Electronegativity of Fluorine contributes to the extraordinary bond strength with Carbon and the overall stability of PFAS molecules. The intermolecular forces driving PFAS interaction with other molecules, surfaces and interfaces are Van Der Waals forces, which are relatively weak. This significant aspect of PFAS characteristics create the opportunity to safely remove PFAS from various media without destroying the PFAS molecule and creating extremely dangerous by-product compounds.

Surfaces and interfaces have specific polar and dispersive energy ratios specific to the surface or interface. When a fluid and a solid have matching or closely matching polar and dispersive energy ratios, perfect wetting and adhesion occurs as a result. Surfactants are used to facilitate energy ratio matching for optimization of wetting and adhesion properties.

PFAS behavior are largely Coulombs interactions at solid and liquid interfaces. Coulombs interactions are largely limited to the immediate area of the interface as Coulombs law is an inversed distance squared law where electrical forces quickly dissipate with distance. Dynamic surface energy on solid surfaces and surface tension on liquid surfaces are a Gibbs free energy phenomenon. Surfactants are commonly used to prevent corrosion on solid metal surfaces due to their self-assembly characteristics on high energy interfaces; they reduce the surface charge and form a layer preventing corrosion cells from forming on metal surfaces. Surfactants are also used to lower the surface tension in fluids. Certain PFAS can reduce surface tension of fluids significantly lower than classic hydrocarbon surfactant compounds; nothing else can perform the way PFAS can perform.

Surfactants are typically used to combine compounds that do not mix (immiscible), like oil and water. For example, oil and water can be mixed when there is a physical agitation; however, the oil and water will separate into separate layers over time. When a surfactant is added to the oil and water mixture and physically agitated, the oil and water will not separate; this stabilized mixture is an emulsion. The PFAS molecule adheres to both water (the hydrophilic portion of the molecule) and oil (the hydrophobic portion of the molecule), which allows emulsions to be stable.

Microemulsions are different from emulsions as microemulsions are clear, thermodynamically stable, isotropic liquid mixtures of oil, water and surfactant. Cosurfactants and the addition of various salts are commonly used in microemulsions. The oil is typically a complex mixture of hydrocarbon and olefins (unsaturated hydrocarbon). Microemulsions are formed through simple mixing of components where simple emulsions are created through high physical shearing of the components. PFAS in the environment are largely mixtures consisting of stabilized emulsions or microemulsions.

The environmental regulations that govern chemical storage, wastes and response to releases to the environment were implemented on the federal level in the 1970s. Various regulatory agencies implemented the evolving environmental laws on the local, state and federal level. The vast majority of contaminated lands became contaminated as a result of historical practices before regulation. Spill rates for regulated substances dramatically dropped in the 1980s and continue to drop to present day. Regulation has caused better management of regulated substances.

During the early years of regulation, the nation's waste infrastructure was modernized to prevent classic regulated chemicals from entering the environment. The modernized infrastructure largely included spill prevention structures/devices, lined landfills, sewage treatment facilities, drinking water treatment plants and vapor emissions treatment, which were all designed for classic regulated chemicals. Cleanup programs for pre-regulation legacy contamination were implemented on the local, state and federal level. During the 1980s and 1990s, agency bureaucracy became the most significant challenge during site remediation of legacy contamination due to inconsistent enforcement and unclear cleanup goals. The bureaucracies greatly expanded regulation to include an ever-growing list of chemicals.

During the mid-1990s, industry lobbyists seeking relief from burdensome and sometimes arbitrary legacy cleanup requirements and the expansion of regulated substances lobbied for new laws that caused cleanup requirements to be less stringent and to slow or stop the expanding list of regulated chemicals by creating complexity in the law. For example, the 1996 Safe Drinking Water Act (SDWA) was drafted in such a way that it produced a complex and cumbersome process. New drinking water standards for newly discovered contaminants were nearly impossible to develop and implement; even today. The few new drinking water standards developed after the 1996 SDWA were achieved mainly through Acts of Congress, by-passing the SWDA process. The current Congressional activities related to PFAS are designed to by-pass the 1996 SWDA. States are engaged in the same activity where they are developing their own regulation. PFAS remains unregulated even though PFAS has been a recognized toxin for almost 20 years. The United States Environmental Protection Agency (EPA) has recently set a PFAS action level but not an enforceable drinking water standard.

In addition to the 1996 SDWA, other laws were passed making it easier to not perform actual cleanups of contaminated properties. Starting from 1994, institutional controls became the selected remedy for a growing number of sites. Institutional controls are simply storing contamination at the site by placing a cap over the top. Shallow groundwater was generally not considered worth protecting after the 1990s. With the 1990s cleanup law evolution came a general lack of enforcement for contaminated site cleanup. State and federal agencies have not had any meaningful enforcement actions for contaminated sites relative to the number of contaminated sites that exist within the United States. This has resulted in thousands of contaminated properties sitting idle for decades; either no cleanup actions or conditionally closed with a simple cap on the property. Investigations and cleanup of environmental contamination lasting decades were the norm. Some sites have been in active investigation and cleanup since regulation began with no meaningful results.

The new emerging contaminant class of PFAS, particularly fully fluorinated Perfluorooctane Sulfonate (PFOS) and Perfluorooctanic Acid (PFOA), has recently come to the forefront of public concern due to extreme toxicity, mobility and ubiquitous presence throughout the globe. PFAS has been unregulated since the environmental laws were first implemented in the United States. Private tort claim litigation filed shortly after the 1996 SWDA has driven intense public interest in PFAS and the general condition and effectiveness of current environmental law. Litigation across the country has uncovered documents that appear to indicate that manufacturers of PFAS products knew of its toxicity and did not disclose the information to the environmental agencies or the public. The EPA became aware of PFAS toxicity through documents obtained during litigation Discovery in the early 2000s. The EPA's response to the PFAS crisis has been bogged down due to the complexity of existing environmental federal law. Numerous water districts within the United States had their water supplies contaminated with PFAS where they declared emergencies handing out bottled water to their customers. Discovery of PFAS contaminated areas caused new water systems to be installed using alternate clean water sources, which is essentially replacing existing infrastructure. Some states have filed lawsuits against PFAS manufacturers and have won large settlements to pay for resolution of the PFAS crisis.

Correlations have been found that show an association between PFAS exposure and a variety of diseases, birth defects and untimely deaths. In addition, some recent studies seem to show other associations between PFAS exposure and obstreperous and obesity. Maps showing obesity distribution throughout the United States correspond with maps showing PFAS release site distribution throughout the United States. Overall national obesity rates increasing over time appear to mirror the proliferation of PFAS products over the last 50 years. PFAS appears to be impacting practically the entire population of the United States (impacts ranging from obesity to deaths).

New PFAS laws are under development on a federal and state level. These new laws are impacting the entire environmental industry. Properties believed to have been cleaned up for classic regulated compounds are no longer considered clean. PFAS groundwater plumes are miles long impacting vast areas having gone unregulated for the past 50 years.

One of the most significant routes for PFAS release to the environment is the use of AFFF in liquid hydrocarbon fire situations, which began in the 1960s. AFFF is a microemulsion in its concentrated form. When mixed with water, using a special fire nozzle, foam (an emulsion) is created to cool and suffocate a fire. The interfacial energies of the foam cause the foam to float on top of fuel range liquid hydrocarbon. The AFFF foam sticks together; when debris falls into AFFF foam, the foam self-heals (the hole quickly closes up) preventing reignition of the fire. AFFF is used on petroleum fires especially around airports, plane crash sites, bulk storage facilities and oil refineries. AFFF is also used to prevent spilled petroleum from igniting. The foam prevents flammable vapors from forming around a spill. Bulk storage facilities typically have a mixture of petroleum and PFAS present in the soil and groundwater from legacy spills.

The federal government required airports to have AFFF on hand for use on plane crashes and to routinely engage in live training exercises. The US Department of Defense extensively used AFFF in bases worldwide and used the foam in routine training exercises. AFFF is by far the best firefighting foam for liquid hydrocarbons fires ever made and was distributed all over the world. Researchers have been trying to find a replacement for years and had not been successful. For more than 50 years, AFFF waste was typically managed like harmless water. This approach has resulted in significant groundwater PFAS contamination around the nation and the globe.

PFAS has also been found to accumulate in municipal landfills and wastewater treatment plants (sewage plants). Municipal waste contains large amounts of discarded consumer products, food packaging, biosolids, and flocculent sludges that contain PFAS. Landfill leachate, the fluids that come from the landfill debris, historically has been directed to local sewer plants, which were not designed to remove PFAS. In addition to landfills, sewer plants receive PFAS from industrial sources, chrome plating plants, dry cleaners, human waste and other sources. PFAS passes directly through sewer plants untreated into local waterways. As previously mentioned above, Perfluoroalkyl substances actually increase in concentration as a result of degradation of Polyfluoroalkyl substances. This is especially problematic for the eastern United States where drinking water is largely obtained locally through surface water or groundwater. There are a large number of PFAS sites in the eastern United States where obesity rates are the highest in the country. California has a large number of PFAS groundwater contamination sites also; however, the vast majority of drinking water in California is imported from the Sierra Nevada mountains and the Colorado River where there is very little PFAS contamination. The obesity rates in the California PFAS areas are orders of magnitude lower than the eastern United States PFAS areas.

Sewer plants generate biosolids that contain PFAS, which are typically deposited on farm fields for use as fertilizer. PFAS contaminated farm fields are known to contaminate food supplies including livestock and milk. There are now thousands of acres of farmland contaminated with PFAS due to biosolids spreading. PFAS is a global issue with no commercially available method to safely remove these compounds from soil, sludge, high concentrate PFAS fluids, metallic objects, hard surfaces and air. This present disclosure is intended to provide a multimedia non-destructive treatment process for PFAS on cleanup spill sites and from accumulation facilities such as landfills, sewer plants, water treatment plants and vapor emissions. The present disclosure is intended to be used to modernize existing waste infrastructure to safely remove PFAS preventing the unchecked spread of PFAS into the environment and sensitive receptors.

There are numerous ex situ treatment techniques available for petroleum hydrocarbons, solvents, PCBs and pesticides; however, safe ex situ treatment techniques are not available for PFAS. Current thinking calls for contaminant destruction. This line of thinking has worked well for classic regulated contaminants like petroleum hydrocarbons; however, the carbon-fluorine bond (C—F bond) in PFAS is among the strongest in nature. The high electronegativity of fluorine gives the C—F bond a significant polarity/dipole moment. The bond disassociation energy is 5 to 10 times greater than other carbon halogen bonds. Destroying PFAS results in dangerous byproducts such as hydrofluoric acid (HF). HF dissolves glass, metal and organic matter. HF is immediately dangerous to life and health. Further, breaking the C—F Bond requires high energy and is expensive, significantly more costly than classic regulated compounds.

Incineration is the only technology commercially available to remove and destroy PFAS. Any incineration technology deployed on PFAS contaminated media requires HF treatment where calcium powder is sprayed into the effluent vapor stream to create calcium fluoride. The effectiveness of HF treatment is in question and there are attempts in Congress to prohibit the use of incineration for PFAS. Incinerators are complex, hard to permit and costly. Only one incinerator in the United States has been upgraded since the late 1990s. With only 23 aging hazardous waste incinerators in the United States, the incineration national infrastructure is not sufficient to satisfy the upcoming PFAS treatment needs. The majority of PFAS occurrences within the United States are located within non-attainment air basins where incinerators would not be allowed to operate. New incinerators will take decades to permit, construct and to begin operations. The Sintered Wave Technology is a flameless emissions friendly device that can be deployed throughout the United States in all air basins. There are approximately 16,000 sewer plants, 4,000 active landfills and up to 10,000 inactive landfills in the United States today that have no cost-effective means to safely remove PFAS from wastewater, leachate, sludge, biosolids or vapor emissions.

Amphiphilic compounds like PFAS are weakly bonded to surfaces. Surface polarity governs the bonding capacity as the bonds are Van Der Waals forces. Thermal energy will increase entropy and disorganize surface polarity to a point where amphiphiles will be released from the surface. Even distribution of thermal energy is an important factor in amphiphilic removal from a surface.

The methods and apparatus of the present disclosure may be categorized as a multimedia polarity conversion technology where Gibbs free surface energy and Coulombs interactions are altered through static geometry, high surface area, treatment gas velocity/temperature modulation followed by a physiochemical PFAS vapor emissions treatment. Coulombs interaction forces play a significant role in adhesion of nonvolatile amphiphilic compounds and mixtures to porous media and other high energy interfaces. Traditional thermal technologies focus on boiling or evaporating volatile and semi volatile classic regulated contaminants from soil and then using commercially available vapor emissions treatment systems. Commercially available oxidizers dissolve when they are used for PFAS treatment due to HF formation.

The present disclosure recognizes the nonvolatile amphiphilic nature of PFAS and the hazards of destroying PFAS. Given Coulombs law, the inverse squared relationship between charges and distance, the PFAS Van Der Waal surface bonding is limited to surficial charges at an interface. Techniques used to reduce media thermal resistivity and flatten thermal gradients cause disorganization of surface polarity, which provide a reliable trigger to non-destructively remove nonvolatile amphiphilic PFAS compounds and associated mixtures from a variety of media. Temperature, velocity, geometry and high surface area are used to disorganize surface polarity, which safely removes PFAS while maintaining its molecular integrity during the process. The process is amenable to removal of other classic regulated compounds and cleaved hydrocarbon comingled with the nonvolatile amphiphilic PFAS compounds and mixtures.

The USPTO has no unique category for multimedia polarity conversion decontamination technologies. Prior art comparisons can be made with thermal technologies even though the actual physical functions (boiling/evaporating volatile and semi volatile substances) are different from the concept of multimedia polarity conversion decontamination. All prior art thermal technologies create thermal gradients within porous media capable of producing pyroelectric and piezoelectric currents. Techniques to lower thermal resistivity, flatten thermal gradients and disorganize surface polarity are critical in safe PFAS removal.

Prior art for ex situ thermal desorption technologies reveal that there are two basic categories of thermal desorption techniques: 1) techniques that involve mechanical agitation of the soil during the heating process and 2) techniques that are applied to static configuration of soil.

Often the techniques that involve mechanical agitation also operate in a continuous process where soil is continuously introduced to the process and is mechanically moved through the process apparatus until treatment is complete, and then is continuously discharged to a container for disposal or reuse.

Alternatively, techniques that are applied to static configuration of soil are generally treated in batches where a batch or given amount of soil is introduced to the apparatus; the treatment process is started, and when complete, is stopped and the treated soil removed. The next batch of soil is then introduced to the treatment apparatus. Static configuration techniques may also be broken down into two subcategories: (a) pile arrangement and (b) container arrangement.

Another characteristic of thermal desorption technology is the source of heat and the gas used to affect the decontamination. The exact mechanisms that occurs in thermal desorption is not well understood and a variety of techniques have been proposed in prior art. The concept of polarity conversion, reduction of thermal resistivity and the reduction of pyroelectric and piezoelectric currents is a new concept in this field of art. Some processes use combustion gases from the burning of fossil fuels as both a source of heat and the treatment gas. Sometimes the fuel is supplemented by recirculating the contaminated off gas from the treated soil to the burn chamber as additional fuel. Other processes have used fresh air, or inert air as the treatment gas, and heat the treatment gas indirectly in a heat exchanger prior to introducing the gas to the soil or heat the soil and not heat the treatment gas.

Nearly all prior art processes use combustion of fossil fuel as a heat source. This has undesirable consequences of forming incomplete products of combustion, oxides of nitrogen and sulfur, and other greenhouse gases as a by-product. Combustion also has the potential to add unburned hydrocarbon to the process exhaust gas if strict control of the combustion process is not maintained.

A variety of temperatures have been used for the treatment and in control of the off-gas temperature, which is indicative of soil temperature. The temperature and time at temperature may be varied depending on the specific characteristics of the soil and contaminants.

The advantages of a static process using a container are that the container can provide for ease of loading and unloading material reducing labor when compared with pile arrangements, and it does not require high energy costs for material handling when compared to continuous processing arrangements. A disadvantage of these prior art container arrangements is they require handling the soil to move it from the container in which it was placed after excavation, which presumably would be a dump truck hopper, load it into the treatment container for treatment, and then handle it again following treatment to put in back into the dump truck hopper disposition. Treatment containers are typically turned upside down to empty treated soils, which can create a physical hazard to site workers. The current disclosure provides a three-element flow through assembly to contain, transport and treat PFAS contaminated soil or sludge. The upper two elements of the assembly are simply lifted with a forklift where the treated soil falls out of the bottom of the assembly. The third flow through element base is lifted from the treated soil pile with a forklift making easy safe unloading operations.

Static arrangements are perhaps the most cost-effective treatment option for large scale situations; however, static arrangements outlined in prior art have issues related to treatment gas and contaminant transport through porous media. This is especially true for higher molecular weight compounds present in saturated fine grain soils. Static arrangement effectiveness is dependent on soil type, moisture concentration and type of contaminant. Saturated fine grain soil contaminated with a high molecular weight compounds such as crude oil or PFAS will not be effectively treated by static arrangements. Air flow is minimal through saturated fine grain soils rendering static arrangements not effective. In drier more permeable soils, high molecular weight compounds will evaporate then re-condense when cooler portions of the soil bed are encountered as the treatment gases move through the soil bed (porous flow conditions). Large thermal gradients in static arrangements cause pyroelectric and piezoelectric currents that impact PFAS removal effectiveness. These phenomena result in longer treatment times that increase energy consumption and incomplete treatment. Bench and pilot testing are required to assess static arrangement effectiveness for each project.

Another issue related to static arrangements is the nature of treatment gas movement through the soil bed. All prior art technologies move treatment gases through the porous media (porous flow conditions) from an entry point to an exit point. The issue with the concept is that soils near the entry point are quickly treated while the exit point soils are treated last. The entry soils are continually heated beyond what is necessary for effective treatment, which is a waste of energy and can generate HF from PFAS soils. Soil is a poor conductor of heat, which cause large thermal gradients over significant distances and cause pyroelectric current generation. None of the prior art consider techniques to modify soil thermal resistivity as a means of efficient soil heating and flattening thermal gradients.

As mentioned above, moving hot air through soil creates re-condensation issues within the soil bed. Further, the pile arrangements typically treat the entire pile at once, which require larger blower, heater and vapor treatment apparatus. These larger equipment requirements create a limit of how large the pile arrangement can be, which in turn impacts the scalability of the device. There is no precision in the application of energy due to the nature of treatment gas flow through porous media. Soils at the entry point are repeatedly treated when treatment is complete and soils at the exit received minimal treatment. The lack of precision in energy application creates a cumulative waste in energy through a large project and poses significant risk of HF formation when removing PFAS.

The current disclosure contemplates fluids treatment as part of a multimedia treatment system. One aspect of the fluid treatment is the concept of concentrating surface excess. Surface excess is a term of art referring to amphiphilic compounds populating the surface of a fluid/water body interface (high energy surface). The vast majority of amphiphilic mass is found at or near the air/fluid interface.

The presence of salts reduces repulsive forces between the amphiphilic polar heads, which allow a higher concentration of amphiphilic compounds to occupy the interface. PFAS Micelles are also found near the surface. Residual monomer PFAS is found in the bulk of the fluid (away from the interface) in low concentrations.

U.S. Pat. No. 10,259,730 (Ball, et al.) teaches that PFAS can be separated through passing air through a fluid to create a foam. The patent goes on to say that PFAS is transferred to the foam where the foam is separated from the fluids. The patent indicates that a partial destruction can be accomplished through oxidation. Foam fractionation has been around for decades. The Ball patent does not teach anything related to surface excess. Further, the Ball patent does not mention that PFAS released to the environment is a mixture and not a pure chemical. PFAS occur as microemulsions, which is the framework of foam production. Emulsions are created through physical shearing and introduction of air bubbles into a solution. Microemulsions are a mixture of salt, oil, and surfactants that can support an emulsion or foam. PFAS does not transfer to foam, it is the foam. AFFF concentrate microemulsions are designed to create foam.

The current disclosure uses a two-stage process to 1) create a surface excess complex, which is removed for drying/ultimate disposal and 2) a removal process for residual PFAS monomers. When creating a foam from PFAS contaminated water, long chain PFAS generally create the framework of the foam. When long chain PFAS form foams, short chain and partially fluorinated PFAS self-assemble on the foam/water interface. PFAS is present in the foam, at the foam/water interface and just below the foam/water interface. The Ball patent only recovers a portion of the PFAS population and does not include means or methods to remove foam. The Ball patent removes the foam for the purpose of partial destruction of PFAS through oxidation. The current disclosure uses the complete surface excess profile to remove short and long chain PFAS for drying and off-site disposal; no destruction of PFAS.

The fluids treatment line of the present disclosure uses system vacuum to draw outside air through the surface excess concentrator via vented purge lines where air bubbles are formed to create a foam. The foam, the foam/water interface and just below the foam/water interface together contain a saturated PFAS layer. The foam largely contains long chain PFAS while the interface largely contains shorter chain PFAS and micelles. A rotating belt comprised of a specific surface energy profile separates the foam, the interface and the micelles from the bulk of the fluids. The foam and fluids are drawn by the applied system vacuum into the Brine Pot Evaporator where they are dried to a powder. The treated bulk fluids exit the Surface Excess Separator from the bottom (below the surface) and are routed to the Aqueous Phase Galvanic Separator where galvanic currents offer high energy interfaces of varying charges for monomeric PFAS compounds to self-assemble. The galvanic filter media can be recharged in the Polarity Conversion Unit for reuse.

The use of polarity conversion is a unique process to disconnect amphiphilic nonvolatile PFAS compounds from a variety of media. The polarity conversion process also can remove classic regulated organic compounds that are commonly found comingled with PFAS at release sites.

The presently disclosed apparatus and method use a physiochemical PFAS vapor emissions treatment system to provide system vacuum and vapor conveyance for 1) a Polarity Conversion Unit for PFAS removal from soil, sludges, rechargeable PFAS galvanic filter media and objects, 2) a fluids treatment line for PFAS removal from water, brines, foams and colloids, and 3) a hard surface amphiphilic decontamination device for removal of PFAS films. The presently disclosed apparatus and methods can remove classic organic contaminants mixed with PFAS and cleaved hydrocarbons generated through degradation of partially fluorinated PFAS. The technology is intended to use the three implements outlined above for cleaning PFAS releases to the environment, providing a means to remove PFAS from landfill leachate, landfill gas, sewer plant waste water, sewer plant biosolids, and for hard metal and concrete surfaces.

The physiochemical emissions treatment system uses a combination of devices to remove PFAS and classic organic compounds from treatment gases coming from the various implements (Polarity Conversion Unit, fluids treatment, hard surface Amphiphilic Decontamination). The primary emissions treatment device for PFAS removal is the Vapor Conversion Tank where cooling fluids cause PFAS aggregation. The chemistry of the cooling fluids combined with rapid cooling through direct fine spray into the treatment gas cause pre-micellular aggregates and liquid crystals to form, which are removed through physical filtration. The cooling fluid temperature is regulated to remain above ambient outdoor temperatures to prevent water vapor condensation inside the vapor Conversion Tank. After vapor cooling, the Gibbs energy curtain situated inside the Vapor Conversion Tank is designed to condense compounds of matching energies (same or similar polar and dispersive surface energy profile as condensed compounds). The Gibbs Energy Curtain tines are removed when completely coated with contaminant for safe off-site disposal. Residual vapor phase PFAS are removed with the Vapor Phase Galvanic Separator, which uses adjustable granular metal galvanic cells of high surface area to offer high energy interfaces of varying charges for PFAS to self-assemble. The galvanic media is recharged in the Polarity Conversion Unit. Other emissions treatment elements include a cyclone dust separator, an electric catalytic oxidizer and granulated activated carbon vessels to remove classic contaminants prior to discharge to the atmosphere. The electric catalytic oxidizer and granulated activated carbon vessels offer a method to measure cleaved hydrocarbons, which offers an indirect measurement of Polyfluoroalkyl substances (fluorine unsaturated) or PFAS Dark Matter.

The primary implement, Polarity Conversion Unit, is an automated, adjustable, static, enclosed arrangement that uses transportable "flow through" treatment vessels to efficiently remove PFAS (linear and branched isomers), PFAS amphiphilic stabilized emulsions, microemulsions, monomeric amphiphiles and classic organic contaminants and assorted mixtures thereof from a variety of media including 1) porous media such as a mixture of soil, gravel, rocks, sediments or other porous media, 2) colloidal sludges such as flocculent sludge, wastewater biosolids, paper sludges and other colloidal matter, 3) vapor and aqueous phase rechargeable PFAS galvanic filter media and 4) objects such as down hole drilling implements and excavator implements such as wheel loader buckets. The entire assembly uses static geometry, high surface area, treatment gas temperature and velocity modulation to reduce thermal resistivity of the media under treatment. Treatment gas is sequentially routed around vertical shaped media beds where efficient thermal energy distribution flattens thermal gradients and disorganizes surface polarities (Gibbs free energy/Coulombs interactions) that disconnect amphiphilic compounds and associated mixtures from high energy interfaces.

Soil and sludges are treated by using a three-element flow through assembly for containment, transport and treatment; Soil Slip Base Framework, Soil Slip, and Static Soil Shaping Screen. The loaded assembly is placed into the Polarity Conversion Unit. Treatment gas is routed around vertically shaped soil/sludge beds of high surface area in small sections to alter surface polarity within the bed. Treatment gas (air) is modulated for velocity and temperature.

In combination with vertical and horizontal geometry of the open treatment gas pathway, thermal resistivity is reduced along the soil/sludge surfaces allowing fast penetration of thermal energy into the media under treatment. The thermal energy disorganizes surface polarity within the media releasing nonvolatile amphiphilic PFAS compounds. This is exactly what happens when metal reaches its curry point temperature; metal loses its magnetism at specific temperature due to disorganized polarity within the metallic crystal structure (within the bulk and the surface). Rechargeable galvanic PFAS filter media is the same size as the Soil Slip assembly and can be recharged the same method as the soil and sludge. Objects such as drilling rod and earth moving equipment implements (excavator buckets) can be placed on a flow though base and decontaminated in the Polarity Conversion Unit.

The fluids treatment line of the present apparatus uses system vacuum to draw outside air through fluids in the Surface Excess Concentrator where air bubbles are foamed creating a foam and a saturated PFAS interface (surface excess complex). The foam largely contains long chain PFAS while the saturated interface largely contains shorter chain PFAS and micelles just below the interface. A rotating belt comprised of a specific surface energy profile (polar and dispersive energy similar to PFAS contaminant) separates the foam, the interface and the micelles from the bulk of the fluids. The foam and fluids are drawn by the applied system vacuum into the Brine Pot Evaporator where they are dried to a powder in an isolated batch process. The treated bulk fluids exit the Surface Excess Separator from the bottom (below the surface) and are routed to the Aqueous Phase Galvanic Separator where galvanic currents offer high energy interfaces of varying charges for residual monomeric PFAS compounds to self-assemble. The galvanic filter media can be recharged in the Polarity Conversion Unit for reuse.

The third implement of the present disclosure is the amphiphilic decontamination on hard surfaces and objects. Hard surfaces such as airport runways and dump truck beds can be decontaminated using the Amphiphilic Decontamination Wand where static geometry, surface area, treatment gas temperature and velocity modulation lowers thermal resistivity and disorganizes surface polarity. System vacuum contains and conveys PFAS to the vapor emissions treatment line.

Selected embodiments of the disclosure include the use of a multimedia technology aspect to serve safe treatment needs for PFAS, classic regulated organic compounds and mixtures thereof in soil, sludge, fluids, foams, metallic objects, hard surfaces and air.

The present disclosure can also include the use of high surface area available for treatment.

The present disclosure can also include the use of surface polarity (Gibbs free energy/Coulombs interactions) conversion to break adhesion of amphiphilic PFAS compounds from interfaces.

The present disclosure can also include the use of treatment gas temperature modulation and velocity modulation as a method to reduce surface thermal resistivity.

The present disclosure can also include the use of vertical and horizontal geometry of open-air gaps to further reduce the surface thermal resistivity.

The present disclosure can also include a flameless heat source allowing temperature control and the use of the apparatus in restrictive air basins The present disclosure can also include non-destructive techniques to safely remove and condense PFAS from a variety of media.

The present disclosure can also include sequential treatment; treating small sections at a time.

The present disclosure can also include the three-element soil/sludge flow through vessel assembly that allows media transport, treatment, top loading and bottom empty capabilities.

The present disclosure can also include the ability to perform fractional treatment (different application temperatures at different stages of treatment) of compound mixtures.

The present disclosure can also include the ability to selectively treat vapors of classic regulated organic compounds separately from PFAS compounds.

The present disclosure can also include the condensation of PFAS vapors using a physiochemical direct fluid spray process creating PFAS pre-micellular aggregates and liquid crystals, which are removed through filtration of the recycled cooling fluid.

The present disclosure can also include the use of polar and dispersive surface energy ratio matching as a means of condensing compounds from vapors.

The present disclosure can also include the use of rechargeable galvanic filter media to remove amphiphilic PFAS compounds from air and fluids using galvanic currents or impressed currents.

The present disclosure can also include the use of replaceable and adjustable granular galvanic media for establishment of a galvanic cell.

The present disclosure can also include maintaining a vacuum over the entire system.

The present disclosure can also include the use of a three-element soil slip flow-through assembly where portions of the assembly can be used for rechargeable filter recharge and metallic object decontamination.

The present disclosure can also include an adjustable vapor emission line assembly.

The present disclosure can also include a fluids treatment line assembly.

The present disclosure can also include the ability to dry high concentrate PFAS fluids and foams while treating emissions generated from the drying process.

The present disclosure can also include the ability to concentrate long chain PFAS, short chain PFAS and PFAS micelles into foam and a high concentrate surface fluid layer mixture.

The present disclosure can also include the use of a rotating belt to remove PFAS foam and surface fluids through rotation speed and surface energy (Gibbs surface energy) matching.

The present disclosure can also include the use of an amphiphilic decontamination wand to remove amphiphilic PFAS compounds from hard surfaces like metal and concrete.

The present disclosure can also include the safe and non-destructive removal of PFAS, which can then be dried to a powder for safe off-site disposal.

The present disclosure can also include the ability to use a system vacuum and vapor emissions treatment line assembly to safely remove dried PFAS powder and the powder into a standard disposal drum.

The present disclosure can also not produce oxides of nitrogen (Nox), oxides of sulfur (Sox), particulate matter (PM), HF or PFAS emissions allowing its use in restrictive air basins.

The present disclosure can also include batch processing that allows measurement of wet density, dry density and contaminant intensity in treated media for every batch allowing macro-sampling and analysis maps to be generated in real time during site cleanup operations.

The present disclosure can also include the reduction of thermal gradients within the media under treatment as a means to reduce pyroelectric and piezoelectric currents; currents caused by steep thermal gradients that redistribute PFAS within the media under treatment.

The present disclosure can also include the ability to perform a macro Total Oxidizable Precursor Assay for unsaturated Polyfluoroalkyl Substances (PFAS Dark Matter) using a electric catalytic oxidizer exotherm to measure cleaved hydrocarbon mass during fractional treatment.

LIST OF REFERENCE NUMBERS

The following reference numbers are used in the drawings to refer to selected components and aspects of the present disclosure, including a brief description of their purpose.

| Ref. no. | Component/Aspect | Purpose |
|---|---|---|
| 1 | Polarity Conversion Unit | Provides sealed contained treatment, sectional/sequential treatment, modulation of treatment gas, and velocity modulation of the treatment gas. |
| 2 | Blower | Provides velocity modulation of the treatment gas. |
| 3 | Heater | Provides flameless temperature modulation of the treatment gas. |
| 4 | Modified Sintercraft Pad | Provides system vacuum, sectional and sequential treatment in concert with the Polarity Conversion Unit. |
| 5 | Individual Extraction Line | Provides applied vacuum to system and treatment gas conveyance. |
| 6 | Vapor Extraction Isolation Damper | Isolates treatment gas flow within the system; directs applied vacuum and directional flow. |
| 7 | Vapor Extraction Manifold | Creates isolated treatment zones. |
| 8 | Cyclone Dust Separator | Static in-line system that removes fugitive dusts from the extraction line prior to emissions treatment system. |
| 9 | Catalytic Oxidizer Bypass Damper | Isolates Catalytic Oxidizer in order for it to be on line or by-passed depending on contaminant under treatment or stage of treatment. |
| 10 | Electric Catalytic Oxidizer | Destroys classic organic contaminants such as fuel range hydrocarbons and cleaved hydrocarbons using flameless oxidation and measures contaminant mass through the catalyst exotherm (temperature rise across the catalyst through time). |
| 11 | Cooling Chase | Cooling hot air through direct injection of fluid of varying droplet size. |
| 12 | Cooling Chase Cooling Fluid Line | Cooling Fluid recirculated from the Vapor Conversion Tank. |
| 13 | Mist Chamber | Small fluid droplets injected to create an evaporative environment for water |
| 14 | Vapor Conversion Tank | Condenses PFAS through a physiochemical process. |
| 15 | Gibbs Energy Curtain Access | Disposable curtain materials selected to match energy of condensed contaminant; matching polar and dispersive energy profiles of contaminant and curtain material |
| 16 | Purge Line | Using system vacuum, ambient air is drawn into the Vapor Conversation tank to cool the fluid, create increased surface area within the fluid and to maintain fluid temperature above ambient temperature. |
| 17 | Vapor Conversion Tank Demister Tower | Removes residual mists through large cross-sectional area of the tower, tower height and a demister screen. |
| 18 | Filter Housing | Removes pre-micellular aggregate and liquid crystals precipitated within the cooling fluid. |
| 19 | Jet Pump | Removes cooling fluid from the Vapor Conversion Tank and delivers the fluid to the Cooling Chase and Mist Chamber. |
| 20 | First Vapor Extraction Blower (in series) | First system vacuum extraction blower that provides system vacuum and treatment gas conveyance. |
| 21 | Bearing Cooling Water Tank (First Blower) | Stores water that is circulated through the Vapor Extraction Blower to cool the bearings during operation. |

-continued

| Ref. no. | Component/Aspect | Purpose |
| --- | --- | --- |
| 22 | Vapor Phase Galvanic Separator | Uses galvanic currents (galvanic or impressed currents) to offer high energy interfaces of varying charges to cause amphiphilic PFAS self-assembly on the galvanic media in vapor phase. |
| 23 | Vapor Phase Granulated Activated Carbon Vessel (2 in series) | Uses vapor phase granular activated carbon to absorb residual PFAS as a final emissions treatment. |
| 24 | Second Vapor Extraction Blower (in series) | Second system vacuum extraction blower in series that provides system vacuum and treatment conveyance for the vapor phase galvanic separator and vapor phase granular activated carbon treatment systems. |
| 25 | Bearing Cooling Water Tank (Second Blower) | Stores water that is circulated through the Vapor Extraction Blower to cool the bearings during operatio. |
| 26 | Vent Stack | Provides the final exit of treated treatment gases at elevation. |
| 27 | Vent Stack Weather Cover | Protects vent Stack from weather intrusion. |
| 28 | Brine Tank Vapor Extraction Line (Connects to 7) | System vacuum and vapor conveyance is applied to the fluids treatment assembly line. |
| 29 | Brine Pot Evaporator | Assembly dries, in isolated batch runs, accumulated fluids/foams to a powder by drawing hot treatment gases through fluids in tank; tank connected to emission treatment line. |
| 30 | Brine Pot Demister Tower | Removes residual mists through large cross-sectional area of the tower, tower height and a demister screen. |
| 31 | Blower | Provides air to flameless heater. |
| 32 | Heater | Provides flameless heat drawn through fluids for evaporation/drying. |
| 33 | Vapor/Foam/Fluids Extraction Line/Valve | Provides system vacuum to Surface Excess Concentrator headspace and conveyance of foam/fluid mixture to the Brine Pot Evaporator. |
| 34 | Amphiphilic Decontamination Wand Flexible Extraction Line/Valve | Provides connection to system vacuum, emissions treatment and conveyance of PFAS vapors from the Amphiphilic Decontamination Wand to the emissions treatment line. |
| 35 | Amphiphilic Decontamination Wand | Provides temperature and velocity modulated treatment gas directly to hard surfaces under a shroud to alter surface polarity for amphiphilic PFAS removal. |
| 36 | First Fluids Pump (in series) | Provide conveyance of fluids to the fluid treatment line assembly. |
| 37 | Surface Excess Concentrator | Provides mechanisms to concentrate and remove surface excess in foam and the upper surface of the fluids; removes long chain PFAS (in foam) and short chain PFAS (at fluid surface) and PFAS micelles just below the surface. |
| 38 | Surface Excess Concentrator Purge Lines | Using system vacuum, ambient air is drawn through the purge lines and through the fluids tank to create bubbles, which in turn concentrates long chain PFAS in foam, short chain PFAS at the fluid surface and PFAS micelles just below the surface. |
| 39 | Aqueous Phase Galvanic Separator (2 in series) | Uses galvanic currents (galvanic or impressed currents) to offer high energy interfaces of varying charges to cause amphiphilic PFAS self-assembly on the galvanic media in aqueous conditions. |
| 40 | Second Fluids Pump (in series) | Provides conveyance of treated fluids to final discharge point. |
| 41 | Powder Vacuum Assembly | Provides safe means to remove dried PFAS powder from the Brine Pot Evaporator or other areas of the apparatus using the system vacuum, vapor/powder conveyance and emissions treatment. The powder is deposited into a standard storage drum. |
| 42 | Catalytic Oxidizer Dilution Valve | In the event of an over-temperature situation in the catalyst bed, the dilution valve is opened where system vacuum draws cool ambient outside air into the catalyst bed for cooling. High hydrocarbon concentration is the primary cause for an over-temperature situation. |

-continued

| Ref. no. | Component/Aspect | Purpose |
|---|---|---|
| 43 | Blower/Heater Isolation Damper | Provides a means to isolate a given Blower/Heater assembly from the Polarity Conversion Unit when the given Blower/Heater assembly is not in operation. |
| 44 | Soil Slip Base Framework | Provides a multi-purpose flow-through framework base for treatment of soil, sludges and objects. The Base accommodates the Soil Slip Assembly including the Soil Shaping Screen or rechargeable filter media (from the Galvanic Separators). The Base has forklift pockets to accommodate transport of a variety of assemblies for treatment. |
| 45 | Soil Slip Base Framework used to Decontaminate Objects | Provides a transportable flow through framework base to accommodate decontamination of metallic implements such as drilling implements and excavator buckets. Metallic surfaces are high energy interfaces where amphiphilic PFAS will self-assemble; disorganizing surface polarity removes amphiphiles. |
| 46 | Vapor Extraction Trunk Line | Provides vapor conveyance from implements to emissions treatment assembly and provides system vacuum. |
| 47 | Brine Pot Evaporator Connection Valve | Provides system vacuum, vapor conveyance and emission treatment connection for the Brine Pot Evaporator and other fluid line treatment elements. |
| 48 | Brine Pot Vapor Extraction Line Damper Valve | Provides Brine Pot Evaporator isolation when off line. |
| 49 | Static Soil Shaping Screen Assembly | Provides a means to create shapes for soil or sludge with specific shaped air gaps where treatment gas can be drawn around the shaped vertical beds. The Static Soil Shaping Screen geometry is designed to offer high surface area and create low thermal resistivity along the soil bed surfaces. Modulating treatment gas temperature and velocity further reduces thermal resistivity at the soil bed surfaces. |
| 50 | Soil Slip | Provide four walls to contain soil and sludge in concert with the Static Soil Shaping Screen and Soil Slip Base Framework; all flow-through structures that can accommodate treatment, top loading, transport and bottom empty capability after treatment. |
| 51 | Isolated Vapor Extraction Chamber | Provide a means to isolate treatment to a small section using damper valve. |
| 52 | Soil Retention Tab | Within the Soil Slip Base Framework, provides a bottom to retain soil or sludge held in the Static Soil Shaping Screen and Soil Slip. Accommodates treatment air flowing around shaped vertical soil or sludge beds. |
| 53 | Flow through Air Gap | Within the Soil Slip Base Framework, provides an air gap for treatment gases to freely flow around shaped vertical soil or sludge beds. |
| 54 | Forklift Pockets | Provides a means to transport a variety of assemblies for treatment. |
| 55 | Isolated Vapor Extraction Chamber Register | Allows for Soil Slip Assemblies to be placed into the Polarity Conversion Unit in either direction; no front or back to Soil Slip assembly. |
| 56 | Soil Slip Open Top and Bottom | The Soil Slip is part of a three-element system to contain, top load, transport, treat and bottom empty treated media. The Soil Slip is a flow through device with on top and bottom; just four walls. |
| 57 | Soil Slot | Provides a space for soil or sludge to occupy during transport and treatment. The space offers a high reactive surface area for concentrated temperature and velocity modulated treatment gas to flow across. The surface area is designed in such a way to reduce thermal resistivity, which in turn alters surface polarity that triggers amphiphilic PFAS to lose adhesion to surfaces. |
| 58 | Air Gap | Provide a space for treatment gas to flow across vertical soil beds where temperature and velocity can be modulated to reduce thermal resistivity and in turn disorganize surface polarity. |

-continued

| Ref. no. | Component/Aspect | Purpose |
| --- | --- | --- |
| 59 | Air Gap Cover | Prevent soil or sludge from entering the air gap. |
| 60 | Soil Fill Line | Designates the level for soil or sludge to be filled up to. |
| 61 | Vapor Conversion Tank Cooling Fluid Return Line | Provides conveyance for cooling fluid from the bottom of the Vapor Conversion Tank through the Filter housing to the Jet Pump. |
| 62 | Cooling Chase Spray Nozzle | Provides a fan spray array across the vapor flow path for cooling. |
| 63 | Vapor Conversion Tank View Window | Provides visual observation inside the Vapor Conversion Tank. |
| 64 | Vapor Conversion Tank Fluid Sample Port | Provides a means to sample the cooling fluid at the bottom of the tank. |
| 65 | Vapor Conversion Tank Access Hatch | Provides access to the inside of the Vapor Conversion Tank for maintenance. |
| 66 | Vapor Conversion Tank Gibbs Energy Curtain | Provides surface area for surface energy matching condensation. The curtain material is designed to match the polar and dispersive surface energy of the condensing contaminant. |
| 67 | Vapor Conversion Tank Vapor Diversion Baffle | Provides a vapor pathway that will shed mists and further cool vapors prior to exiting the Vapor Conversion Tank. |
| 68 | Fluid Level | The optimum level of cooling fluid. |
| 69 | Vapor Conversion Tank Cooling Fluid | The cooling fluid is primarily water with additives including alcohols, salts, hydrocarbon surfactant and urea (one or more of these additives). |
| 70 | Gibbs Energy Curtain Tab | The energy matching material in which a contaminant will condense due to polar and dispersive energy matching. |
| 71 | Gibbs Energy Curtain Air Gap | Allows treatment gases to pass through for further treatment. |
| 72 | Vapor Phase Galvanic Separator Tank Lid | Provides a vapor tight seal to the Galvanic Separator Housing. |
| 73 | Vapor Phase Galvanic Separator Inlet | Provides an entrance to treatment gas where the cross-sectional area increases as the vapor approaches the galvanic filter media to slow gas velocity. |
| 74 | Vapor Phase Galvanic Separator Outlet | Provides an exit for the treatment gas. |
| 75 | Vapor Phase Galvanic Separator Granular Metal Slot | Provides a vertical bed for granular metal particles of varying galvanic energies. The granular nature of the metal particles offers high surface area in a small space. Further, the volume of the anodic metal particles can be reduced in mass to increase the electrical voltage across the galvanic cell. |
| 76 | Vapor Phase Galvanic Separator Granular Desiccant Bridge Slot | Provides a vertical bed for granular desiccant media to bridge between the various granular metal vertical beds. Desiccant absorbs water, which will conduct electrical energy between the galvanic cell members. |
| 77 | Vapor Phase Galvanic Separator Rechargeable Filter Media | The filter media is rechargeable. The charge distribution across the galvanic cell offers multiple charge scenarios (high energy interfaces) for different charged amphiphilic PFAS to occupy different portions of the cell. As the surface area of the granular metallic media becomes occupied with a self-assembled amphiphilic PFAS monolayers, the voltage decreases due to reduced galvanic potential. Voltage drops across the galvanic cell indicates the degree of amphiphilic PFAS self-assembly that has occurred across the galvanic cell. The media is recharged by placing the media in a Soil Slip Assembly and treating the assembly in the Polarity Conversion Unit. |
| 78 | Brine Pot Access Hatch | Provides access to the interior of the Brine Pot Evaporator. |
| 79 | Brine Pot Fluid Level Window | Provides a view of fluids level. |
| 80 | Brine Pot Water Spray Foam Knock Down Assembly | Provides a method to knock down accumulated foams for treatment. High pressure bursts of cooling fluid from the Vapor Conversion Tank provide a means to break down foam structure and reduce foam levels. |
| 81 | Brine Pot Drain Valve | Provides a means to drain the brine Pot Evaporator Tank. |

-continued

| Ref. no. | Component/Aspect | Purpose |
|---|---|---|
| 82 | Brine Pot Purge Lines | Provides the conveyance for heated air to be drawn through the fluids in the Brine Pot Evaporator. Heated are, up to 1,100 F. evaporate the fluids in the tank. |
| 83 | Brine Pot Water Spray Foam Knock Down Spray Nozzle | Provides a wide fan of high-pressure cooling fluid from the vapor Conversion Tank to break down accumulated foam structure and reduce foam levels. |
| 84 | Brine Pot Evaporator Fluid level | The optimal fluid level for evaporation. |
| 85 | Surface Excess Concentrator Inlet | Provides entry of untreated fluids into the Surface Excess Concentrator. |
| 86 | Surface Excess Concentrator Outlet | Provides an exit for treated fluids. The intake of the exit is located at the bottom of the Fluids Process Tank (92), which is away from the surface excess present in the resulting foam and layer of fluids at the foam fluid interface. The outlet is at the same elevation as the inlet to maintain gravity flow. |
| 87 | Surface Excess Concentrator Foam Belt | Provide separation of the foam and the foam/fluid interface through belt rotation speed and polar and dispersive energy matching the belt media with the contaminant. |
| 88 | Surface Excess Concentrator Fluids Process Tank | Provides space for fluids treatment that concentrates surface excess within the range of the belt (87). |
| 89 | Surface Excess Concentrator Foam Tank | Provides a means to apply system vacuum over the entire unit and vapor/foam/fluids conveyance to the Brine Pot Evaporator. The foam and fluid concentrate are drawn to the Brine Pot Evaporator by the applied system vacuum. |
| 90 | Surface Excess Concentrator Fluids Exit Piping (bottom Intake in Fluids Process Tank) | Provides a means to allow treated fluids to exit without contacting the concentrated surface excess zones. |
| 91 | Surface Excess Concentrator Access Hatch | Provides access to the interior of the vessel. |
| 92 | Surface Excess Concentrator Fluids Exit Piping Bottom Intake in (88) | Provides bottom exit of the Fluids Process Tank, which is away from the concentrated surface excess present in the resulting foam and layer of fluids at the foam fluid interface. |
| 93 | Foam | Foam is generated by outside air, drawn from system vacuum, passing through the fluids. Long chain PFAS are typically incorporated into foams |
| 94 | Fluids Level in Fluids Process Tank | Provides a means to measure fluids level in the tank. |
| 95 | Aqueous Phase Galvanic Separator Inlet | Provides access into the Aqueous Phase Galvanic Separator. |
| 96 | Aqueous Phase Galvanic Separator Lid | Provides access into Aqueous Phase Galvanic Separator. |
| 97 | Aqueous Phase Galvanic Separator Outlet | Provides an exit for treated fluids. |
| 98 | Aqueous Phase Galvanic Separator Granular Metal Slot | Provides a vertical bed for granular metal particles of varying galvanic energies. The granular nature of the metal particles offers high surface area in a small space. Further the volume of the anodic metal particles can be reduced in mass to increase the electrical voltage across the galvanic cell. |
| 99 | Aqueous Phase Galvanic Separator Granular Molecular Sieve Bridge Slot | Provides a vertical bed for granular molecular sieve media to bridge between the various granular metal vertical beds. |
| 100 | Aqueous Phase Galvanic Separator Rechargeable Filter Media | The filter media is rechargeable. The charge distribution across the galvanic cell offers multiple charge scenarios (high energy interfaces) for different charged amphiphilic PFAS to occupy different portions of the cell. As the surface area of the granular metallic media becomes occupied with a self-assembled amphiphilic PFAS monolayers, the voltage decreases due to reduced galvanic potential. Voltage drops across the galvanic cell indicates the degree of amphiphilic PFAS self-assembly |

| Ref. no. | Component/Aspect | Purpose |
|---|---|---|
| | | that has occurred across the galvanic cell. The media is recharged by placing the media in a Soil Slip Assembly and treating the assembly in the Polarity Conversion Unit. |
| 101 | Amphiphilic Wand Hard Pipe Vapor Extraction Handle | Provides vacuum, vapor conveyance and a handle to manipulate the Amphiphilic Decontamination Wand. |
| 102 | Amphiphilic Wand Heater/Blower Assembly | Provides treatment gas (air) to the Amphiphilic Decontamination Wand. Treatment gases are modulated for velocity and temperature. |
| 103 | Amphiphilic Wand Shroud | Provides an enclosed area for decontaminating hard surfaces. |
| 104 | Sediment Baffle | Prevents sediment transport across the floor of the Vapor Conversion Tank. |
| 105 | Access Door into Polarity Conversion Unit | Provides access for loading and unloading soil slip assemblies into and out of the Polarity Conversion Unit. |
| 106 | Light Port | Provides a viewing window that light can be shined into the interior of the Vapor Conversion Tank. |

DESCRIPTION OF AN ILLUSTRATIVE EMBODIMENT

1. Overview

Figure 2:
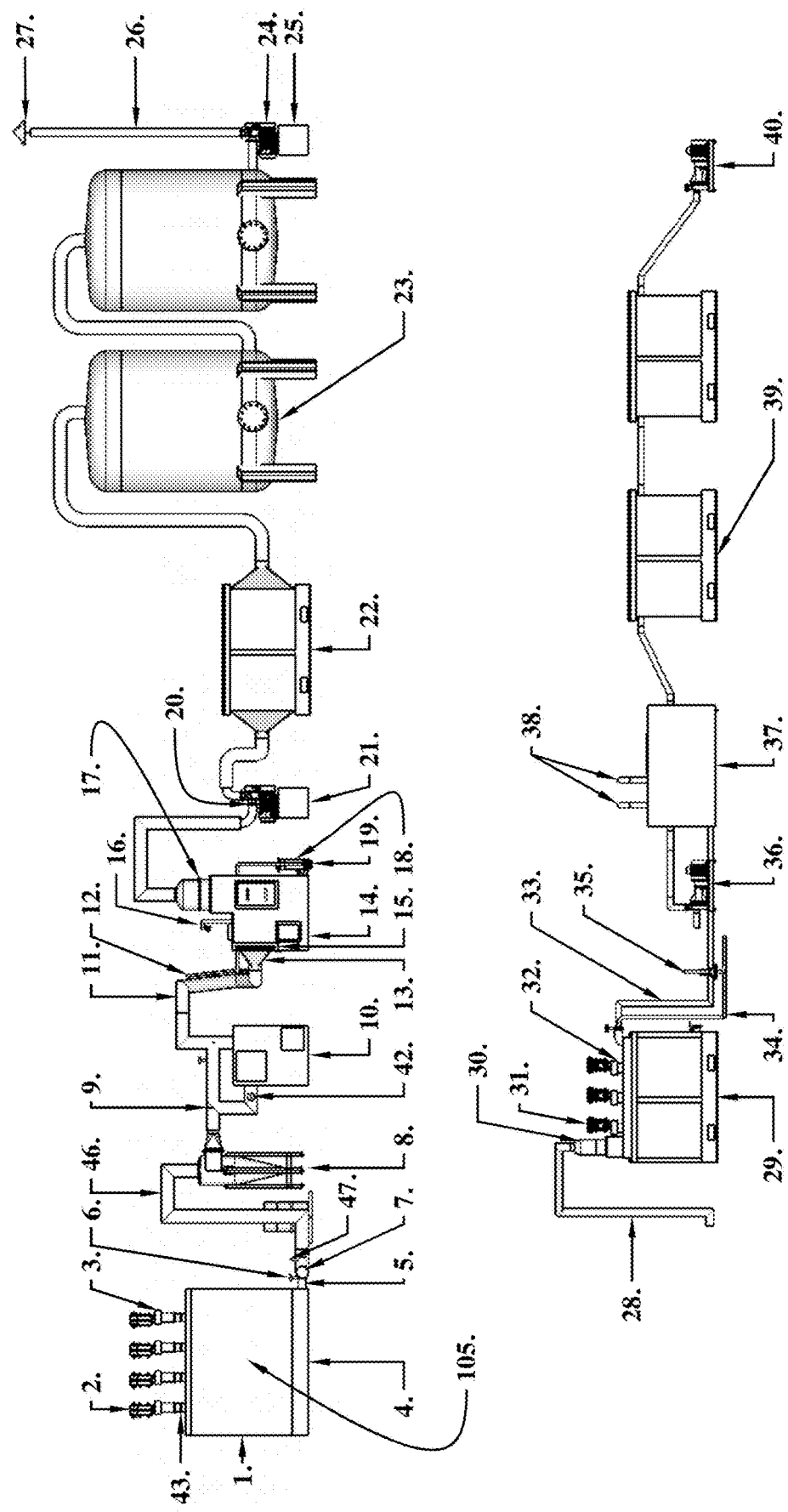
Figure 3:
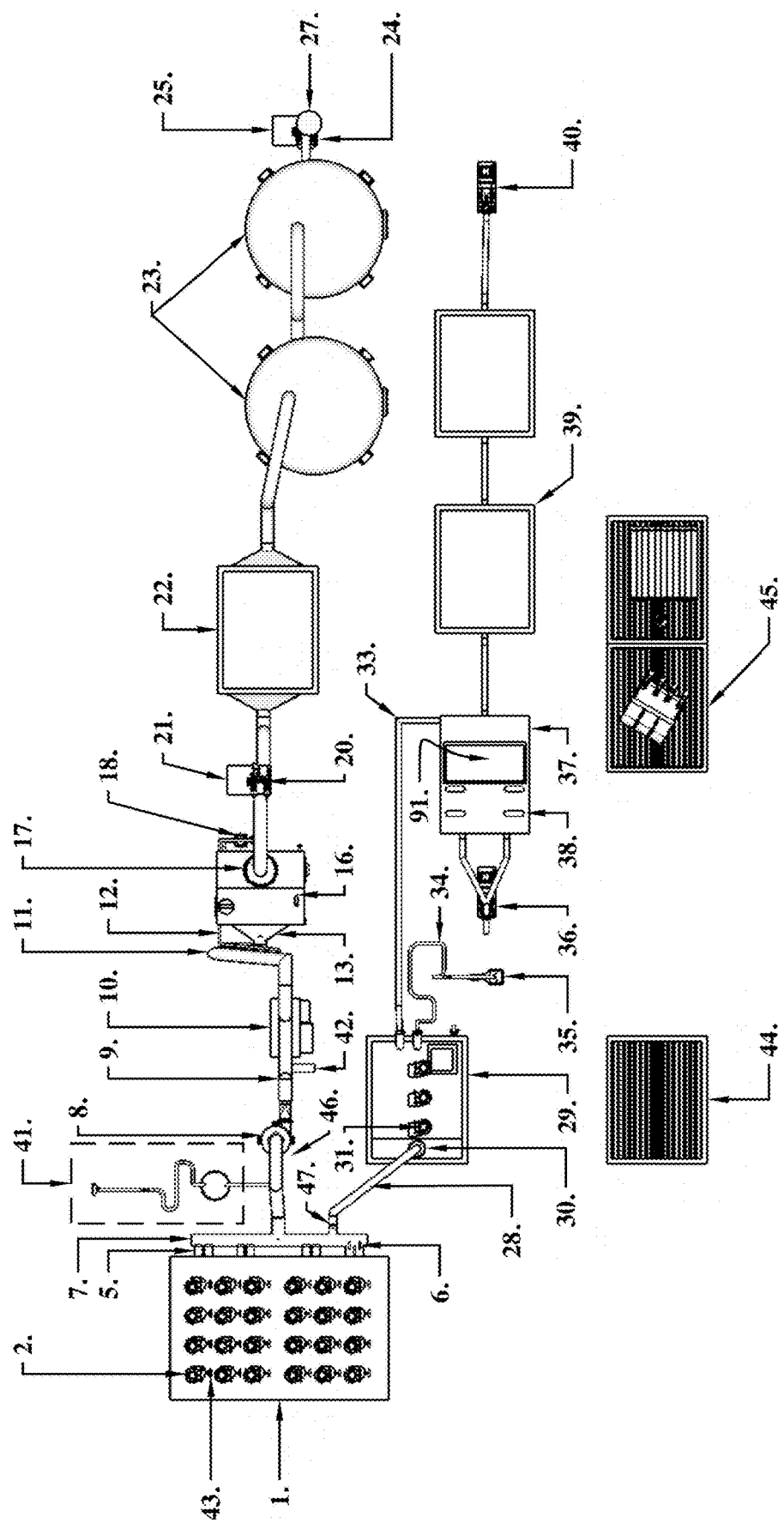

FIG. 1 presents a perspective view of an exemplary embodiment of an apparatus according to the present disclosure (the Sintered Wave Multimedia Polarity Conversion Apparatus). FIG. 2 presents a General Cross Section Including Implements, Vapor Line and Fluids Line Assembly. FIG. 3 presents a General Map View including Implements, Vapor Line and Fluids Line Assemblies. Other Figures present detailed views of the various elements of this apparatus.

The Polarity Conversion Unit (1) provides a means to use a contained arrangement to treat soils, sludges, rechargeable galvanic filter media, and objects. Treatment gases (air) are drawn into the apparatus through a blower(s) (2), which then delivers the air to an electric heater(s) (3). The blower (2) and heater (3) work in conjunction to modulate temperature and velocity delivered into the Polarity Conversion Unit.

There are a number of blower (2) and heater (3) assemblies mounted on top of the Polarity Conversion Unit. Only selected blower (2) and heater (3) assemblies are in operation at any given time providing focused treatment gas delivery to small sections delivered sequentially across the Polarity Conversion Unit (1). Blower (2) and Heater (3) assemblies are isolated from the Polarity Conversion Unit (1) when not in operation by a Blower/Heater assembly Isolation Damper (43). The blower (2) and heater (3) assemblies operate in tandem with the Modified Sintercraft Pad (4) where an individual extraction line (5) can be isolated with an Vapor Extraction Isolation Damper (6). The Vapor Extraction Manifold (7) connects an individual Vapor Extraction Line (5) to the apparatus vapor extraction system and Vapor Line Assembly through the main Vapor Extraction Line to Emissions Treatment (46). The Soil Slip assembly that contains soil, sludge, galvanic filter media or objects are placed inside the Polarity Conversion Unit (1) for treatment through the Access Doors (105) are not shown in FIGS. 2 and 3 and are described in detail in Section 2 below.

As part of the emissions treatment, a Cyclone Dust Separator (8) removes any fugitive dusts that escaped the Polarity Conversion Unit (1). In the event that soils or sludges contain PFAS and Hydrocarbon as co-contaminants the Catalytic Oxidizer Bypass Damper (9) causes the treatment gases to flow through the Electric Catalytic Oxidizer (10) in order to destroy and measure hydrocarbons or cleaved hydrocarbons. An Electric Catalytic Oxidizer is used to limit production of oxides of Nitrogen (Nox) and oxides of Sulphur (Sox) in the emissions. Flame based oxidizers produce Nox and Sox. The electric oxidizer, which has no flame-based heat source, maintains operational temperature below the auto formation temperature of Nox and Sox. In a PFAS/Hydrocarbon co-contaminant situation or during a macro Total Oxidizable Precursor Assay, the Blower (2) and Heater (3) assemblies will operate at lower temperatures to remove the hydrocarbons or cleave hydrocarbons from unsaturated Polyfluoroalkyls before PFAS is released from the soil or sludge. If the concentration of hydrocarbon exceeds a certain pre-set concentration, which could cause the catalyst to over-heat, the Electric Catalytic Oxidizer will activate the Catalytic Oxidizer Dilution Valve (42) to open to cool the catalyst. In turn the Blower (2) and Heater (3) assemblies mounted on the Polarity Conversion Unit (1) will reduce flows and temperature to accommodate catalyst cooling.

When hydrocarbons and/or cleaved hydrocarbons have been removed from the media under treatment, the Blower (2) and Heater (3) assemblies will increase treatment gas temperature and the Catalytic Oxidizer Bypass Damper (9) will be closed causing the treatment gas to bypass the Electric Catalytic Oxidizer (10).

Hot treatment gases enter the Cooling Chase (11) for cooling. The Cooling Chase Cooling Fluid Line (12) delivers cooling fluid through high pressure water jets and misting nozzles mounted in the Cooling Chase (11) and the Mist Chamber (13). Cooling fluids are directly sprayed into the treatment gas for cooling. The fine droplet size and the pressurized delivery cause an evaporative environment to exist within the Cooling Chase (11) and the Mist Chamber (13), which in turn dramatically and rapidly reduces temperature of the treatment gas. In order to prevent water from condensing out of the treatment gas, the cooling fluid is maintained above ambient outdoor temperature. The cooled treatment gas enters the Vapor Conversation Tank (14) where the gas encounters the Gibbs Energy Curtain (not shown in FIG. 2 or 3). The Gibbs Energy Curtain Access (15) allows replacement of disposable elements of the curtain. Internal Purge Lines (16) are located at the bottom of the Vapor Conversion Tank (14) to allow outside air to be drawn into the tank by the applied system vacuum and bubble through the cooling fluid in the tank. The bubbles cool the fluids just above ambient outside temperature and promote mixing within the cooling fluid. Treatment gases flow through the Vapor Conversion Tank (14) around an internal baffle (not shown in FIG. 2 or 3) and up through the Vapor Conversion Tank Demister Tower (17) where the gases flow to other elements of the emissions treatment system. The cooling fluids are continually recycled from the Vapor Conversion Tank (14) where a Filter Housing (18) removes PFAS pre-micellular aggregate and liquids crystals that precipitate when the cooling fluid causes a sudden and rapid drop in temperature in the Cooling Chase (11). Certain chemicals mixed with the cooling fluids enhance the formation of PFAS aggregates and liquids crystals. The Jet Pump (19) draws the cooling fluids out of the Vapor Conversion Tank (14) through the Filter Housing (18) and pushes the filtered cooling fluid through the Cooling Chase Cooling Fluid Line (12) to the Cooling Chase (11) and Mist Chamber (13).

The First Vapor Extraction Blower (in series) (20) applies vacuum pressure and provides treatment gas conveyance for the entire apparatus. The First Vapor Extraction Blower (in series) (20) bearing assembly is cooled with water stored in the Bearing Cooling Water Tank (First Blower) (21). The bearing cooling system allows for a higher tolerance in temperature of the treatment gas.

Treatment gas is then routed into the Vapor Phase Galvanic Separator (22) where residual PFAS that escaped the Vapor Conversation Tank (14) encounter a galvanic sequence of granulated metal that offer high surface area, high energy interfaces of varying charges for amphiphilic self-assembly. The resulting voltage can be galvanic or impressed generated currents. Voltage drops across the galvanic cell indicate active self-assembly and provide an indication of PFAS mass within the filter media. The galvanic filter media can be recharged by placing the filter assembly in the Polarity Conversion Unit (1). Traditional Vapor Phase Granular Activated Carbon Vessels (2 in series) (23) are used as a final emission polishing treatment.

The Vapor Phase Galvanic Separator (22) and the Vapor Phase Granular Activated Carbon Vessels (2 in series) (23) are maintained under vacuum pressure by a Second Vapor Extraction Blower (in series) (24) to prevent any leakage during treatment. The Second Vapor Extraction Blower (in series) (24) bearing assembly is cooled with water stored in the Bearing Cooling Water Tank (Second Blower) (25). The Second Vapor Extraction Blower (in series) (24) discharges the treated clean treatment gas to the Vent Stack (26) and through the Vent Stack Weather Cover (27) to the atmosphere at elevation.

The Fluids Line Assembly is connected to the Vapor Line Assembly through the Brine Pot Evaporator Connection Valve (47), which connects to the Vapor Extraction Manifold (7). System vacuum is used to contain, treat and convey PFAS saturated fluids and foams while providing a means for vapor phase treatment. The Brine Pot Vapor Extraction Line (28) draws PFAS vapors from the Brine Pot Evaporator (29). Vapors exit the Brine Pot Evaporator (29) through the Brine Pot Demister Tower (30), which is designed to remove any mists from the vapor stream before entry into the vapor line assembly. The Brine Pot Evaporator (29) is equipped with a Blower (31) and Heater (32) that provide hot air into the vessel to facilitate drying of PFAS fluids concentrate in an isolated batch process.

The Brine Pot Evaporator (29) has isolated two lines connected to downstream implements. The first line is the Vapor/Foam/Fluids Extraction Line (33) that provides vacuum pressure to the Surface Excess Concentrator (37) and a means of conveyance for separated foam/fluid PFAS concentrate. The second line is the Amphiphilic Decontamination Wand Flexible Extraction Line (34), which provides vacuum pressure and treatment gas conveyance for the Amphiphilic Decontamination Wand (35). The Amphiphilic Decontamination Wand (35) is used to decontaminate hard surfaces such as metal, concrete or other similar hard surfaces where amphiphilic PFAS self-assembly occurs. The Brine Pot Evaporator (29) creates a pressure drop in the vapor stream flow causing foams/fluids to drop out of the vapor stream where all emissions are routed to the vapor line assembly for emissions treatment. Accumulated foams/fluids are subsequently dried into a powder in the Brine Pot Evaporator (29) in a batch process. The Powder Vacuum Assembly (41) is used to remove dried PFAS powder from the Brine Pot Evaporator (29). The Powder Vacuum Assembly (41) is connected to the Vapor Extraction Line to Emissions Treatment (46). System vacuum provides vacuum and powder conveyance into a disposal drum or vessel; the pressure drop in the drum allows for powder accumulation.

The fluids treatment of the disclosed apparatus begins with the First Fluids Pump (in series) (36) where raw untreated fluids such as landfill leachate or sewer plant waste water is drawn into the apparatus. The First Fluids Pump (in series) (36) discharges fluids into the Surface Excess Concentrator (37). Amphiphilic PFAS are attracted to high energy interfaces such as the air/water interface or an air/fluid interface. The accumulation of amphiphilic compounds at the interface is termed "Surface Excess". Once an interface area has been covered by an amphiphilic monolayer, amphiphilic micelles and monomers form within the bulk of the fluids. When the surface excess is removed, micelles and monomers in the bulk will self-assemble at the newly exposed interface. The Surface Excess Concentrator (37) takes advantage of the reliable self-assembly of amphiphilic PFAS compounds as a primary removal technique. System vacuum applied to the Surface Excess Concentrator (37) through the Vapor/Foam/Fluids Extraction Line (33) draws outside air into the Surface Excess Concentrator Purge Lines (38) and through the fluids, which in turn causes foam formation, a saturated PFAS amphiphilic layer at the foam/fluid interface and a PFAS micelle layer just below the surface. The foam and the saturated PFAS amphiphilic layers are removed by the Foam Belt (43) for subsequent treatment. The Foam Belt (87) is designed to have specific polar and dispersive surface energies to match or nearly match PFAS amphiphilic mixtures for maximum adhesion to the belt. The belt speed is modulated to recover the foam and the upper layer of the fluids for removal of the entire surface excess column around the interface. Residual PFAS monomers are treated downstream of the Surface Excess Concentrator (37)

The final treatment for the fluids line is the Aqueous Phase Galvanic Separator (2 in series) (39); two vessels are assembled in series. The Aqueous Phase Galvanic Separator presents a galvanic sequence of granulated metal that offer high surface area, high energy interfaces of varying charges for amphiphilic self-assembly. Voltage drops across the galvanic cell indicate active self-assembly and provide an indication of PFAS mass within the filter media. The galvanic filter media can be recharged by placing the filter assembly in the Polarity Conversion Unit (1). The Second Fluids Pump (in series) (40) provide enough suction to the fluids to overcome the applied vacuum in the Surface Excess Concentrator (37). The Second Fluids Pump (in series) (40) discharges clean treated fluids to an appropriate discharge point.

FIG. 2 presents the map view of the Soil Slip Base Framework (44), which is a flow through multipurpose device. All media arrangements treated in the Polarity Conversion Unit (1) fit onto the Soil Slip Base framework including soil, sludges, rechargeable galvanic media (vapor and aqueous phase) and objects. The Soil Slip Base Framework used to Decontaminate Objects (45) is shown on FIG. 2. Objects, mainly drill implements and excavator implements, are placed on the framework and inserted into the Polarity Conversion Unit (1) where surface polarities are thermally disorganized releasing PFAS amphiphilic films.

2. Detailed Description of Selected Elements of the Illustrative Embodiment

Figure 4:
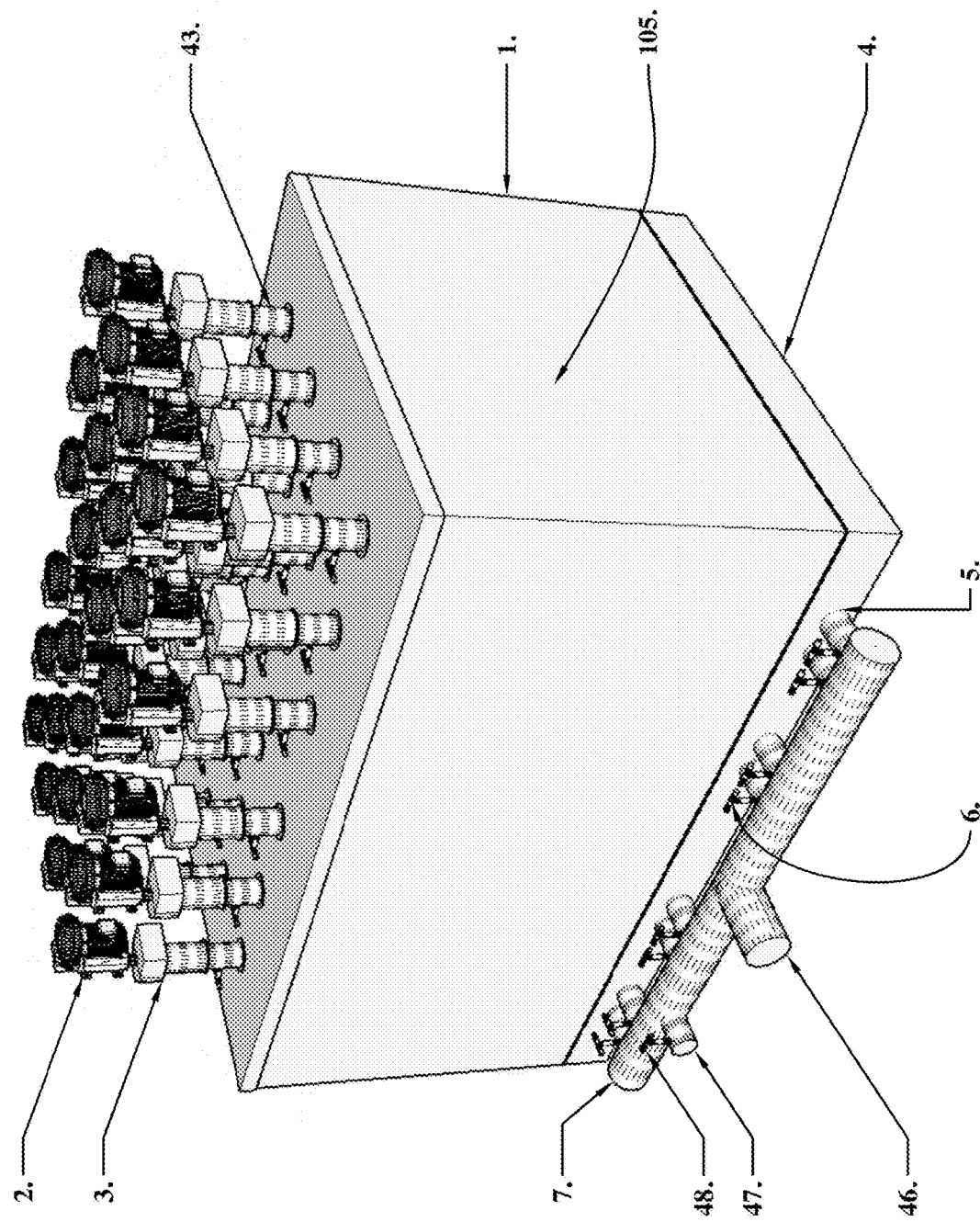

FIG. 4 presents "Polarity Conversion Unit Perspective View". The Polarity Conversion Unit (1) is shown in greater detail where the Blower (2) and Heater (3) assemblies are shown. There are a number of Blower (2) and Heater (3) assemblies mounted on top of the Polarity Conversion Unit. Each of those assemblies can be isolated from the Polarity Conversion unit through an Blower/Heater Assembly Isolation Damper (43) when the assembly is off line. The Blower (2) and Heater (3) assemblies work in tandem with the Modified Sintercraft Pad (4). The Modified Sintercraft Pad (4) has a sectionalized vapor extraction design where small sections can be treated sequentially in coordination with the Polarity Conversion Unit (1). Individual Extraction Lines (5) are isolated with Isolation Dampers (6) to facilitate isolated treatment zones. Dampers (6) are open when an array of Blower (2) and Heater (3) assemblies are in operation while at the same time a set of dampers (6) open for Individual Extraction Lines (5) directly below. The interior of the Polarity Conversion Unit (1) is accessed by the Access Door (105) for loading and unloading.

The Vapor Extraction Manifold (7) provides isolated Individual Extraction Lines (5) a connection to the Vapor Extraction Line to Emissions Treatment (46). In addition, the Vapor Extraction Manifold (7) provides a connection for the Brine Pot Evaporator (29) through the Brine Pot Evaporator Connection Valve (47). The Brine Pot Vapor Extraction Line Damper Valve (48) provides isolation during Brine Pot Evaporator (29) operations.

Figure 5:
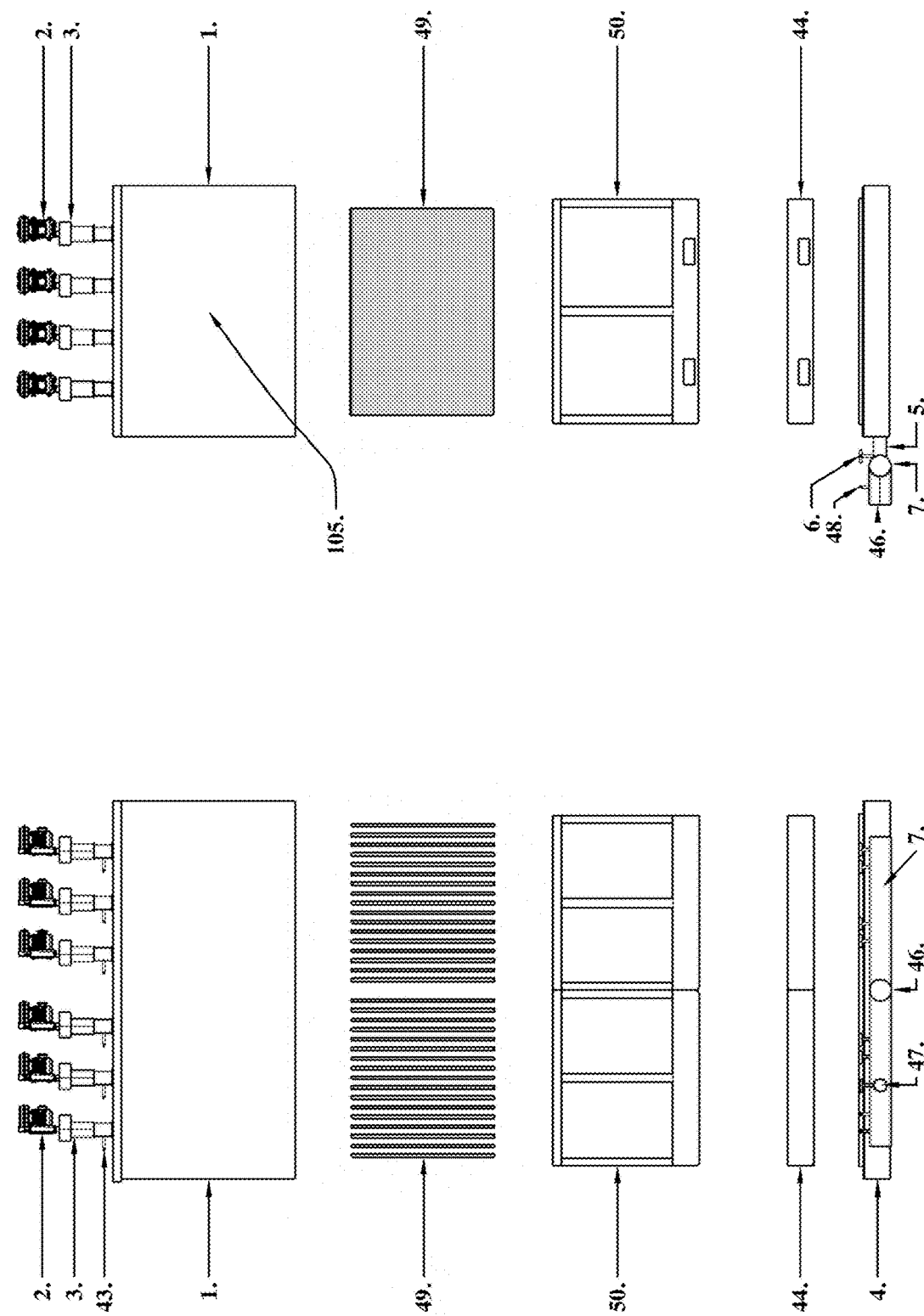

FIG. 5 presents Polarity Conversation Unit w/Soil Slip Assemblies Cross Section. This cross-sectional view illustrates how the various assemblies fit together when in operation. Mounted on top of the Polarity Conversion Unit (1) are a number of Blower (2), Heater (3) and Heater/Blower Isolation Damper (43) assemblies. These assemblies work in tandem with the Modified Sintercraft Pad (4) and assorted elements within the Pad. A transportable flow through treatment vessel consists of a Soil Slip Base Framework (44), a Static Soil Shaping Screen Assembly (49) and a Soil Slip (50). When combined together, all three elements create a transportable, flow though treatment vessel that is capable of treating soil, other porous media, sludges, colloidal matter and rechargeable galvanic filter media. The vessel is loaded from the top and empties from the bottom by simply using a forklift to lift the Static Soil Shaping Screen Assembly (49) and a Soil Slip (50) upwards together; the media falls through the lifted assembly. The Soil Slip Base Framework (44) is removed from the treated media pile by a forklift in a separate lift operation; treated media flows through the base as it is lifted from the pile. Tabs in the Soil Slip Base Framework hold the media in place during transport and treatment as described below in FIGS. 8, 9, and 10. The vessels are loaded and unloaded from the Polarity Conversion Unit (1) through the Access Door (105).

FIG. 5 also show different elements of the Modified Sintercraft Pad (4) including the Vapor Extraction Manifold (7), Individual Extraction Line (5), Vapor Extraction Isolation Damper (6), Vacuum Extraction Line to Emissions (46), Brine Pot Evaporator Connection Valve (47) and a partial view of the Brine Pot Vapor Extraction Line Damper Valve (48). All of these elements are designed to provide system vacuum and vapor conveyance to select portions of the system during various stages of operation.

Figure 6:
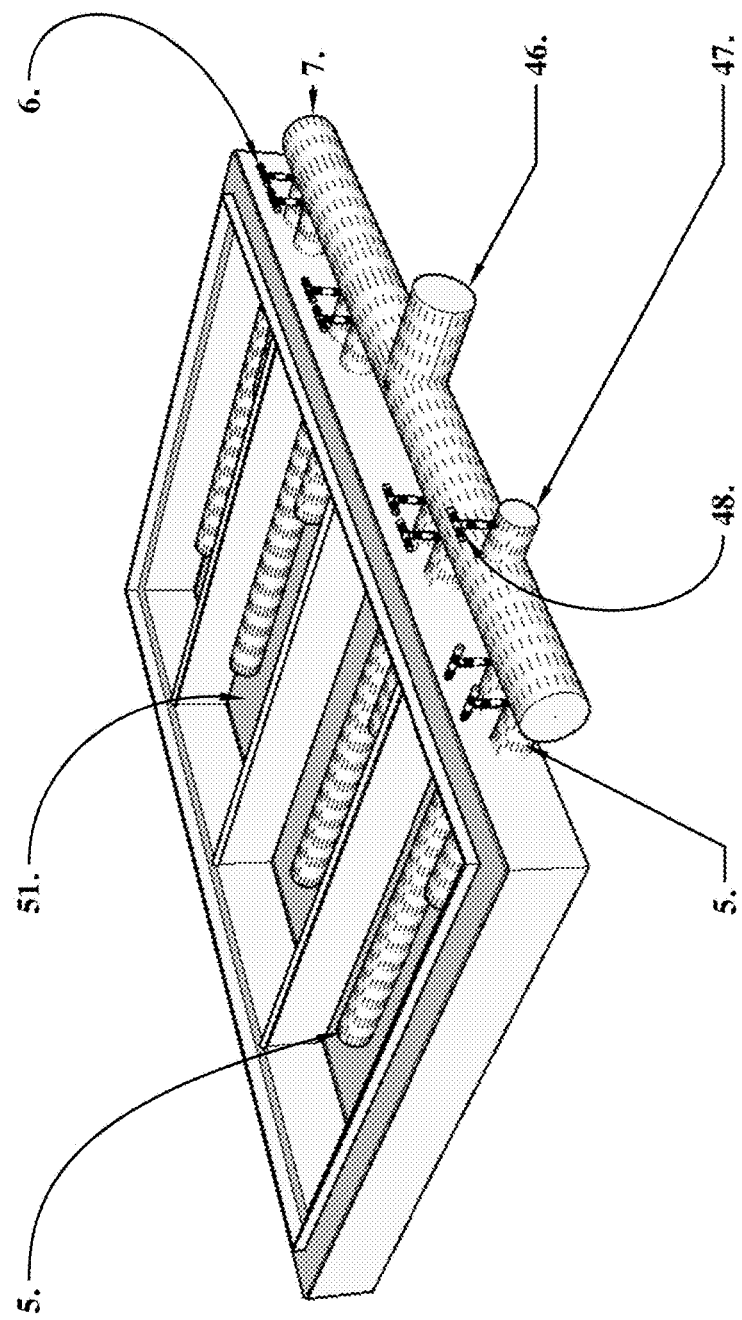
Figure 7:
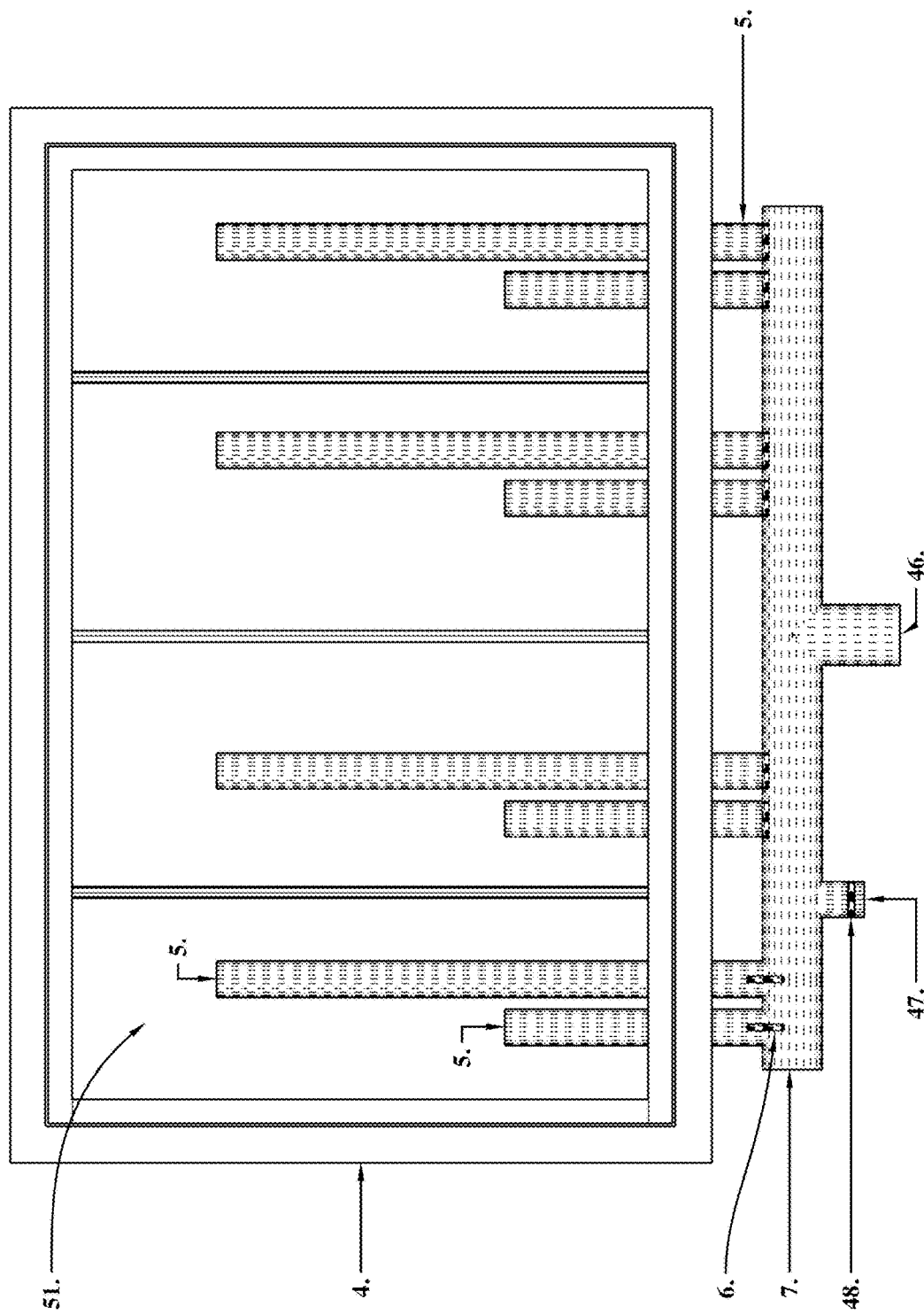

FIG. 6 presents Modified Sintercraft Pad Perspective View and FIG. 7 presents Modified Sintercraft Pad Map View. The Isolated Vapor Extraction Chamber (51) provides a means to isolate system vacuum and treatment gas flow to the area above through the use of Individual Extraction Lines (5) controlled by Vapor Extraction Isolation Dampers (6). There are two Individual Extraction Lines (5) located in each Isolated Vapor Extraction Chamber (51). One line is short while one line is longer to allow even flow through the treatment vessel assembly. Vapor Extraction Isolation Dampers (6) allow treatment to be focused on one side of the treatment vessel or the other within a given Isolated Vapor Extraction Chamber (51). The Brine Pot Evaporator Connection Valve (47) is clearly shown along with the Brine Pot Vapor Extraction Line Damper Valve (48); these elements provide system vacuum and vapor conveyance to the Fluids line assembly. Vapors are treated in the Emission treatment described above.

Figure 8:
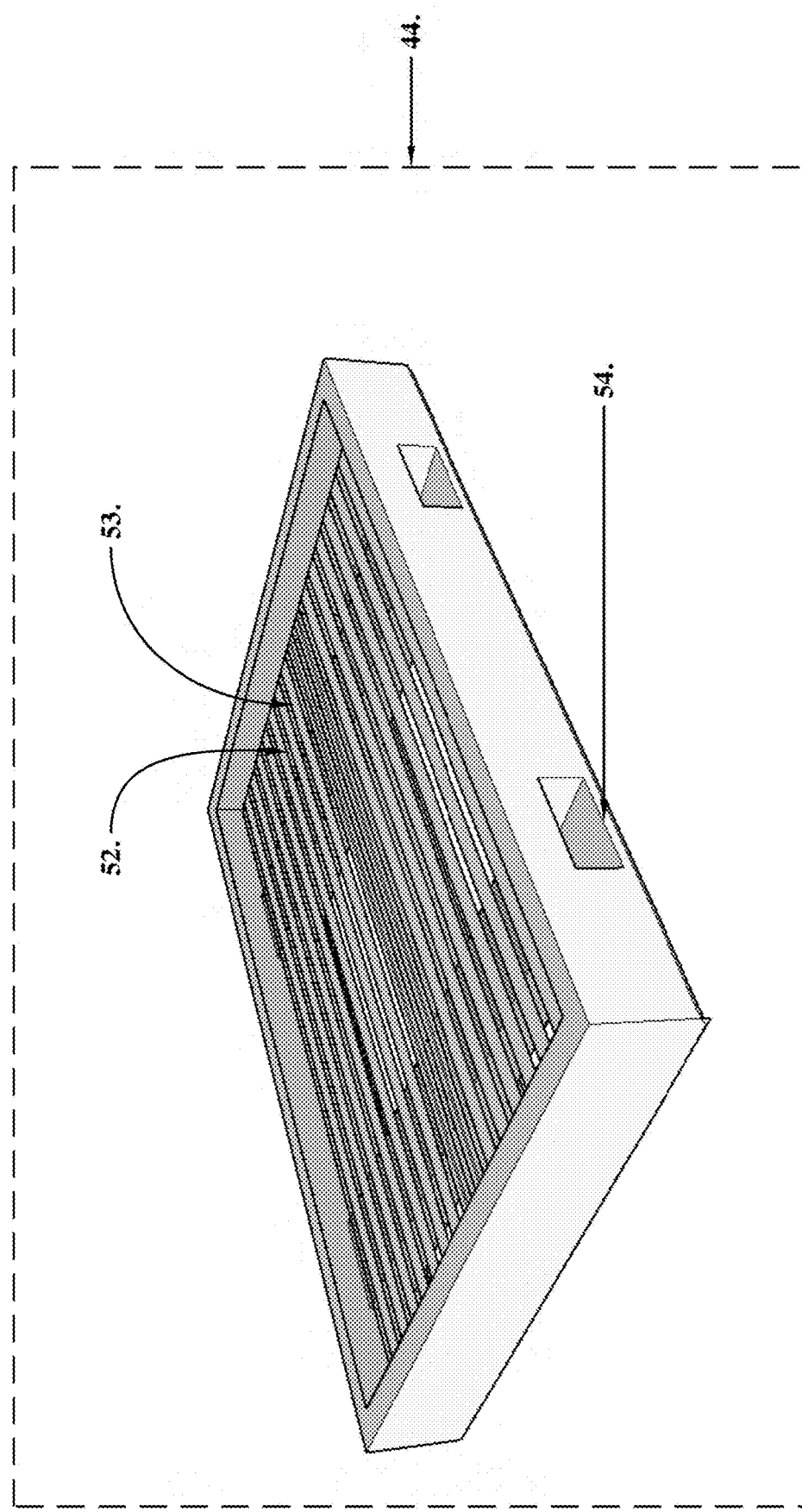
Figure 9:
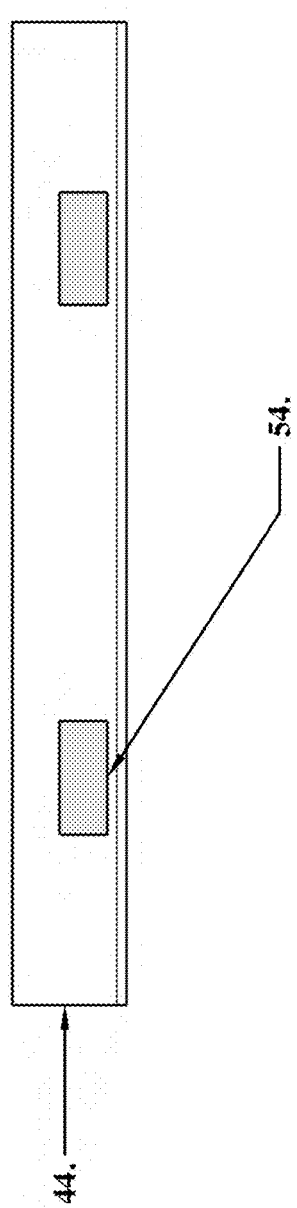
Figure 10:
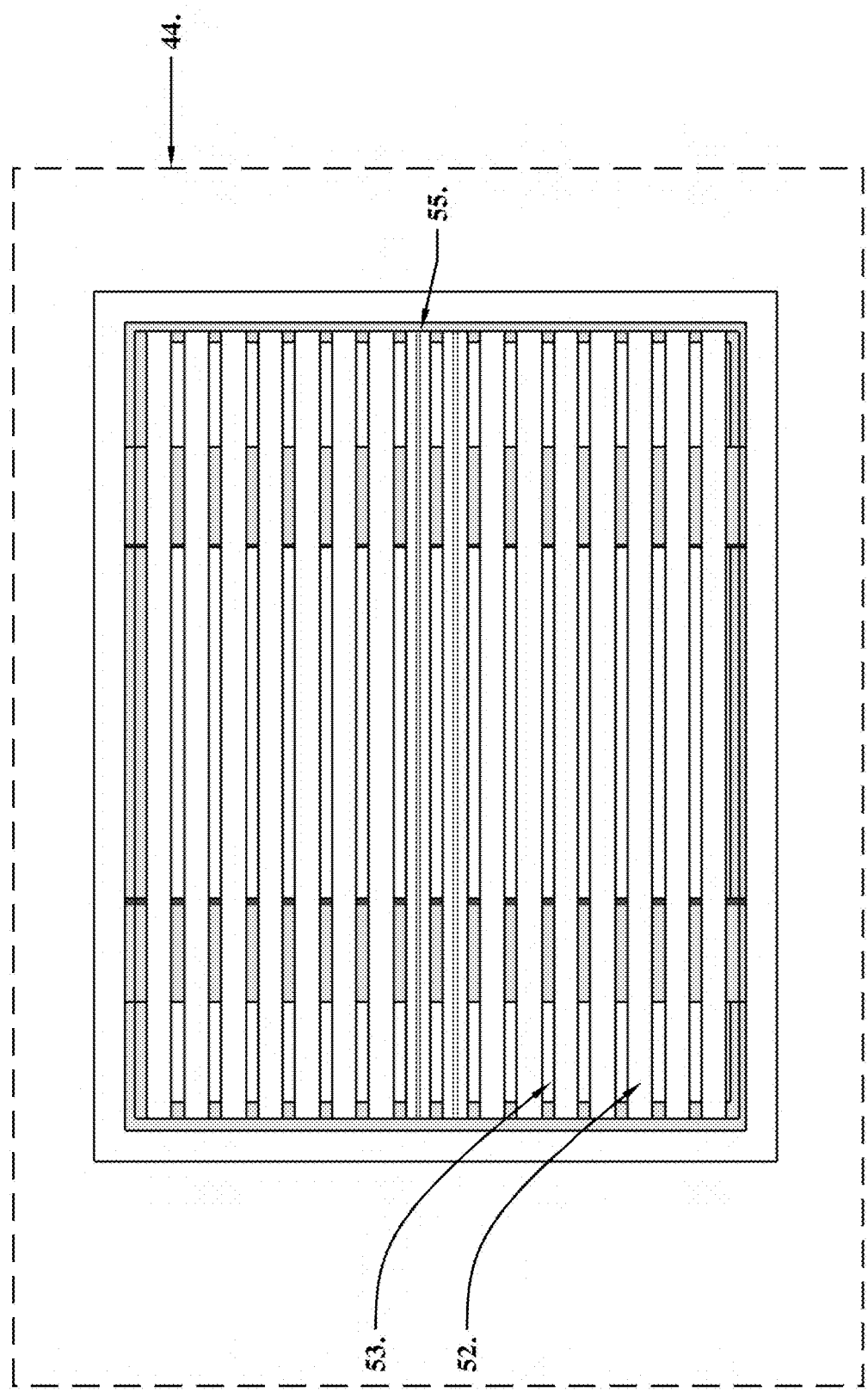

FIG. 8 presents Soil Slip Base Framework Perspective View. FIG. 9 presents Soil Slip Base Framework Cross Section. FIG. 10 presents Soil Slip Base Framework Cross Section. The Soil Slip Base Framework (44) is a common element for a variety of treatment arrangements; the unit provides the base lifting apparatus, transport, retainage of media above, allows flow through treatment, top loading and bottom emptying capability. The Base is lifted with a forklift using the Forklift Pockets (54). The Soil Slip Base Framework (44) also serves as the base for object decontamination; typically drill rod and excavator buckets/implements. The Soil Slip Base Framework (44) has Soil Retention Tabs (52) and Flow Through Air Gaps (53) that line up with the Static Soil Shaping Screen Assembly (49). This arrangement along with the Soil Slip (50) allows media to be organized in vertical beds where temperature and flow modulated treatment gas can flow around the shaped beds. The arrangement allows for a high surface area for active treatment and minimizes contaminant travel distance within the vertical bed. Further, the arrangement allows for an easy transport and easy top loading and bottom emptying operation. In addition, the Soil Slip Base Framework (44) is designed to insert into the Polarity Conversion Unit (1) in either direction through the use of the Isolated Vapor Extraction Chamber Register (55).

Figure 11:
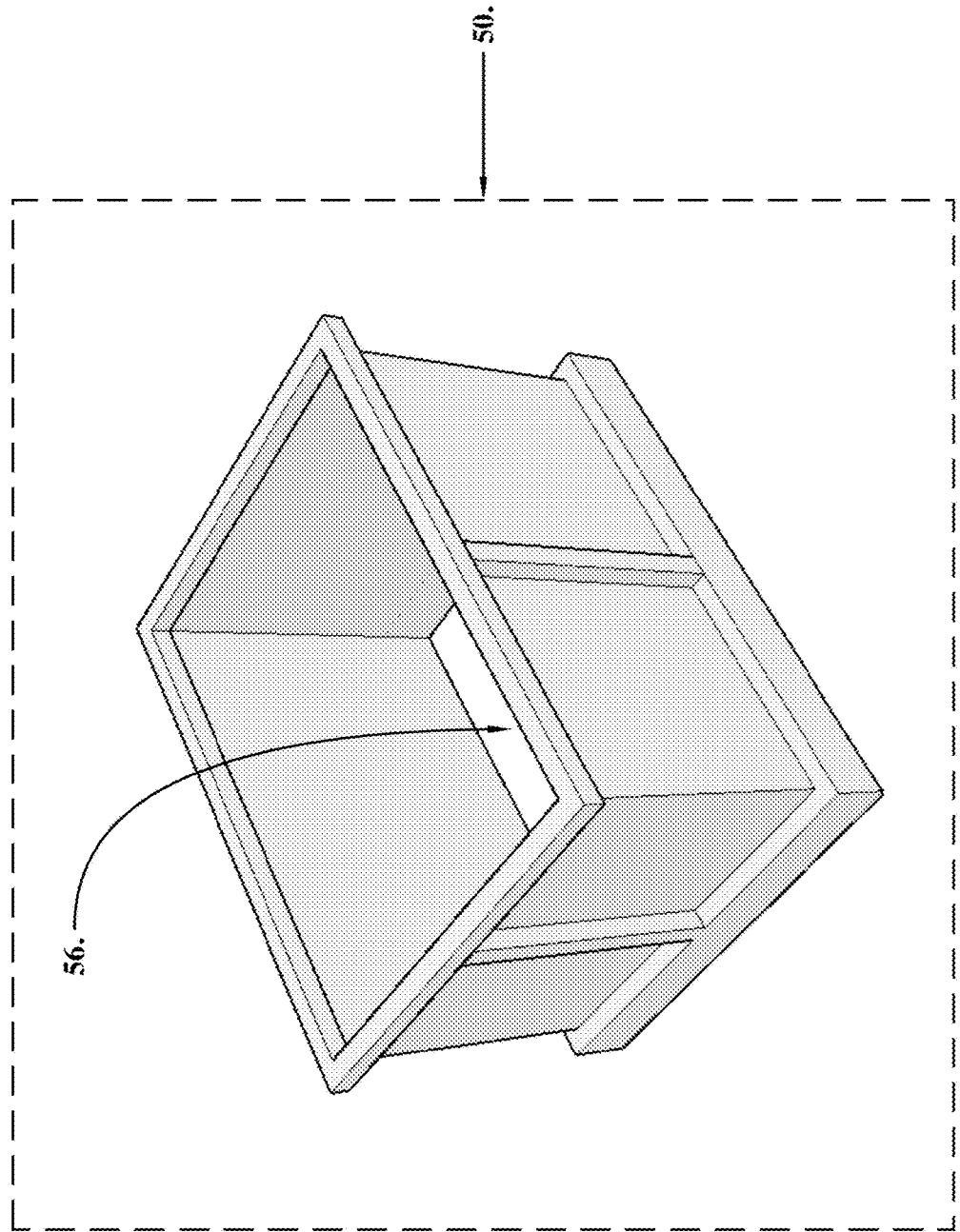

FIG. 11 presents Soil Slip Perspective View. The Soil Slip (50) consists of four walls with a Soil Slip Open Top and Open Bottom (56). The purpose of the Soil Slip (50) is to provide horizontal retainage of the Static Soil Shaping Screen Assembly (49) and media while registered to the Soil Slip Base Framework (44). Both the Vapor Phase Galvanic Separator Rechargeable Filter Media (77) and the Aqueous Phase Galvanic Separator Rechargeable Filter Media (100) are designed to fit into the Soil Slip (50) for treatment in the Polarity Conversion Unit (1).

Figure 12:
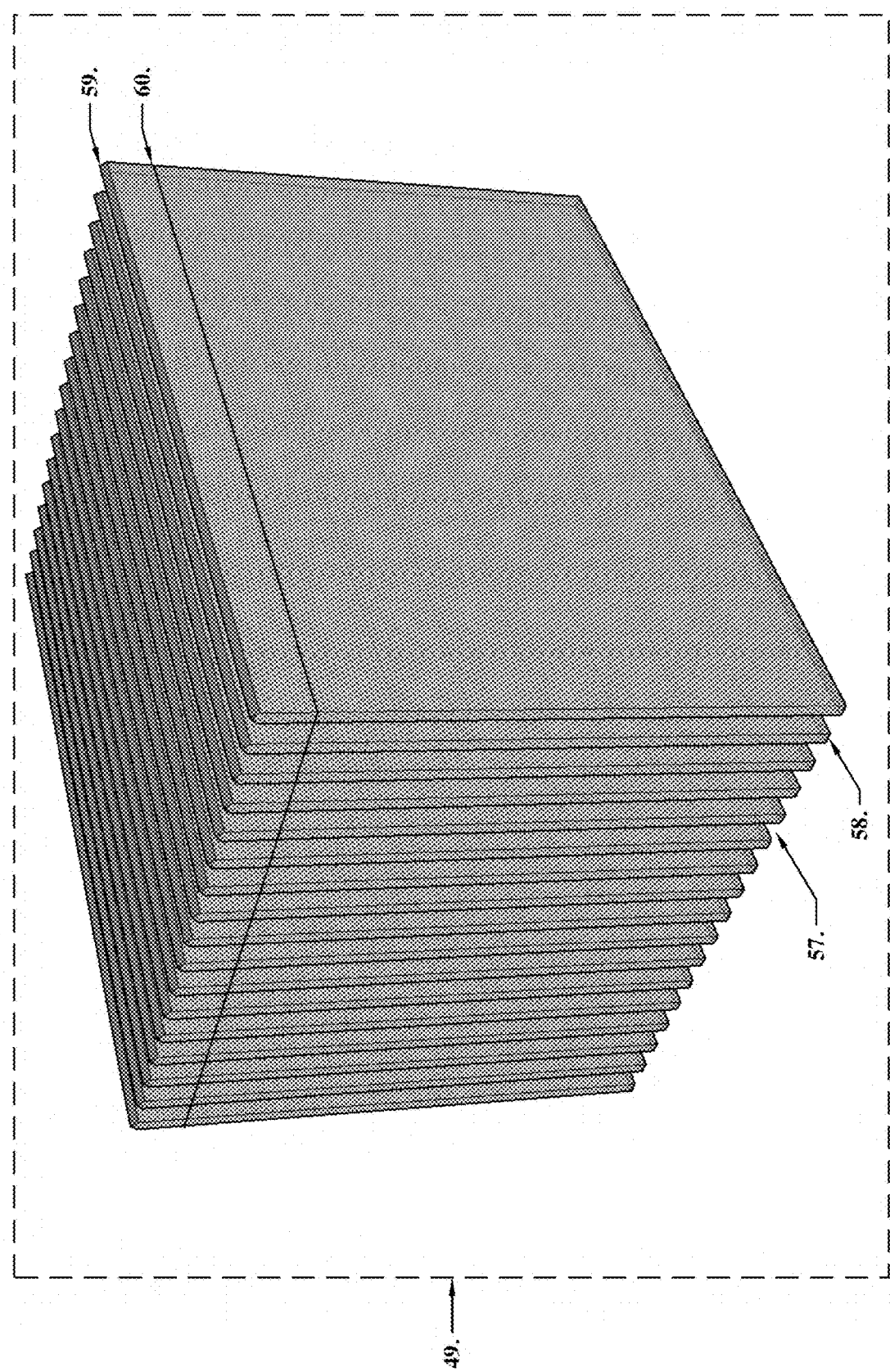
Figure 13:
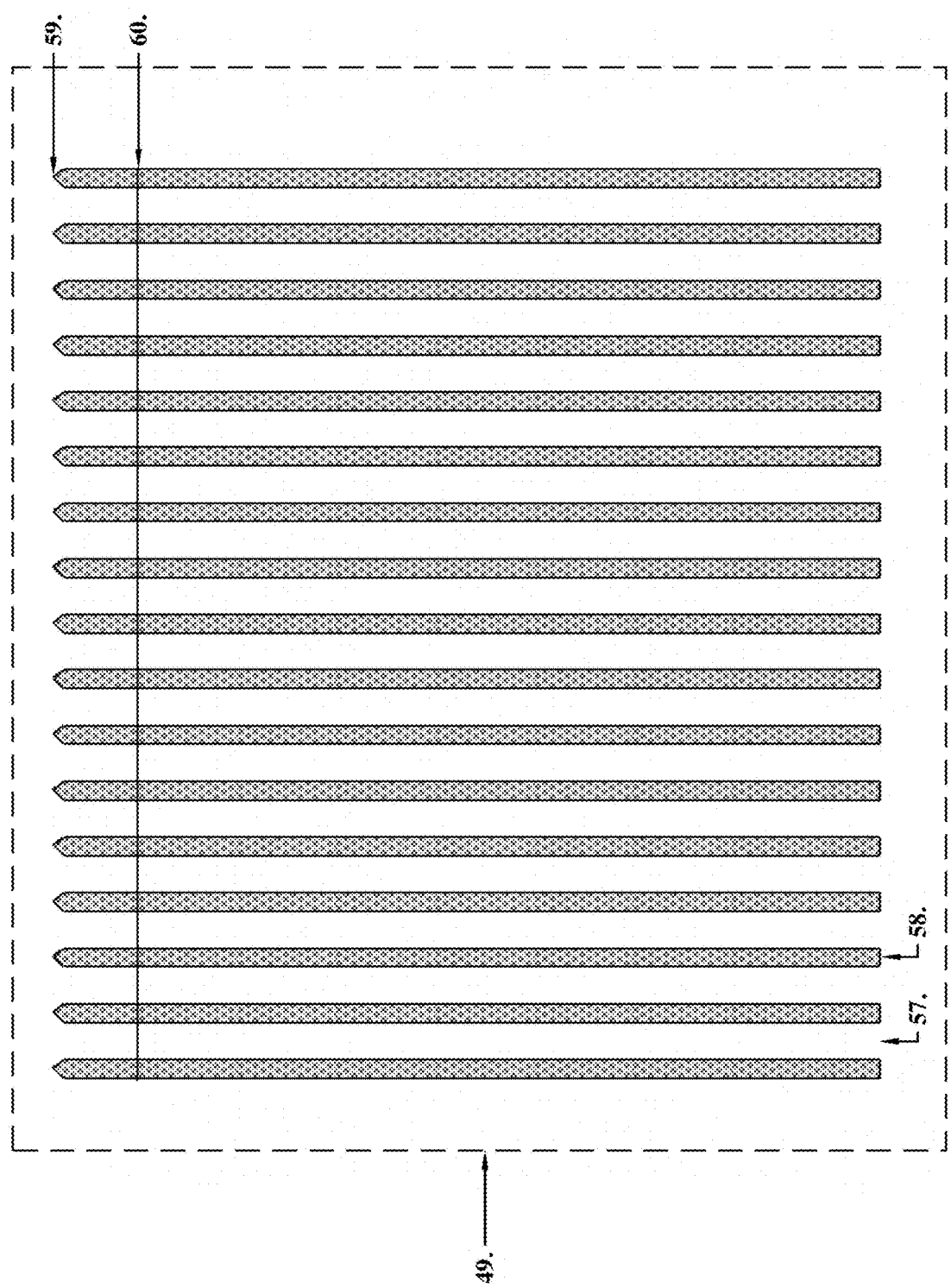
Figure 14:
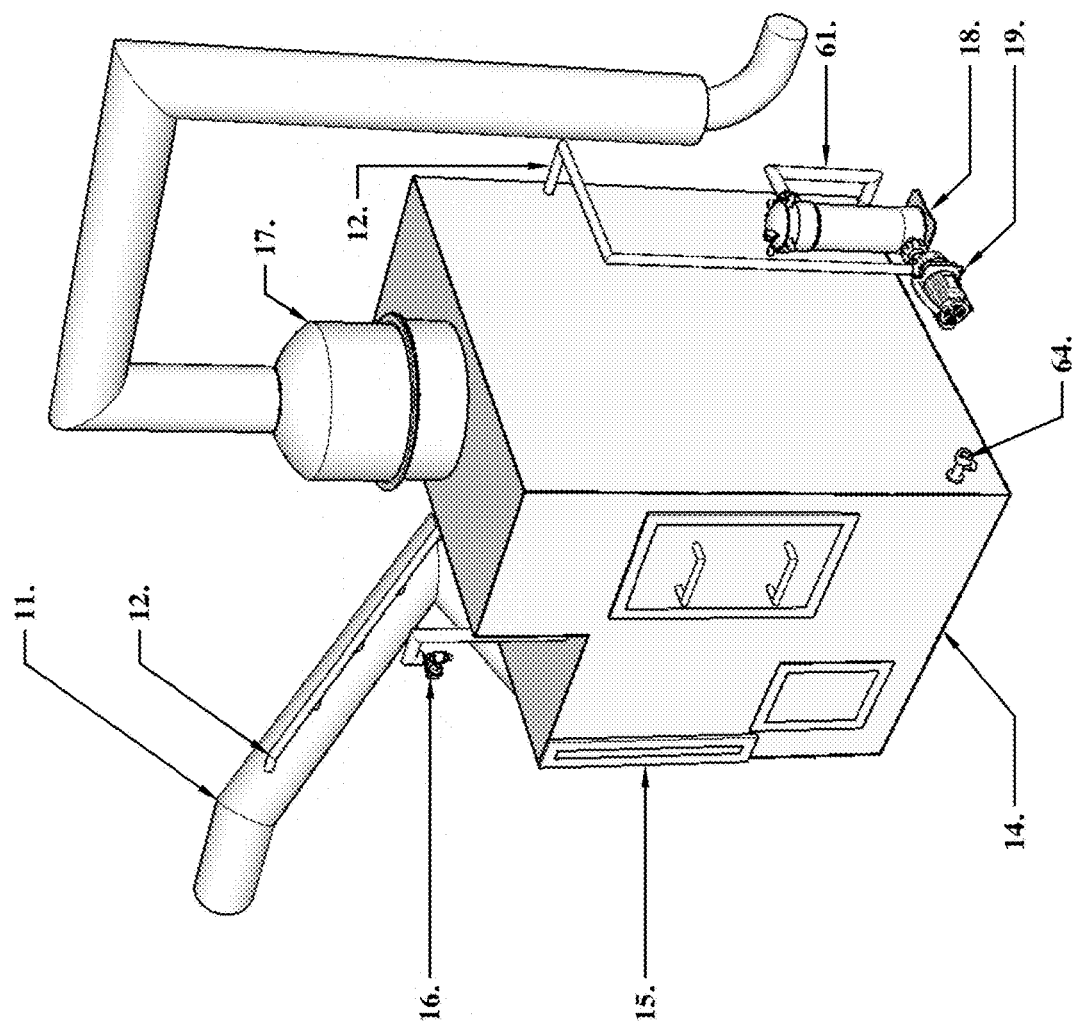

FIG. 12 Presents Static Soil Shaping Screen Assembly Perspective View. FIG. 13 presents Static Soil Shaping Screen Assembly Cross Section. The purpose of the Static Soil Shaping Screen Assembly (49) is to provide a static means to organize media into vertical beds of high surface area and to provide an open flow path for treatment gas to flow around the vertical beds. Soil Slots (57) and Air Gaps (58) are constructed to line up with Soil Retention Tabs (52) and Flow Through Air Gaps (53) in the Soil Slip Base Framework (44). The Air Gap Covers (59) prevent soil, sludges or other media from entering the Air Gaps (58). Soil is filled to the Soil Fill Line (60), which corresponds with the height of the Soil Slip (50) wall height. Treatment gases enter the Air Gap (58) through the sides of the Static Soil Shaping Screen Assembly (49). The sides of the Air Gaps (58) are designed to increase treatment gas velocity by decreasing cross sectional area of flow in order to lower thermal resistance. Further, tabs perpendicular to flow located along the screen edge cause turbulence along the surface area, which in turn lowers thermal resistivity. Wire wrap well screen can be used as an alternative embodiment where the well screens are place adjacent to each other in line with the Air Gaps (58). The Air Gaps (58) can be a fin or pin heat sink design. The well screens can be spaced apart to allow additional room in the Soil Slip (50) assembly for soil and sludge.

FIGS. 14 through 22 are all related to the Vapor Conversion Tank (14) showing perspective, map, cross sectional and internal element views. The Vapor Conversion Tank (14) conditions the treatment gas to facilitate rapid cooling, condensation of PFAS, removal of residual particulate matter and prevention of water condensation from the treatment gas. Hot treatment gases enter the Vapor Conversion Tank (14) through the Cooling Chase (11). Cooling fluids supplied by the Cooling Chase Cooling Fluid Line (12) are directly sprayed into the treatment gas using a variety of droplet sizes to create an evaporative environment. High pressure Cooling Chase Spray Nozzles (62), shown in FIG. 18, apply a fan of cooling fluid of varying drop size directly into the treatment gas flow stream. Mist spray is injected in the Mist Chamber (13) just prior to entry into the tank. Cooling Fluids drain into the Vapor Conversion Tank (14) and are then drawn out through the Vapor Conversion Tank Cooling Fluid Return Line (61) passing through the Filter Housing (18) to remove PFAS pre-micellular aggregate and liquid crystals from the cooling fluid. The Jet Pump (19) recirculates the cooling fluid back to the Cooling Chase (11) through the Cooling Chase Cooling Fluid Line (12). The cooling fluid contains water, alcohols, salts, urea and organic matter to enhance the formation of pre-micellular aggregate and liquid crystals.

In order to regulate cooling fluids temperature and maintain temperatures above ambient outdoor temperature, outside air is drawn through Purge Lines (16), which are vented at the top of the Vapor Conversion Tank (14) and equipped with a control valve that regulates outside air intake. The Purge Lines (16) are slotted at the bottom of the Vapor Conversion Tank (14). System vacuum causes outside air to enter the Purge Lines (16) and create bubbles in the cooling fluid. The Bubbles cool the cooling fluid, cause fluid mixing, and maintains temperature above ambient outside temperature. Maintaining temperatures above ambient outside temperature in the Vapor Conversion Tank (14) combined with cooling fluid droplet size prevent water condensation within the tank.

Figure 22:
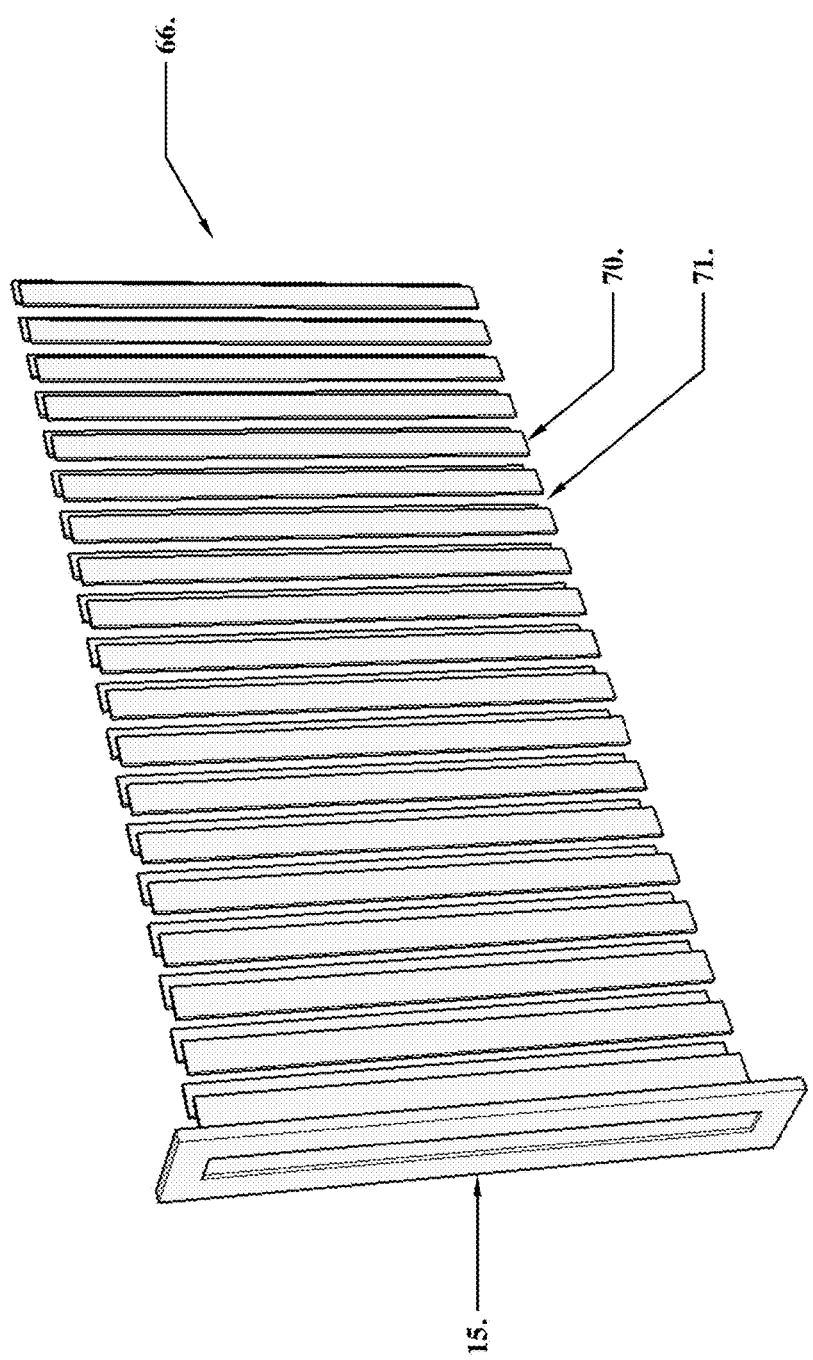

Treatment gas exit the Cooling Chase (11) and the Mist Chamber (13) and encounter the Vapor Conversion Tank Gibbs Energy Curtain (66). The Gibbs Energy Curtain (66) consists of Gibbs Energy Curtain Tabs (70) and Gibbs Energy Curtain Air Gaps (71). The Tabs (70) consist of materials with specific polar and dispersive Gibbs surface energy profile to match or closely match contaminants that facilitate condensation on to the tabs (70). Treatment gas flows through the device where the rapid cooling and physiochemical processes cause the tabs (70) to be coated with contaminant. The Gibbs Energy Curtain (66) is removeable through the Gibbs Energy Curtain Access (15). FIG. 22 presents Gibbs Energy Curtain Perspective View.

Figure 21:
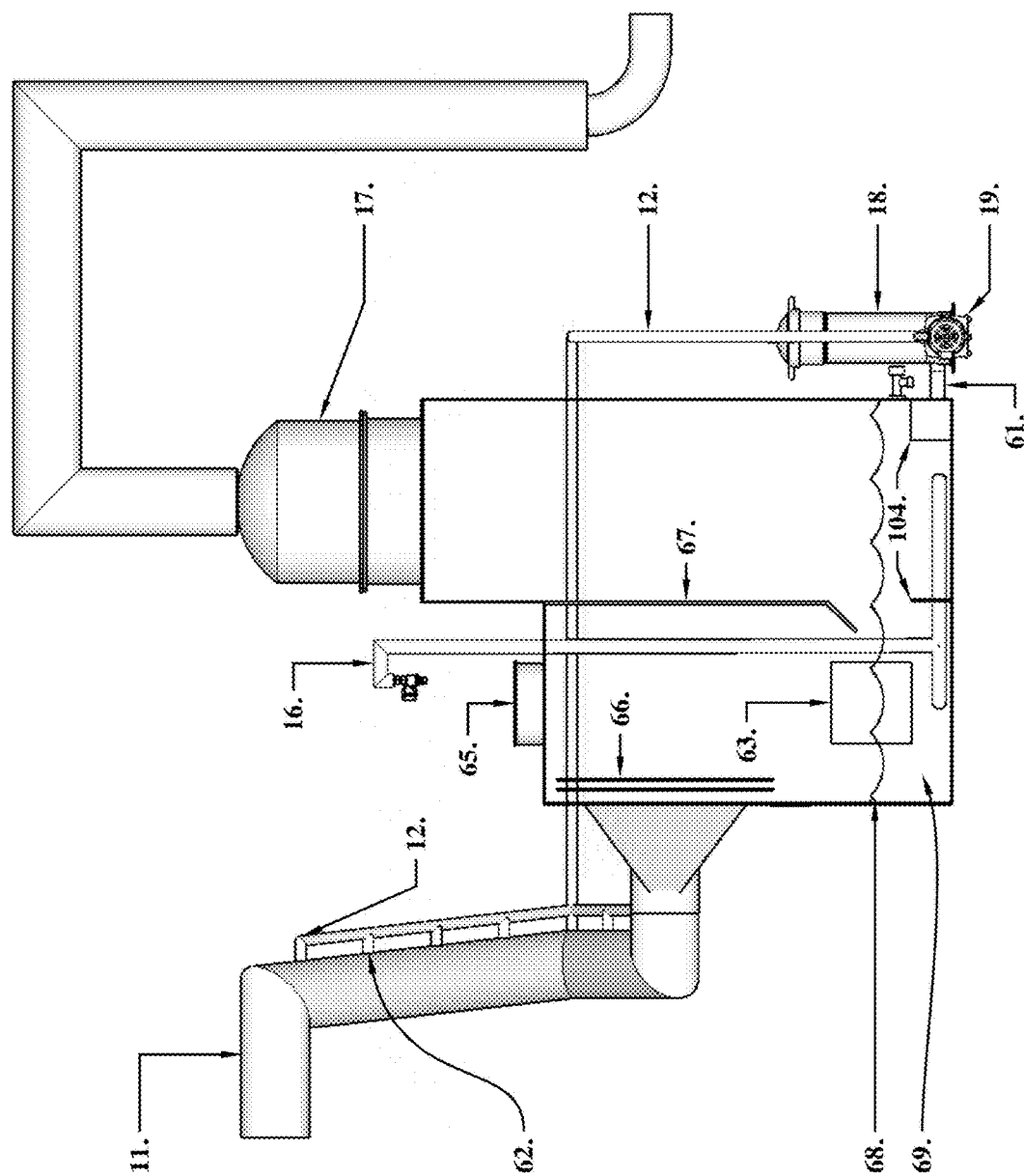

Treatment gas flows through the Gibbs Energy Curtain (66), then downward under the Vapor Conversion Tank Vapor Diversion Baffle (67); as seen in FIG. 21 The flow path causes the treatment gas to turn and flow close to the Fluid Level (68) in the tank, which has a demisting and cooling effect. In addition, any particulate matter drops out of the treatment gas where it accumulates on the tank bottom. A Sediment Baffle (104) located at the bottom of the tank prevents sediment from migrating into the Vapor Conversion Tank Cooling Fluid Return Line (61); seen in FIG. 21. The treatment gas is drawn upwards into the Vapor Conversion Tank Demisting Tower (17) where a demister screen and the height of the tower eliminates any residual mists.

Figure 15:
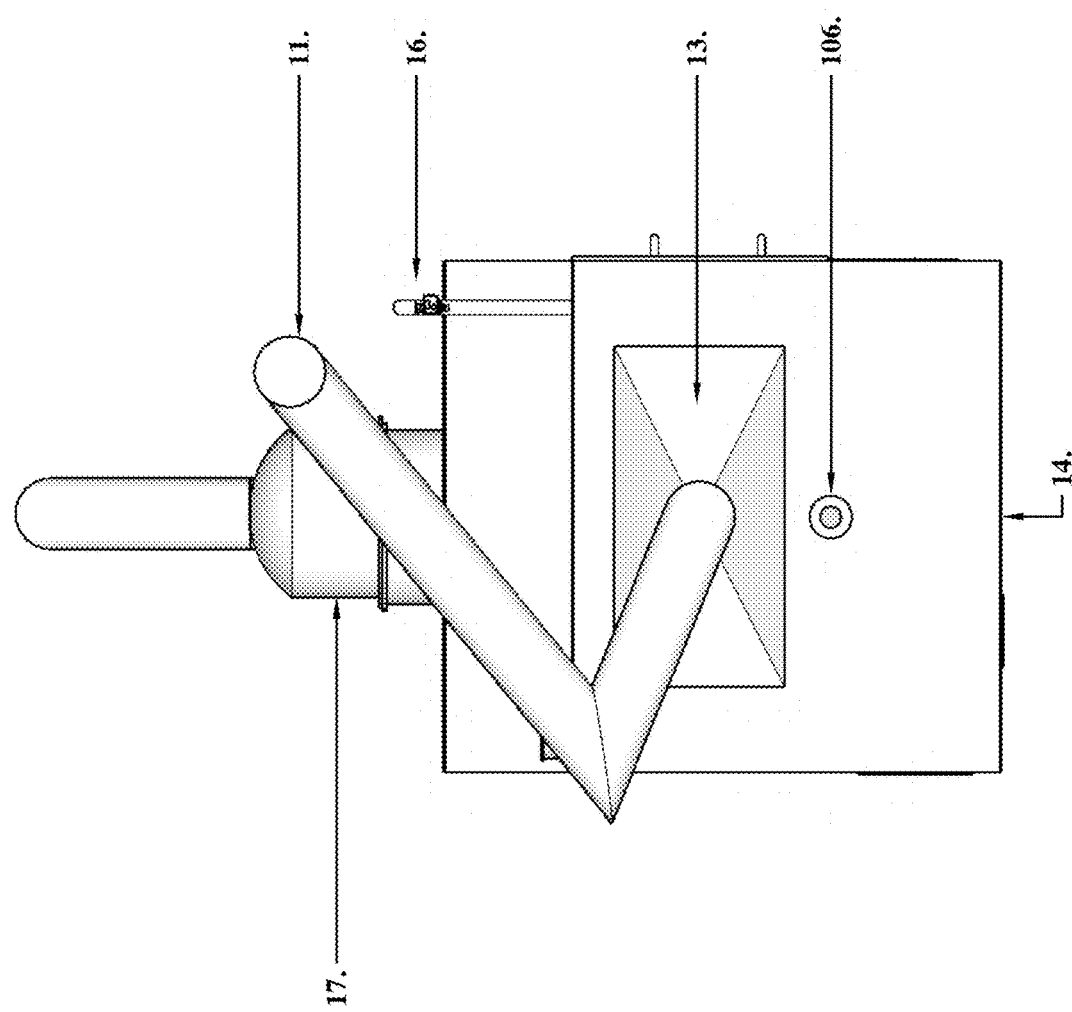
Figure 16:
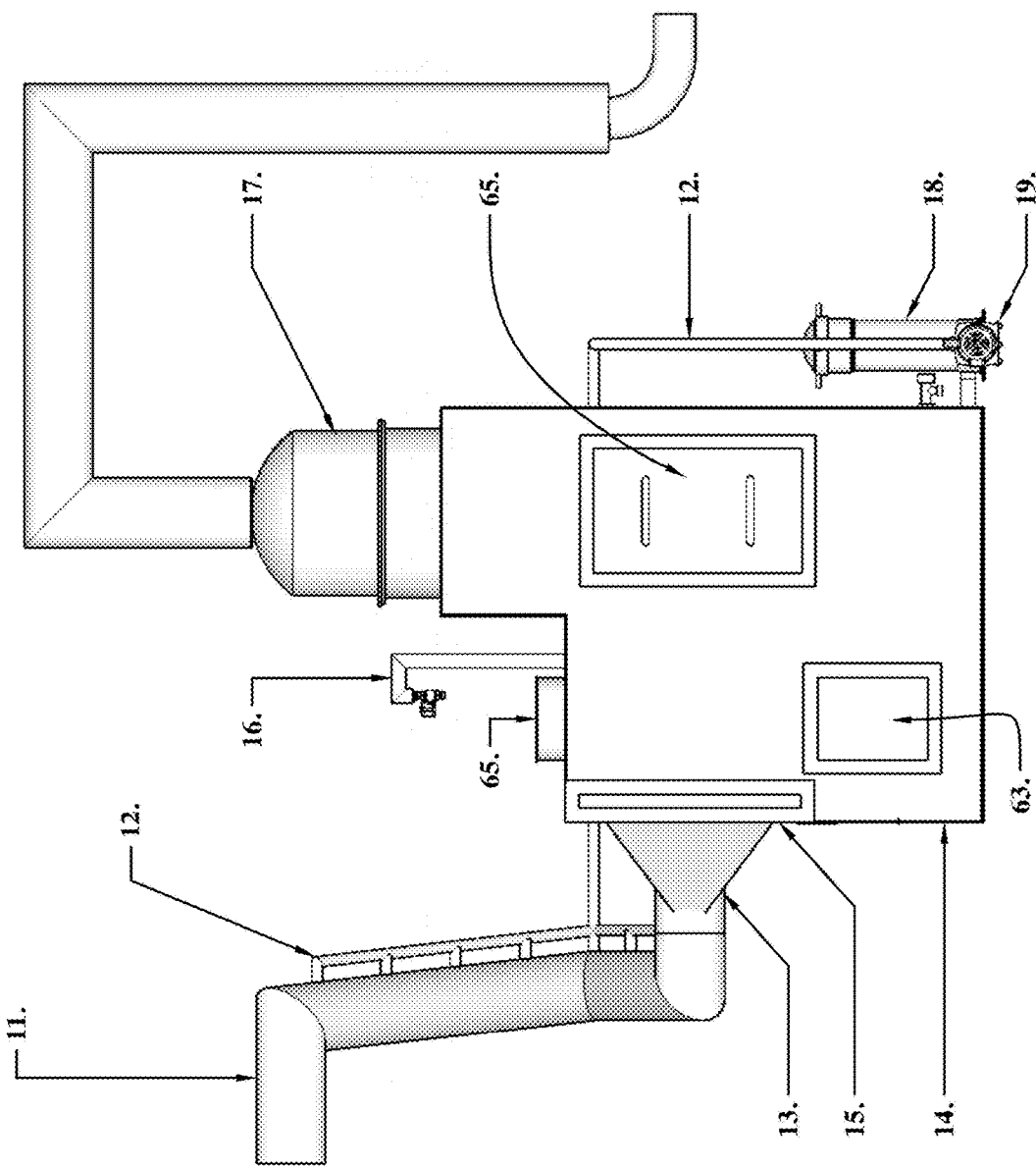
Figure 17:
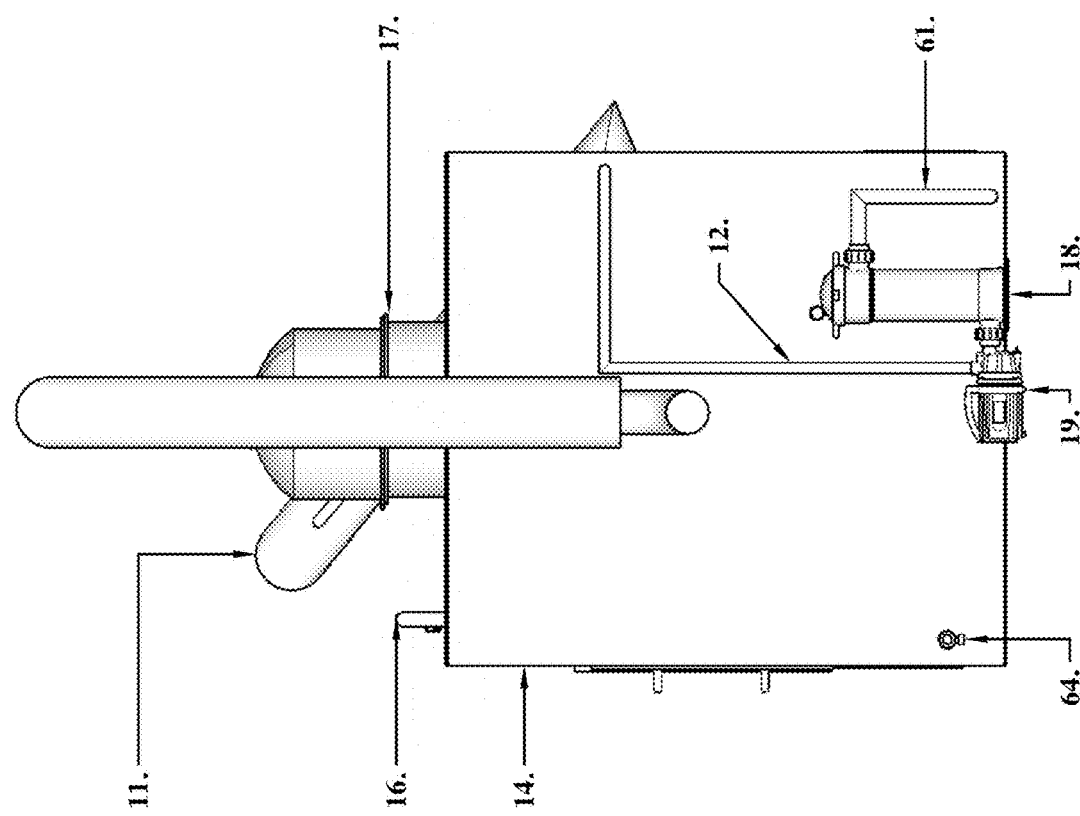
Figure 18:
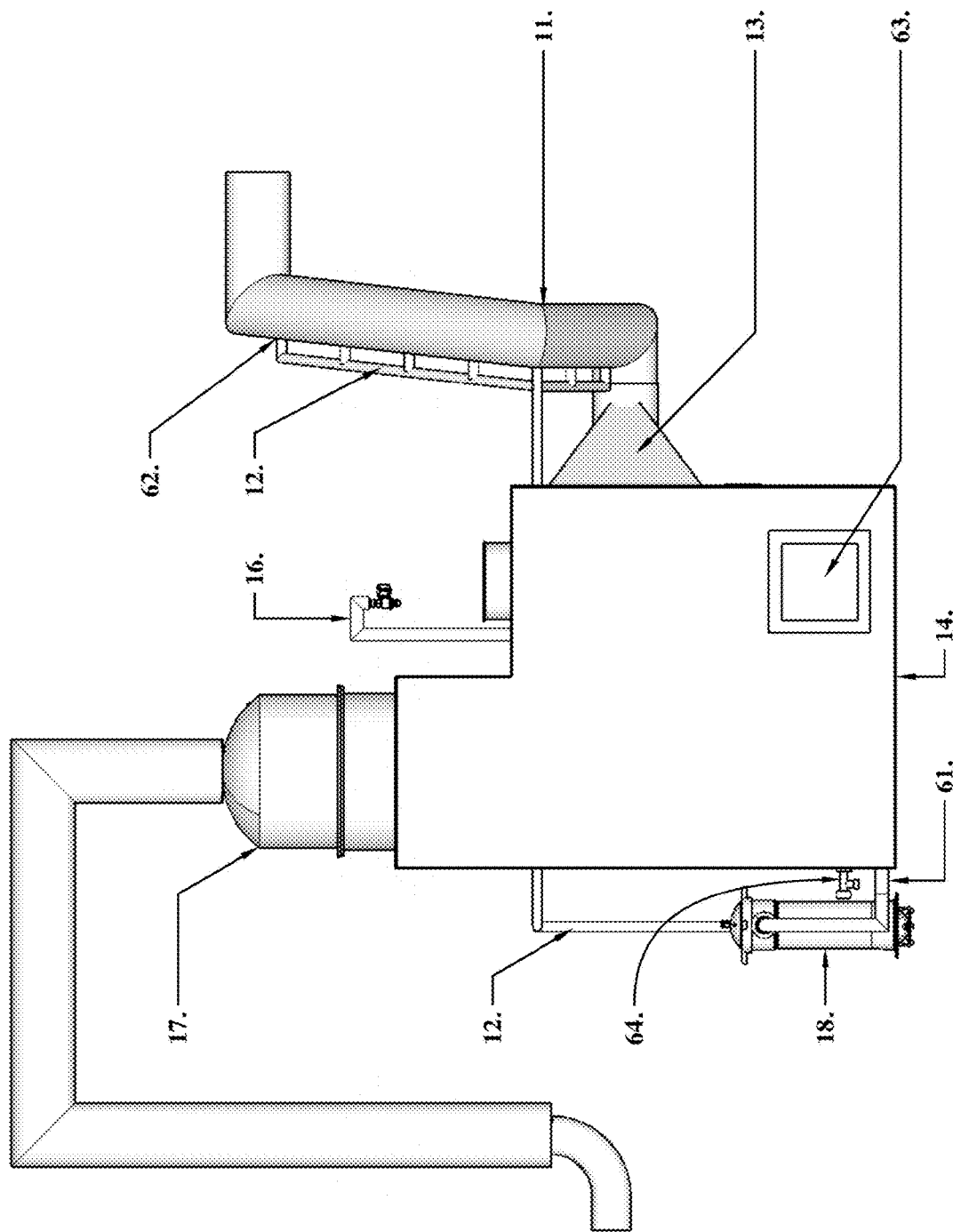
Figure 19:
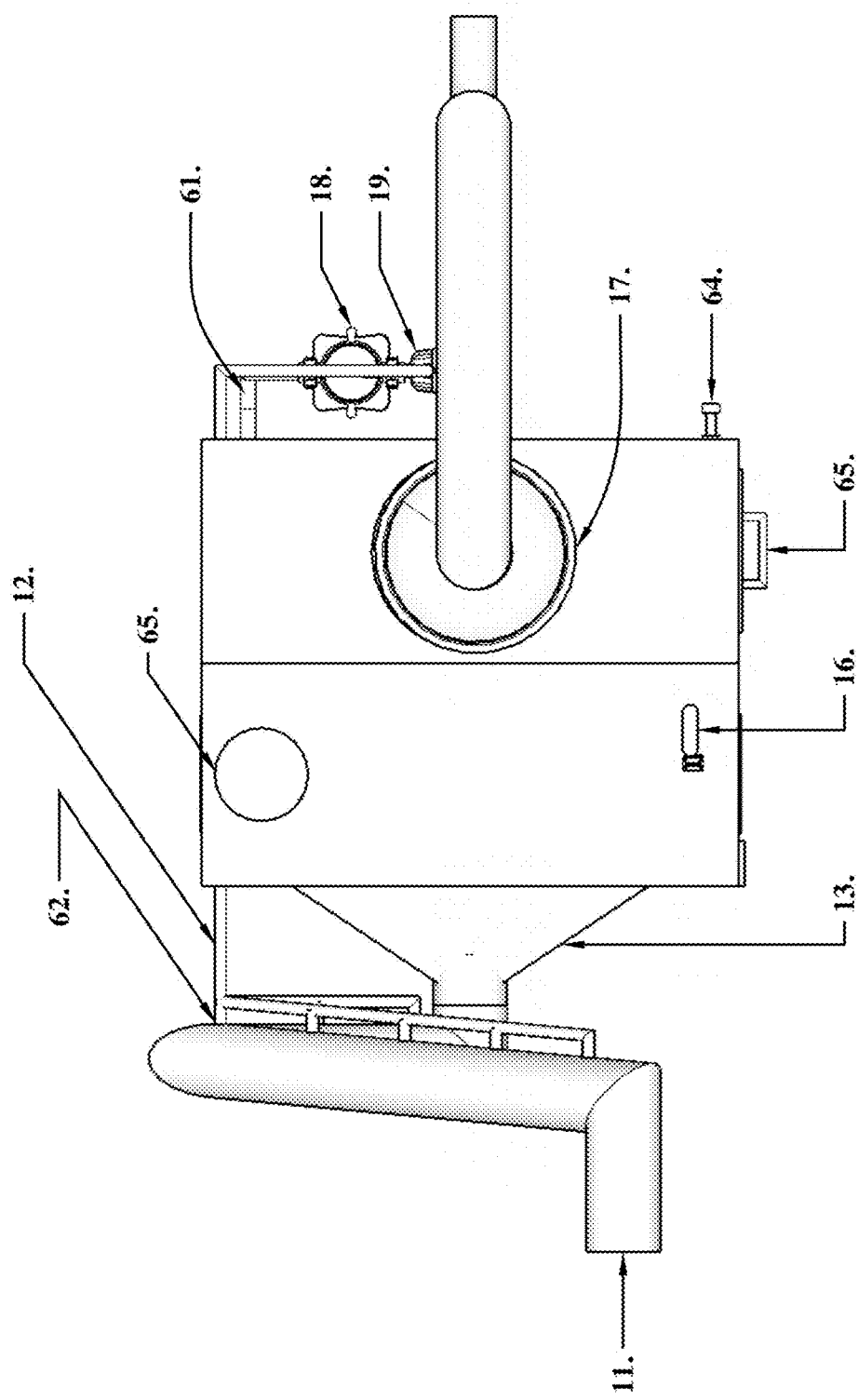
Figure 20:
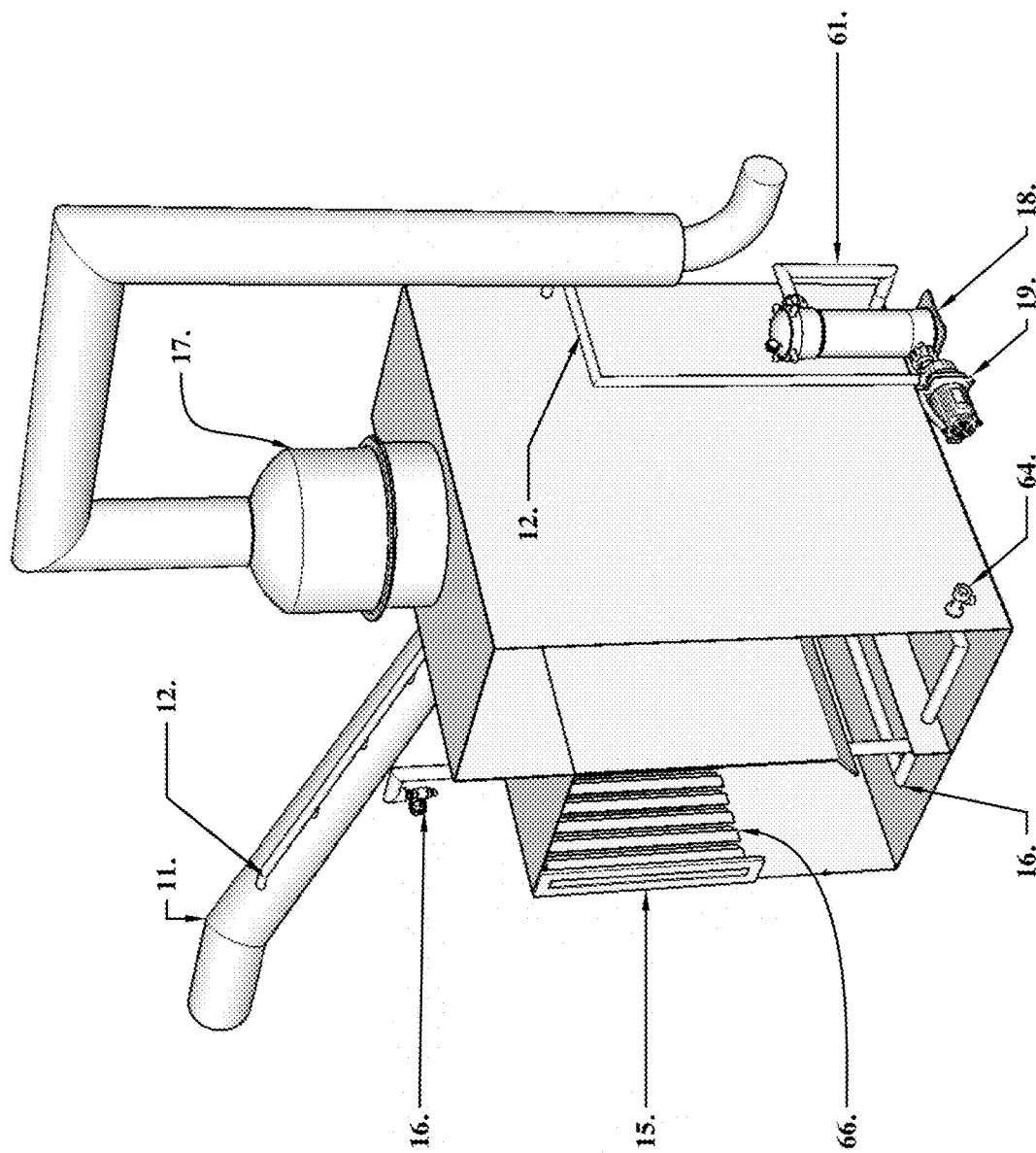

The Vapor Conversion Tank (14) has various sampling, viewing and access ports including the Vapor Conversion Tank View Window (63) and Vapor Conversion Tank Access Hatch (65) as seen in FIG. 16 and Vapor Conversion Tank Sample Port (64) as seen in FIG. 17. The Vapor Conversion Tank Light Port (106) is located under the Mist Chamber (13) to provide lighting into the tank interior; as seen in FIG. 15.

Figure 23:
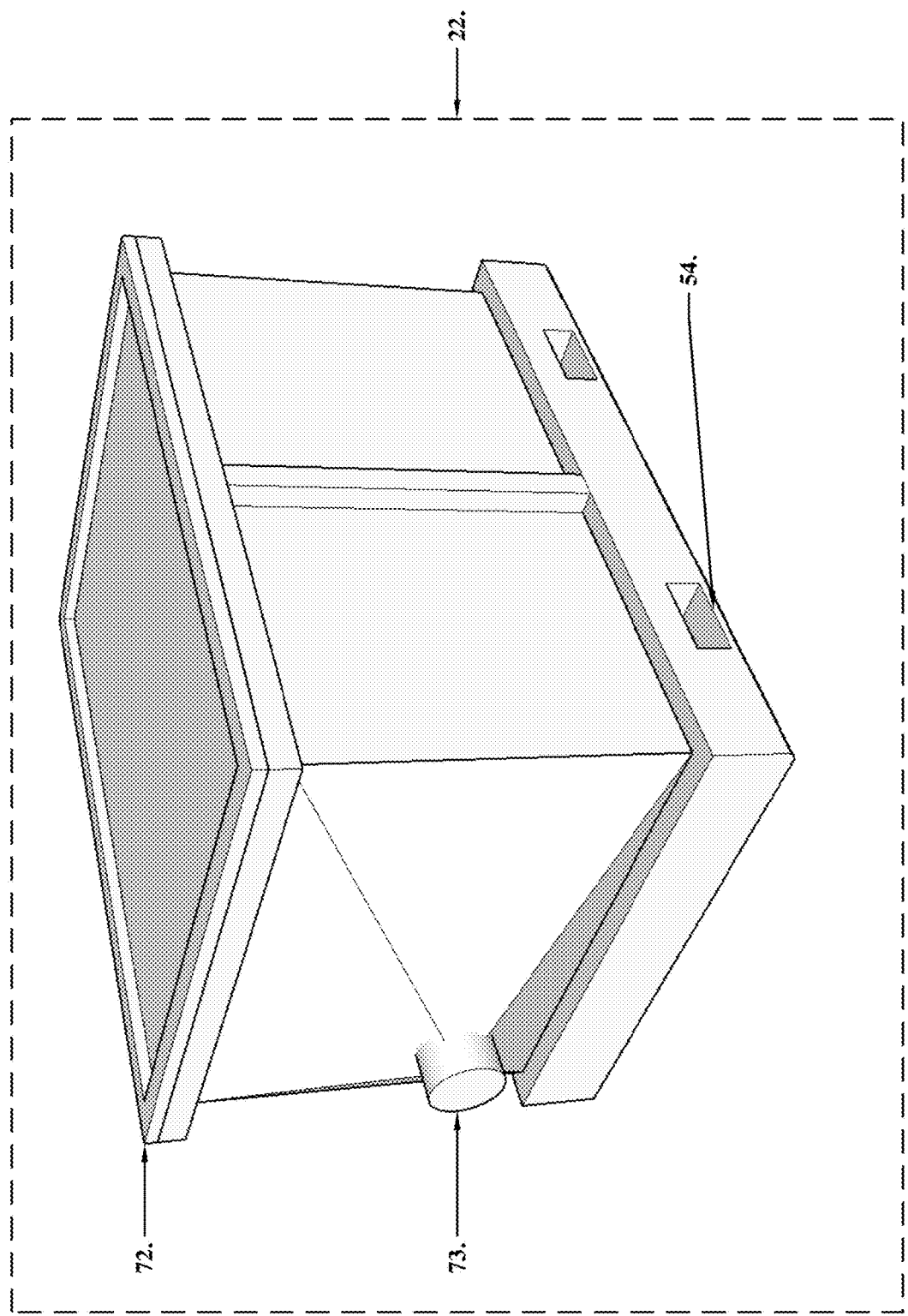
Figure 24:
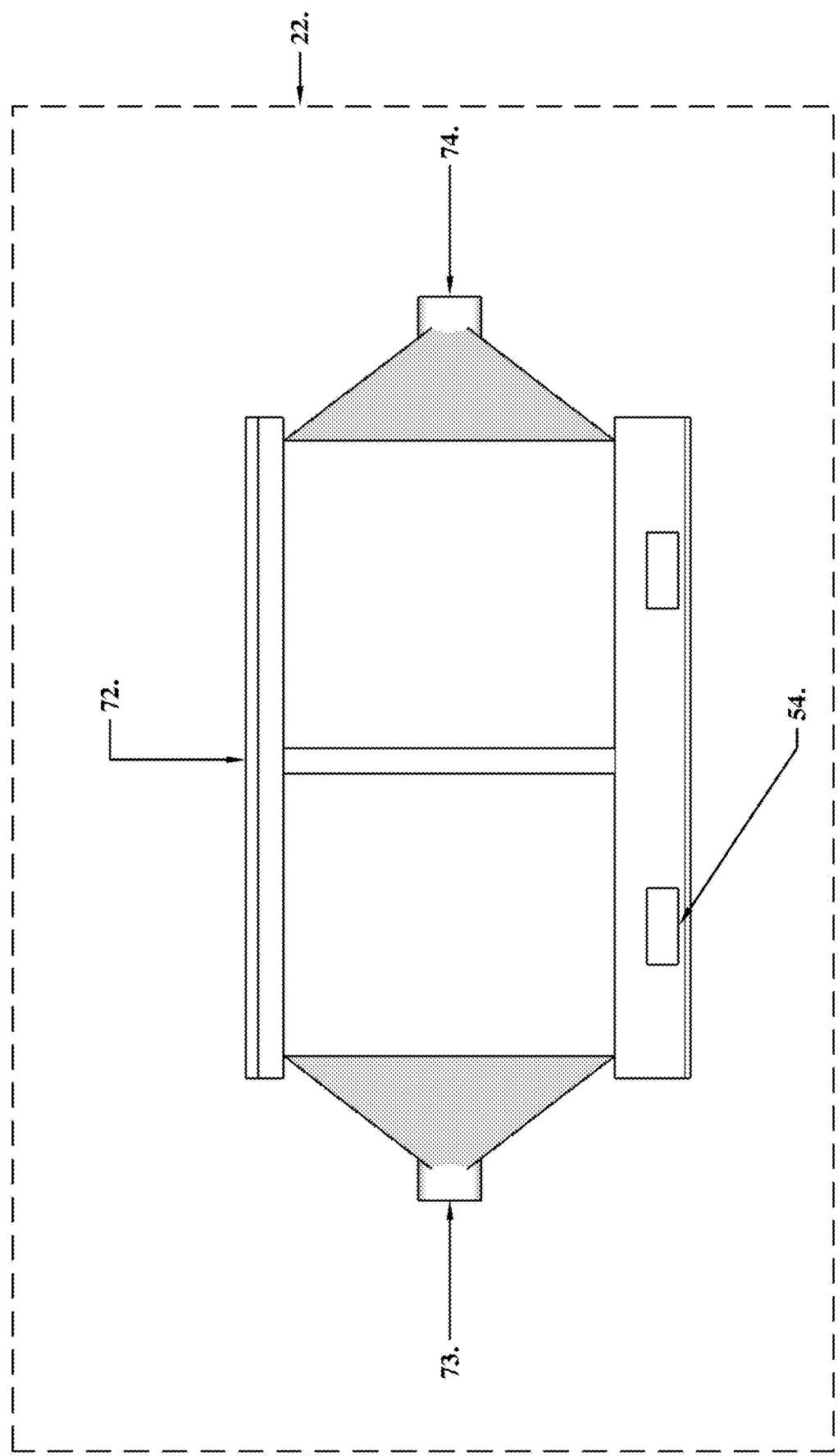

The vast majority of PFAS is removed from the treatment gas in the Vapor Conversion Tank (14). Amphiphilic PFAS compounds almost always have monomers that escape primary treatment mainly due to the weak Van Der Waals bonds. The Vapor Phase Galvanic Separator (22) is designed to remove residual monomer PFAS where a galvanic sequence (galvanic or impressed currents) of granulated metal that offer high surface area, high energy interfaces of varying charges for amphiphilic self-assembly. Voltage drops across the galvanic cell indicate active self-assembly and provide an indication of PFAS mass within the filter media. The galvanic filter media can be recharged by placing the filter assembly in the Polarity Conversion Unit (1). FIGS. 23 through 27 present perspective, cross sectional and map views of the assembly and various elements of the assembly. FIG. 23 presents Vapor Phase Galvanic Separator Perspective View. The Vapor Phase Galvanic Separator (22) is the same size as a Soil Slip (50); it has a Vapor Phase Galvanic Separator Lid (72) that provides a sealed environment inside the vessel. The Vapor Phase Galvanic Separator Intake (73) and Outlet (74) are designed to expand the cross-sectional area of flow before and after the Vapor Phase Galvanic Separator Rechargeable Filter Media (77) as seen in FIG. 24. The entire assembly can be moved with a forklift with the Forklift Pockets (54).

Figure 25:
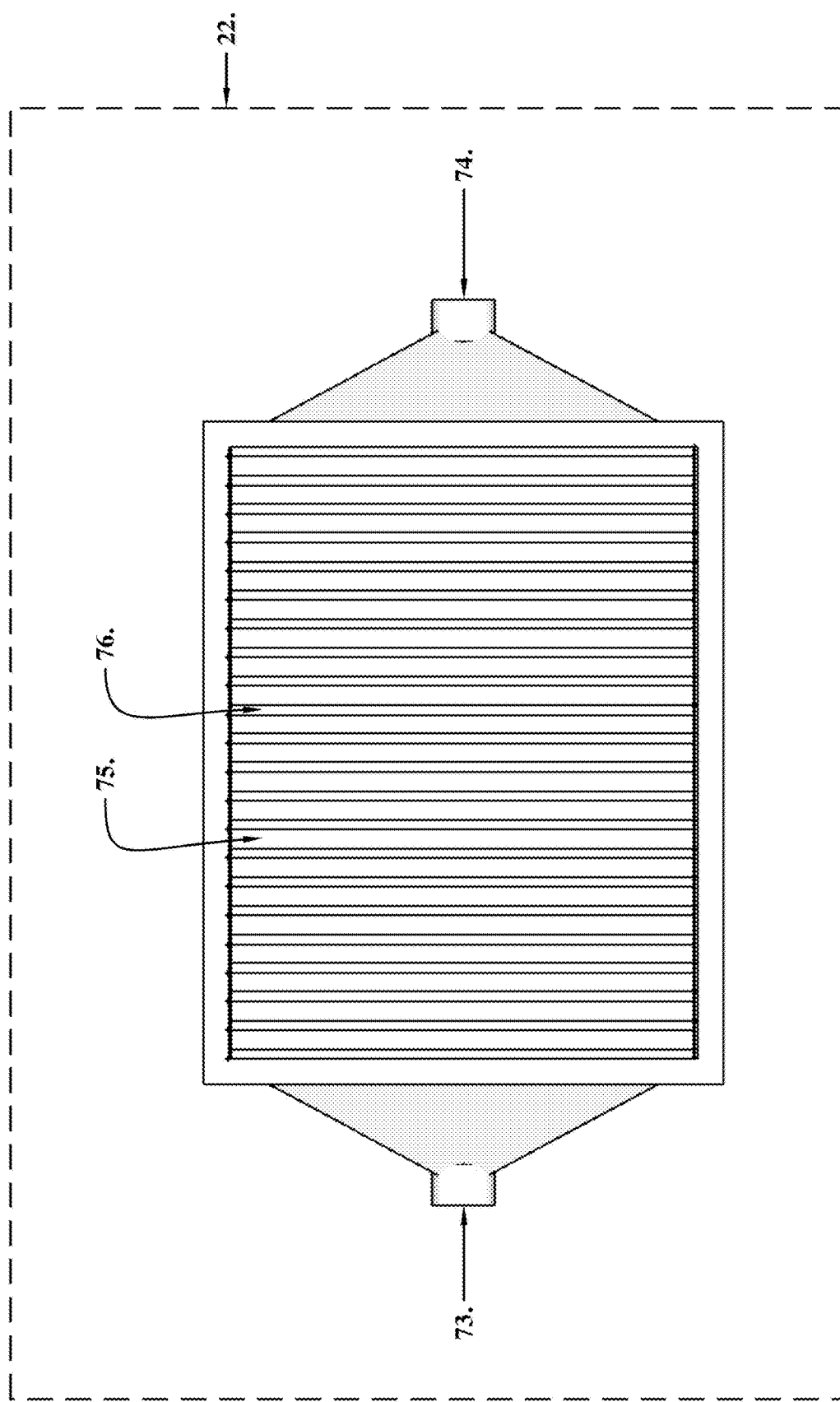
Figure 26:
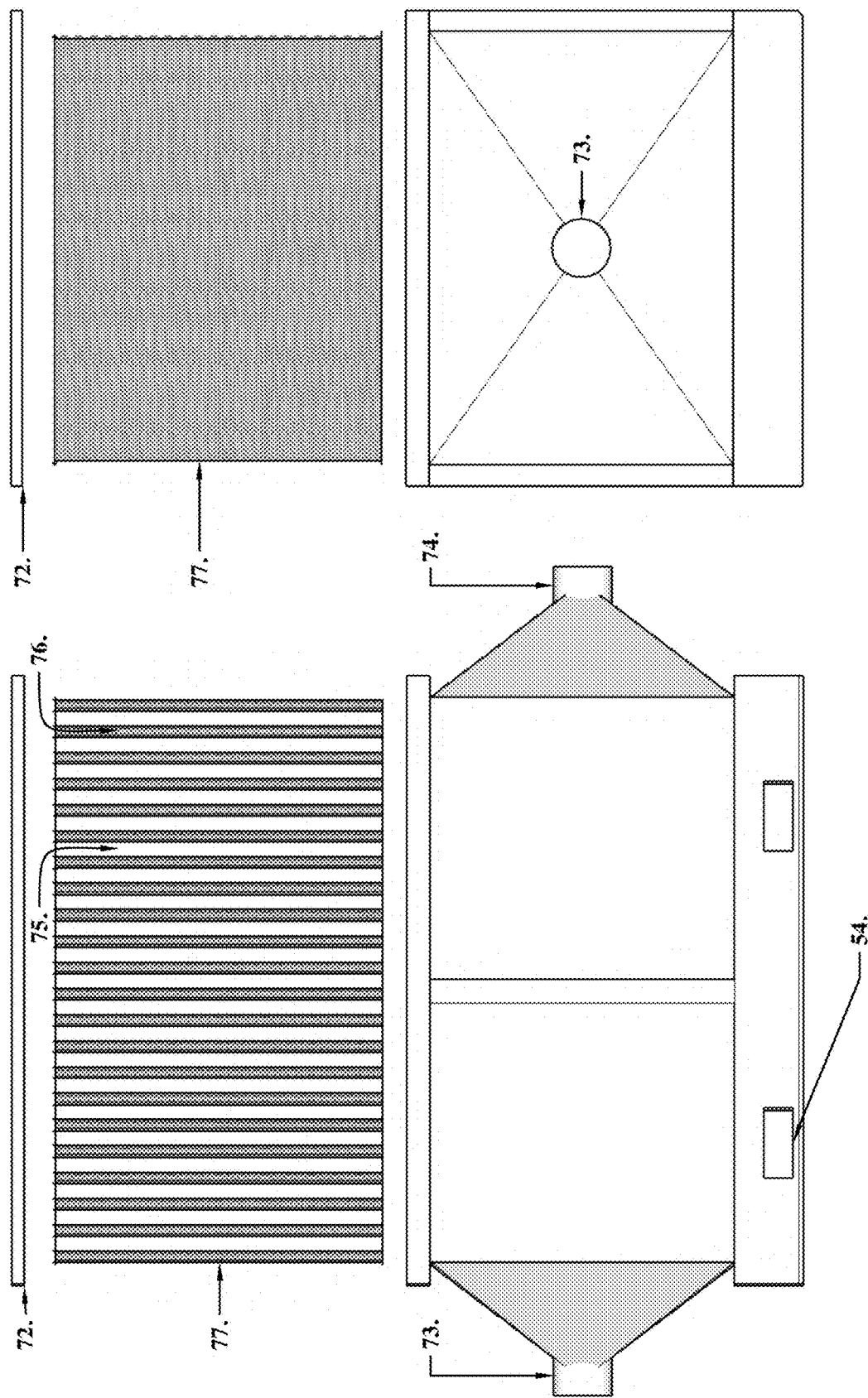
Figure 27:
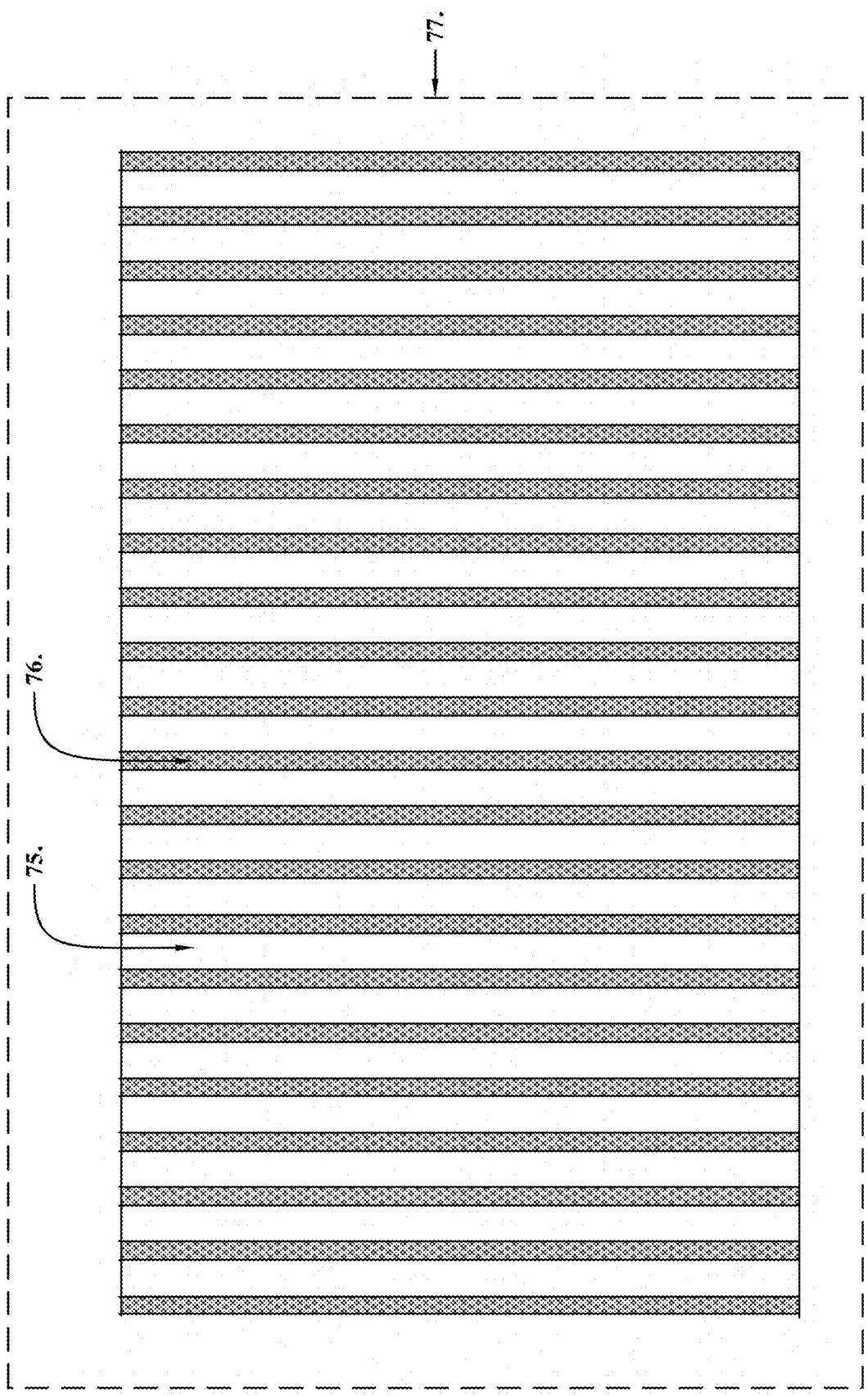

FIG. 25 presents Vapor Phase Galvanic Separator Housing Map View without Lid. FIG. 25 shows the Vapor Phase Galvanic Separator Granular Metal Slot (75) and Granular Desiccant Bridge Slot (76). FIG. 26 also shows internal element through cross sections. Granular metal is used to provide high surface area and to allow easy adjustment in metal species or replenishment of the granular metal. Vertical granular metal beds are placed across the direction of treatment gas flow. Reducing the mass of the granulated anodic metal slots relative to the granular cathodic metal increase voltage across the galvanic cell. Adjustable granular metal mass allows adjustment in voltage across the galvanic cell. The desiccant media is also granular and acts as a bridge between the various granular metal vertical beds. When voltage readings indicate the Rechargeable Filter Media (77) is full, the media is removed from the Vapor Phase Galvanic Separator and placed in a Soil Slip (50)/Soil Slip Base Framework (44) for recharging in the Polarity Conversion Unit (1).

Figure 28:
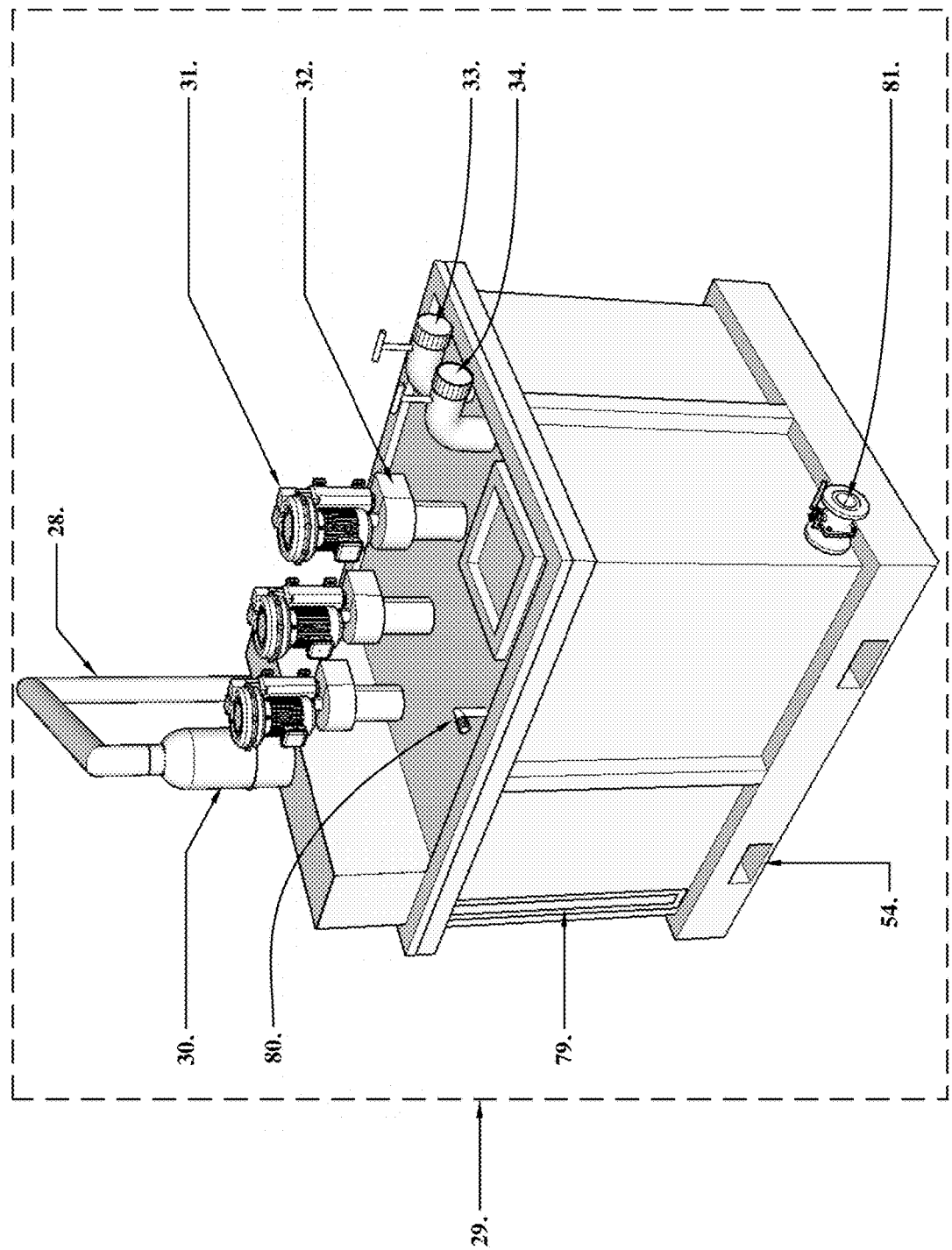
Figure 29:
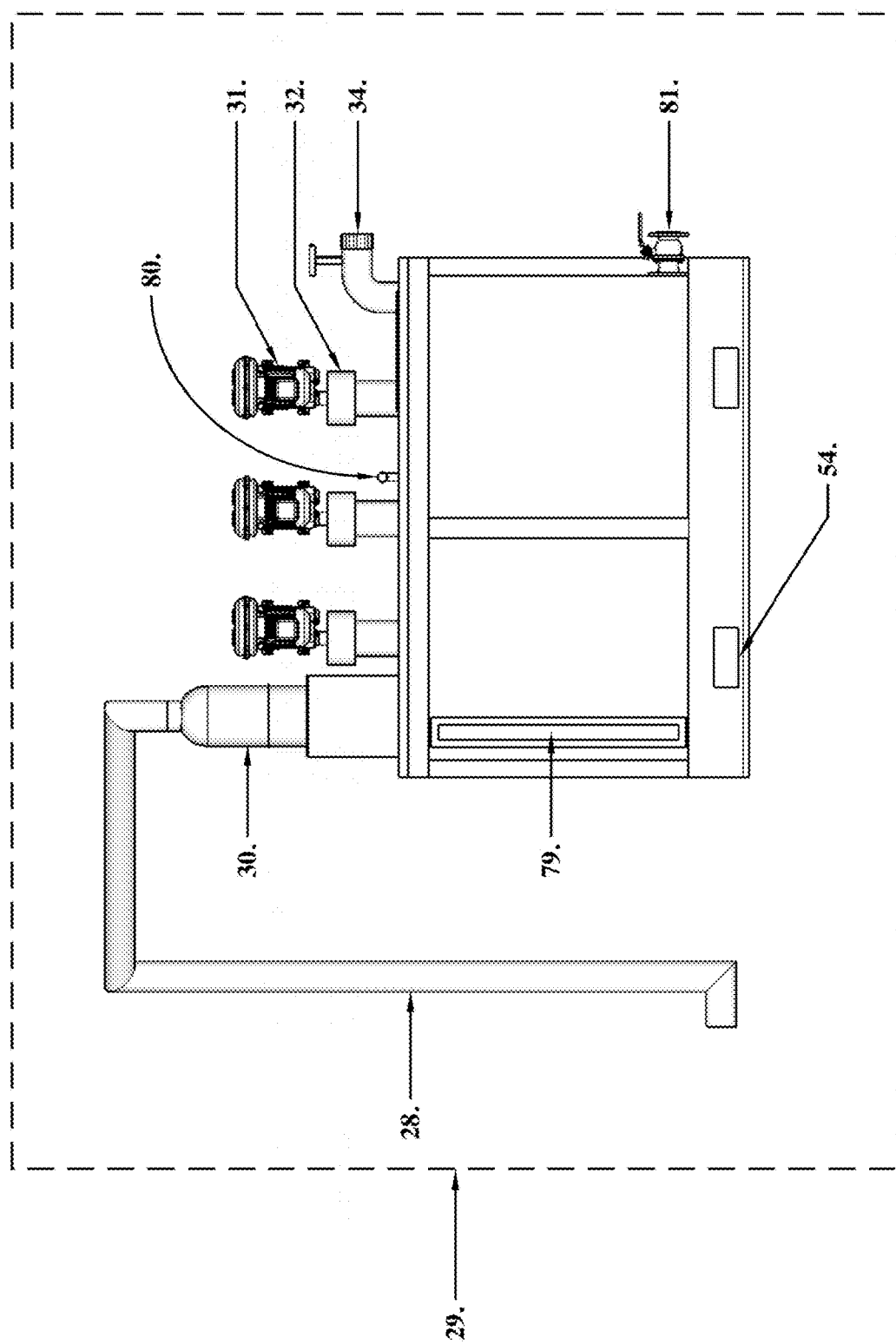
Figure 30:
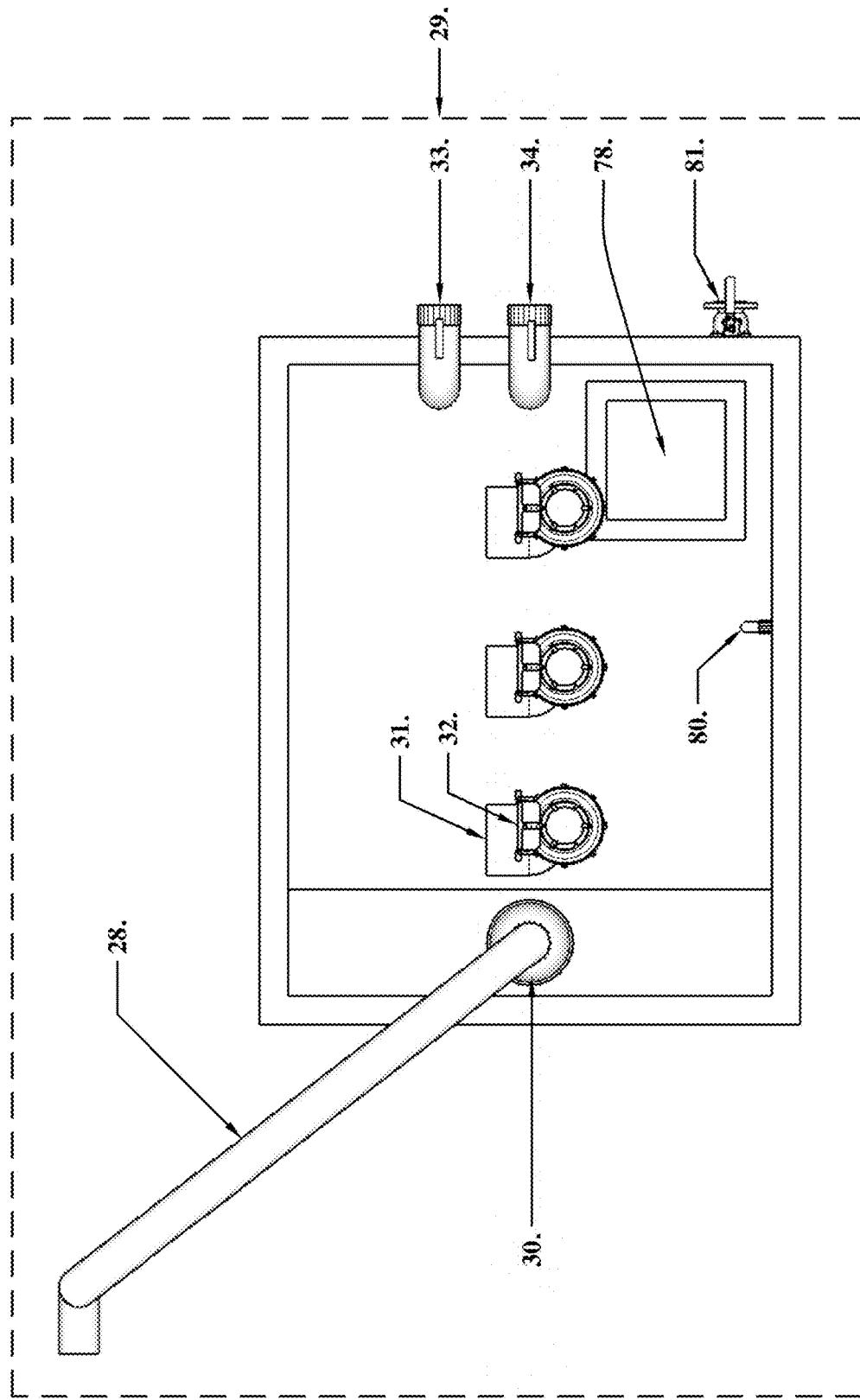

FIG. 28 presents Brine Pot Evaporator Assembly Perspective View; FIGS. 29 and 30 present cross section and map views. The purpose of the Brine Pot Evaporator (29) is to dry PFAS fluids and foams into a dry powder in isolated batch and to provide system vacuum and conveyance of vapor/foams/fluids from the Fluids Line Assembly. The Brine Pot Evaporator (29) connects the Fluids Line Assembly to the Vapor Line Assembly through the Brine Pot Evaporator Connection Valve (47), which connects to the Vapor Extraction Manifold (7) as shown in FIGS. 2, 3, and 4. System vacuum is used to contain, treat and convey PFAS saturated foams and fluids while providing a means for vapor phase treatment. The Brine Pot Vapor Extraction Line (28) draws PFAS vapors from the Brine Pot Evaporator (29). Vapors exit the Brine Pot Evaporator (29) through the Brine Pot Demister Tower (30), which is designed to remove any mists from the vapor stream before entry into the vapor line assembly. The Brine Pot Evaporator (29) is equipped with a Blower (31) and Heater (32) that provide hot air into the vessel to facilitate drying of PFAS fluids concentrate.

Figure 31:
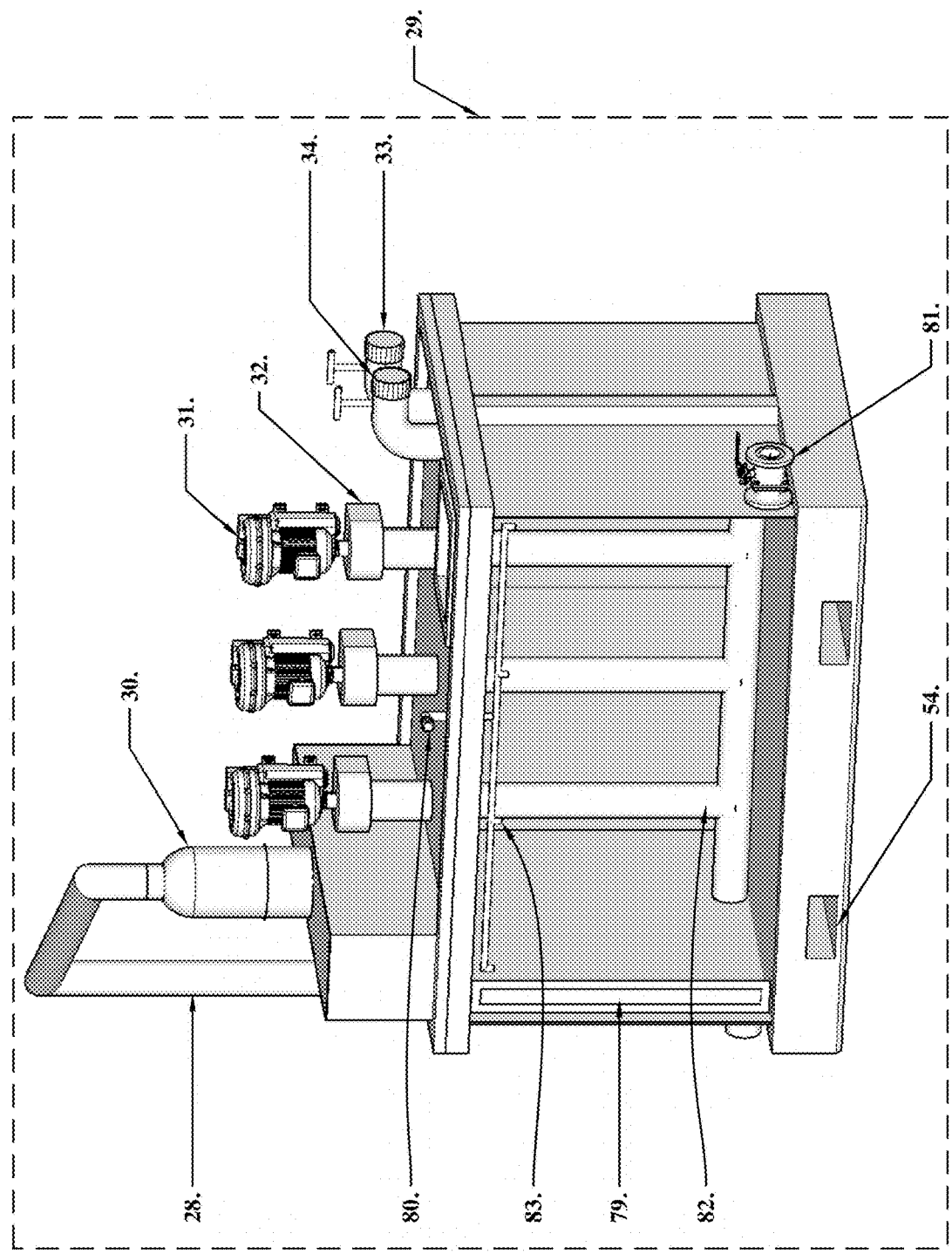
Figure 32:
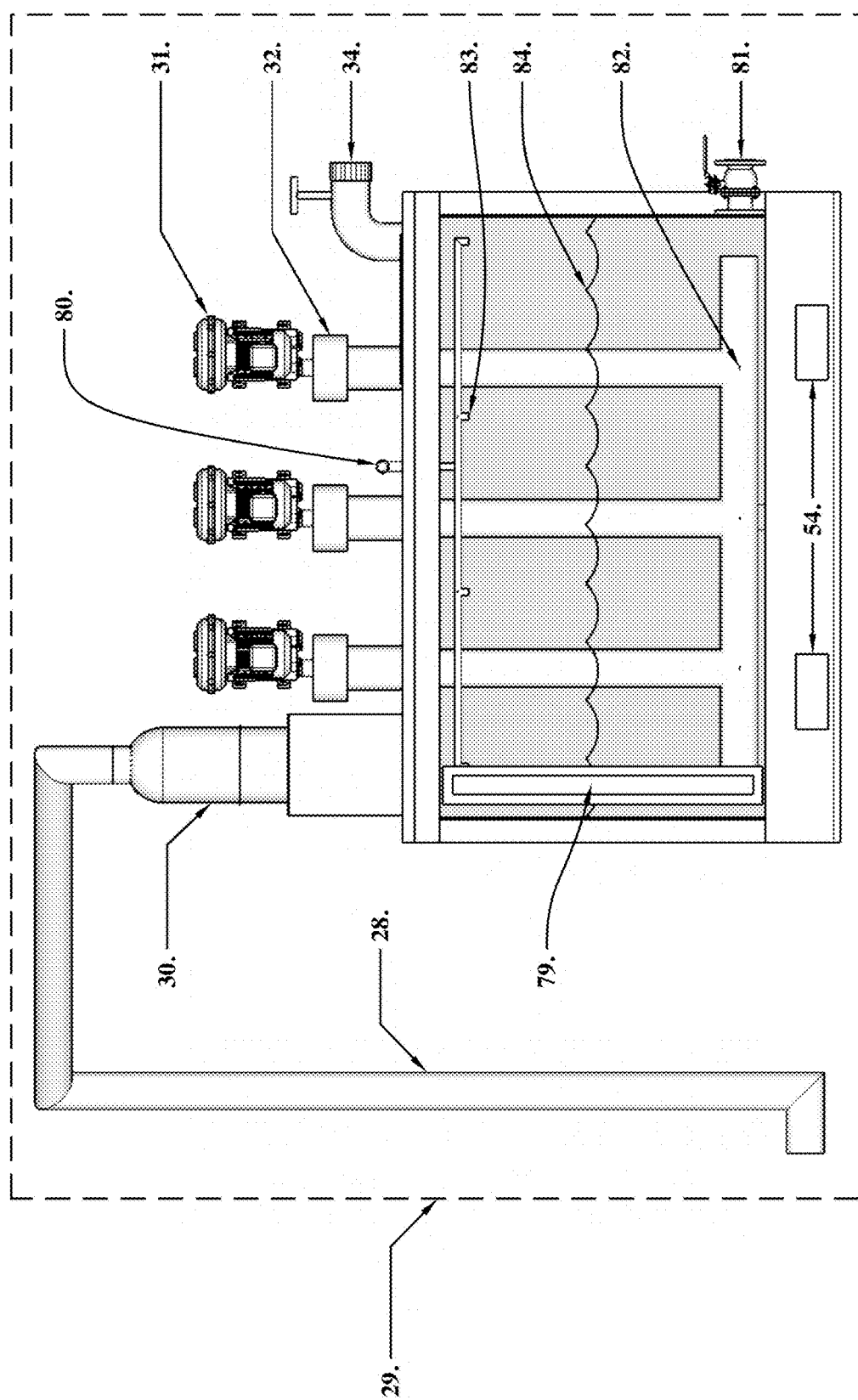

FIG. 31 presents Brine Pot Evaporator Interior Elements Perspective View. FIG. 32 presents Brine Pot Evaporator Interior Elements Cross Section. FIGS. 31 and 32 show the Brine Pot Purge Lines (82) where heated outside air is drawn through the fluids by the applied vacuum above the Brine Pot Evaporator Fluid Level (84). The Vapor Foam/Fluids Extraction Line/Valve (33) and the Amphiphilic Decontamination Wand Flexible Extraction Line/Valve (34) are closed during Brine drying operations in the Brine Pot Evaporator (29).

The level of brine and foam inside the Brine Pot Evaporator (29) is monitored through the Brine Pot Fluid Level Window (79). In the event foam does not quickly decay inside the Brine Pot Evaporator (29), the Brine Pot Water Spray Foam Knock Down Assembly (80) will direct a blast of high-pressure water spray using the Brine Pot Water Spray Foam Knock Down Spray Nozzle (83) to knock down foam levels in the tank. FIGS. 31 and 32 also present the Brine Pot Drain Valve (81) and the Fork Lift Pockets (54) to drain and move the Brine Pot Evaporator (29).

Figure 33:
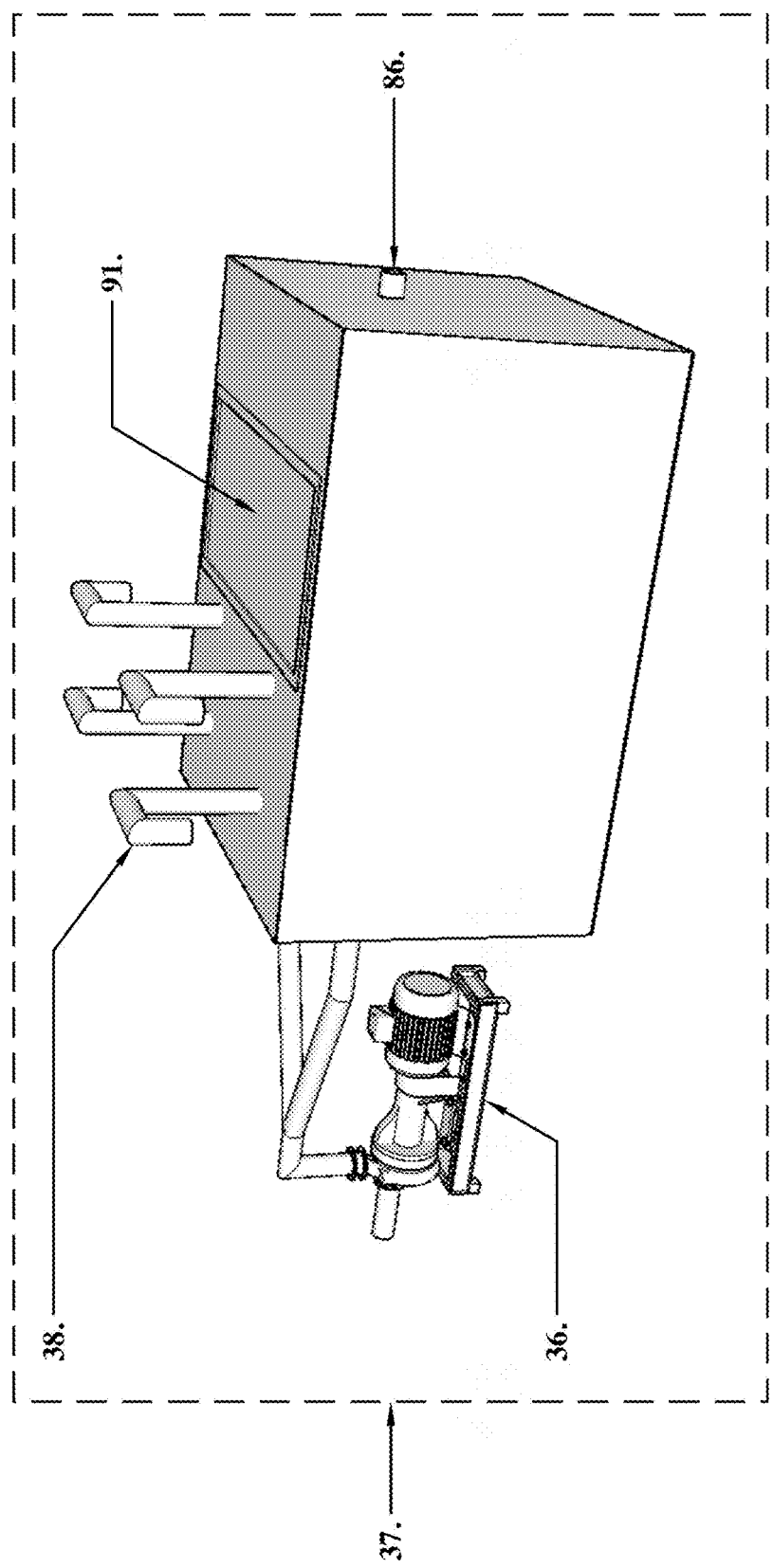
Figure 34:
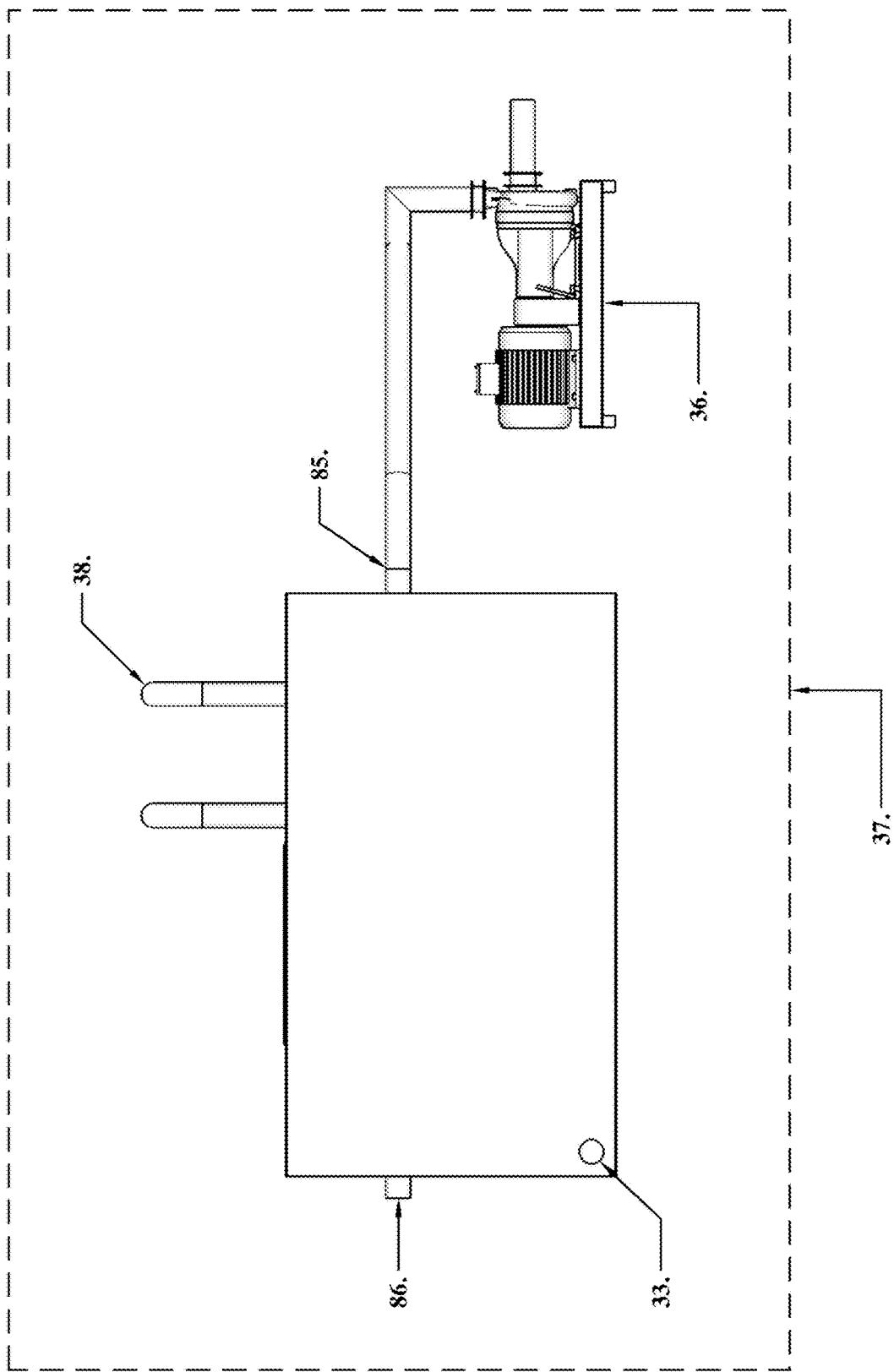
Figure 35:
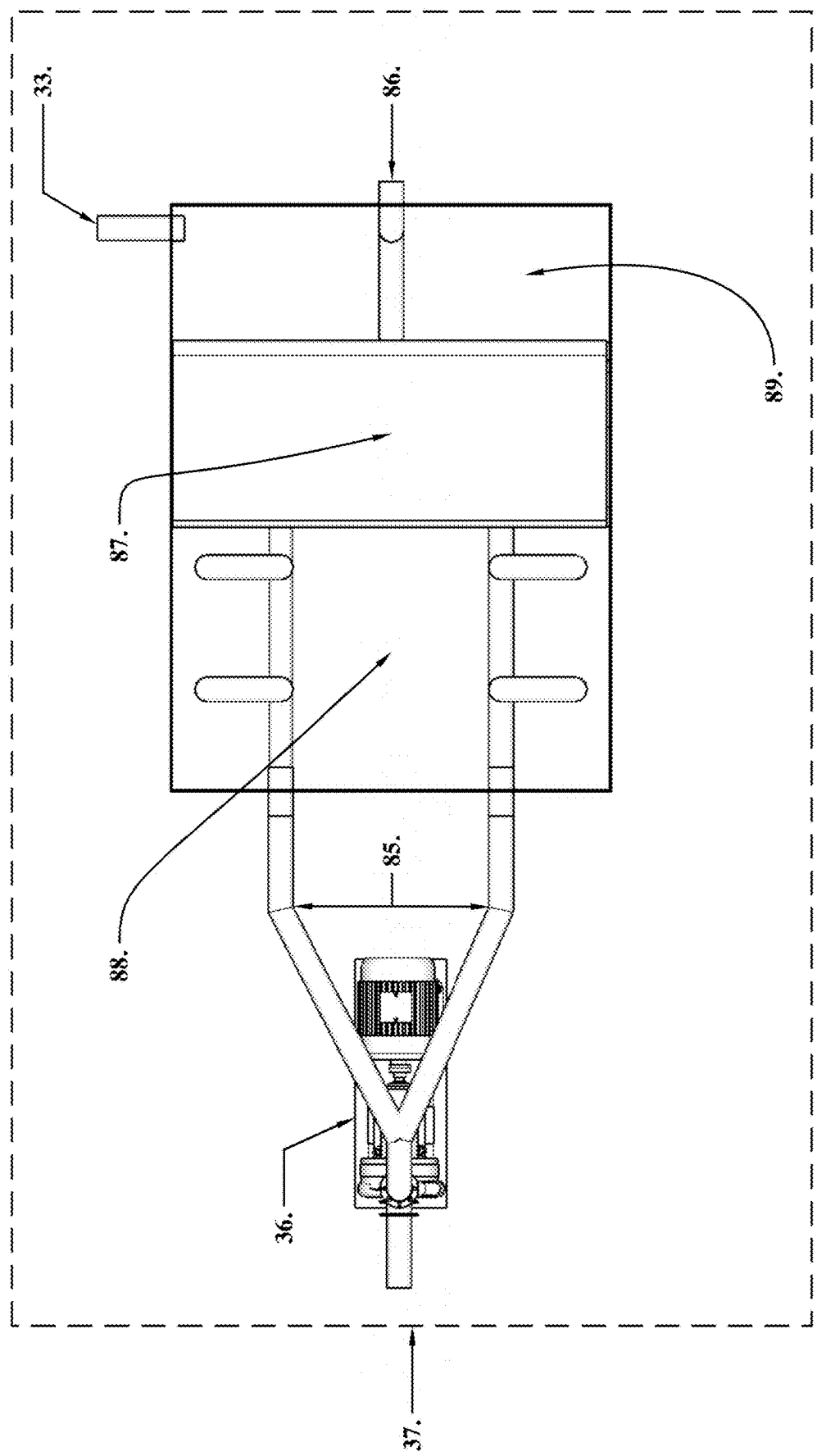

The Fluids Treatment Assembly line consists of two primary treatments in series where the initial treatment removes the majority of PFAS contaminants followed by a polishing treatment removing lower concentration monomeric PFAS as seen in FIGS. 2 and 3. FIGS. 33, 34, and 35 present the Surface Excess Concentrator Assembly in Perspective, Cross Section and Map View respectively. The Surface Excess Concentrator (37) concentrates short and long chain PFAS and associated mixtures as foam and surface excess layers. The first Fluids Pump (in series) (36) delivers PFAS contaminated fluids to the Surface Excess Concentrator (37) through the Surface Excess Concentrator Inlet (85). During active treatment of fluids, the Vapor/Foam/Fluids Extraction Line/Valve (33) is opened to provide system vacuum and vapor/foam/fluids conveyance from the Surface Excess Concentrator Assembly (37) to the Brine Pot Evaporator (29). Treated Fluids exit through the Surface Excess Concentrator Outlet (86).

Figure 36:
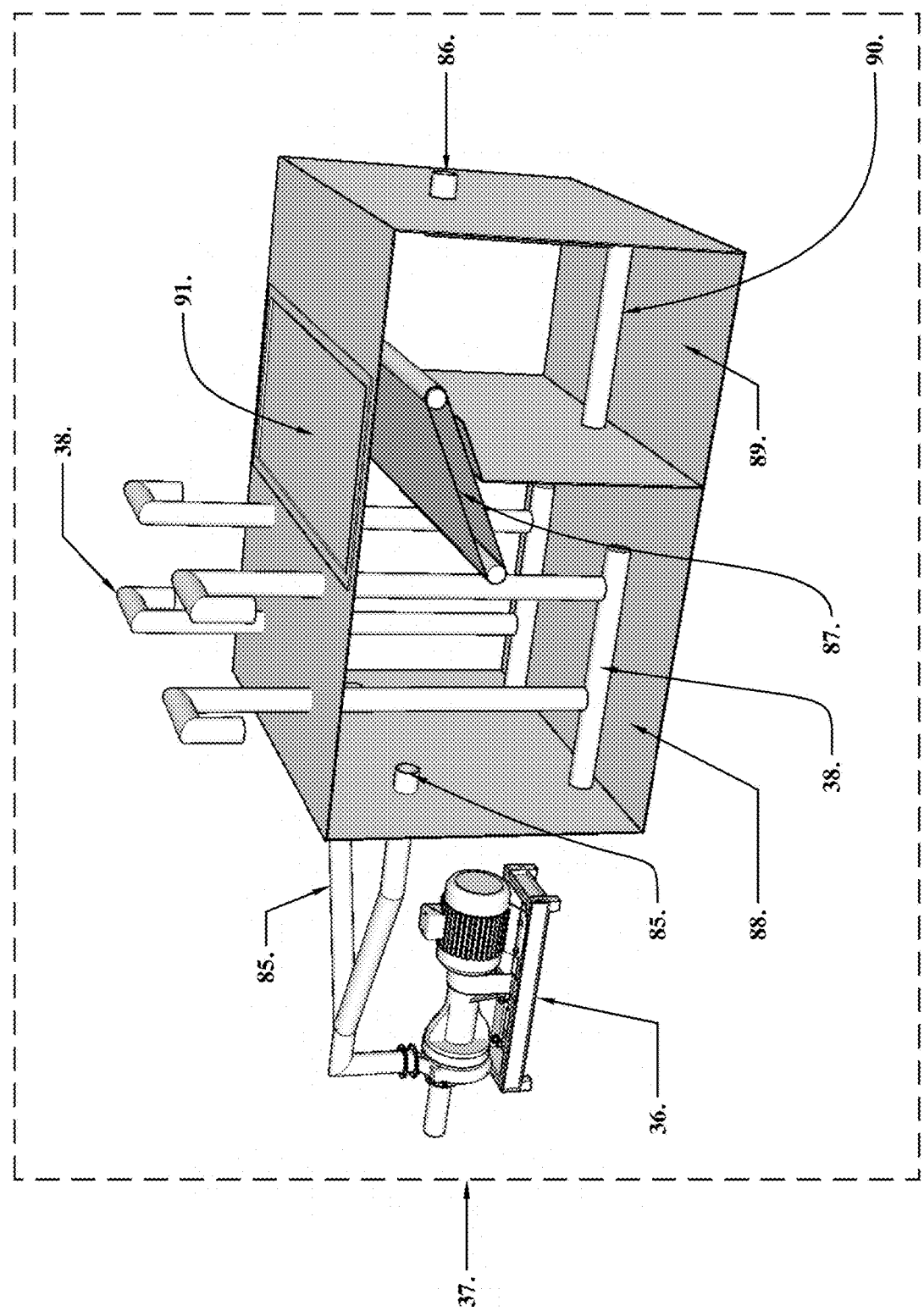
Figure 37:
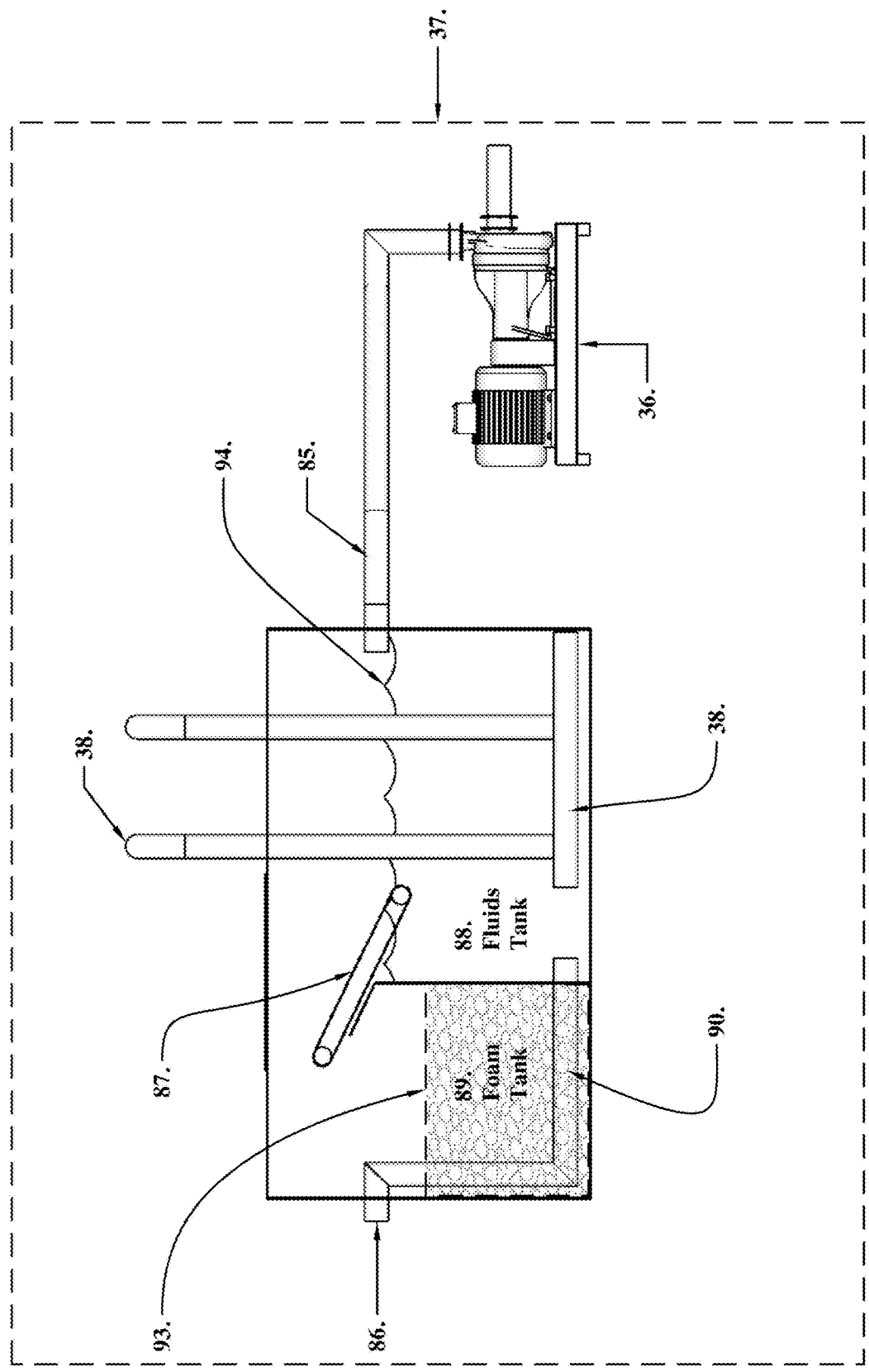

The raw PFAS contaminated fluids enter into the Surface Excess Concentrator Fluids Process Tank (88) where Surface Excess Concentrator Purge Lines (38) are vented to outside air. The vacuum applied the Surface Excess Concentrator Foam Tank (89) draws outside air through the Purge Lines (38), which are slotted at the bottom of the Process Tank (88). The Outside air creates bubbles in the raw fluids where foam is created at the surface, which is the same elevation as the inlet (85) and outlet (86). Long chain PFAS concentrate in the foam allows shorter chain PFAS to accumulate at the foam/fluid interface and PFAS micelles just below the fluid/foam interface. The fluid surface offers a high energy interface for self-assembly. PFAS mixtures create the foam framework lifting long chain compounds from the fluid surface. The Surface Excess Concentrator Foam Belt (87) removes the entire concentrated surface excess complex from the Process Tank (88) and delivers it to the Foam Tank (89) where the foam/fluid mixture is drawn into the Extraction Line (33) and subsequently delivered to the Brine Pot Evaporator (29). Treated fluids exit the Fluids Process Tank (88) through the Surface Excess Concentrator Fluids Exit Piping (bottom intake of Fluids Process Tank) (90). The Fluids Exit Piping Bottom Intake (92) is located the maximum distance below the surface excess formation occurring during treatment as seen in FIG. 37 Surface Excess Concentrator Interior Elements Cross Section; FIG. 36 offers a Perspective View.

The Foam Belt (87) uses a material that is designed to match or closely match the polar and dispersive energies associated with PFAS compounds and associated mixtures. Perfect wetting and adhesion occur when the fluids energy and solid surface energy polar and dispersive ratios match or closely match. The speed of the Foam Belt (87) rotation also causes the entire surface excess complex to be conveyed to the Foam Tank (89). The Surface Excess Concentrator Access Hatch (91) provides a means to change the Foam Belt (87) and to perform other maintenance tasks.

Figure 38:
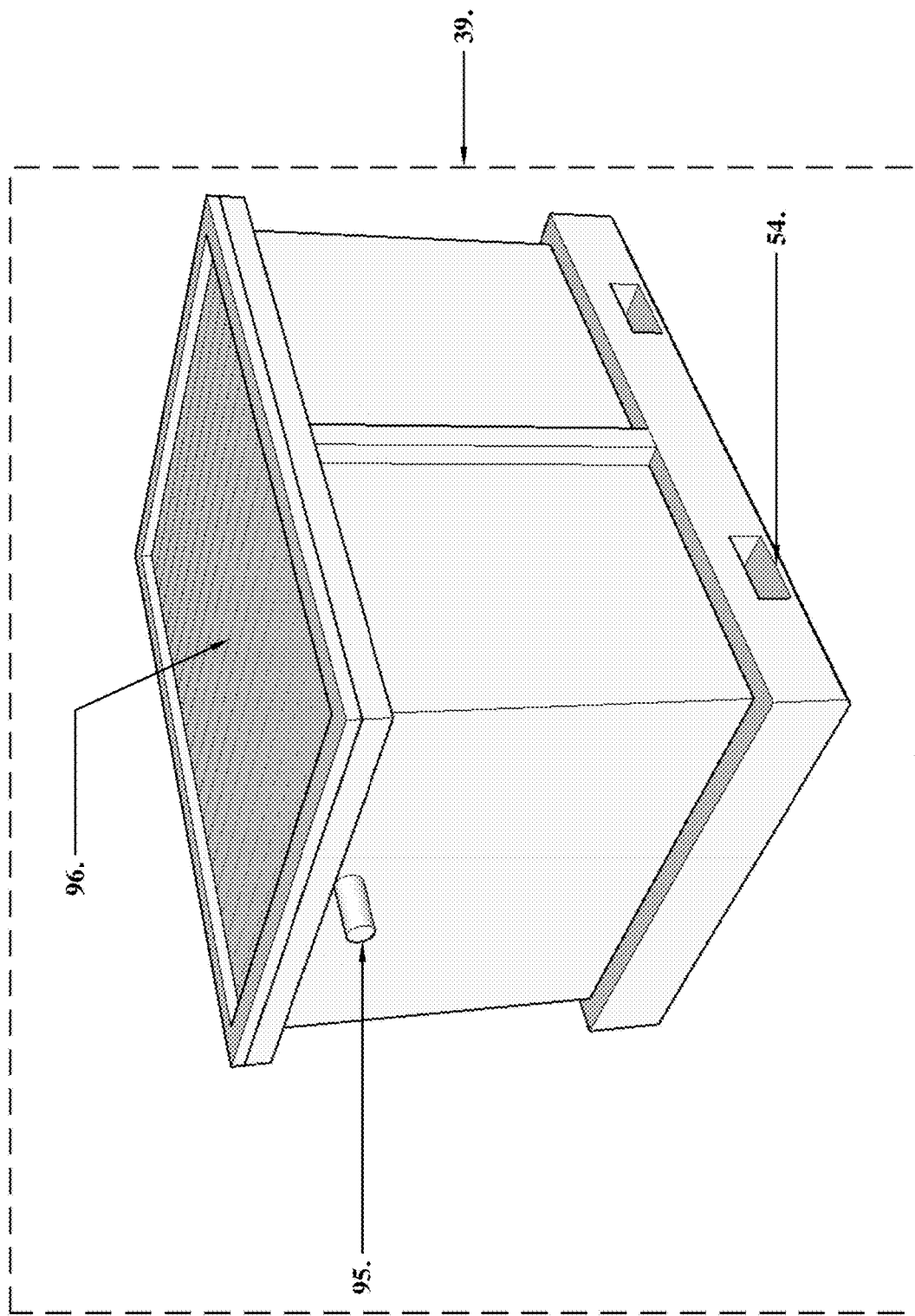
Figure 40:
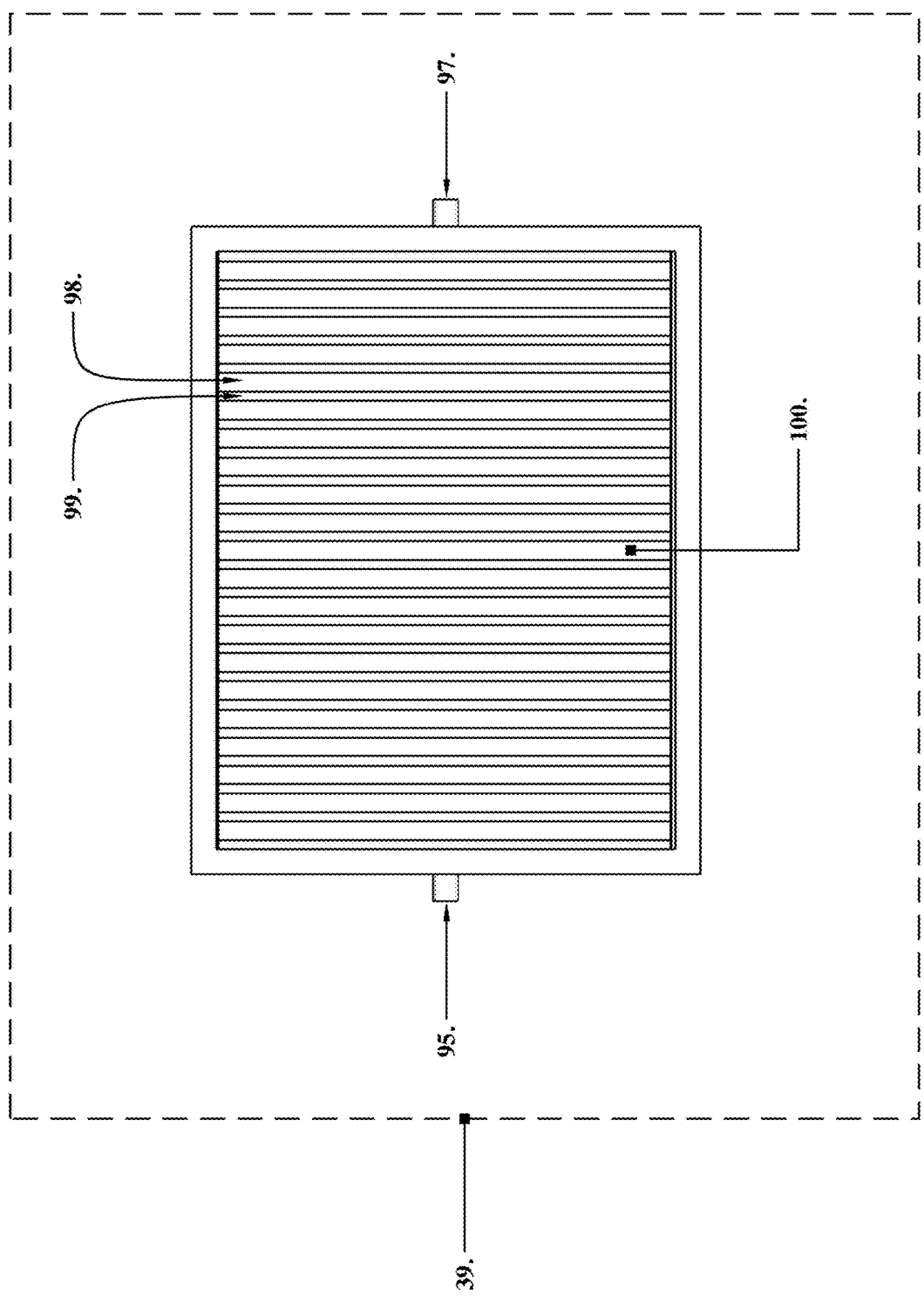
Figure 41:
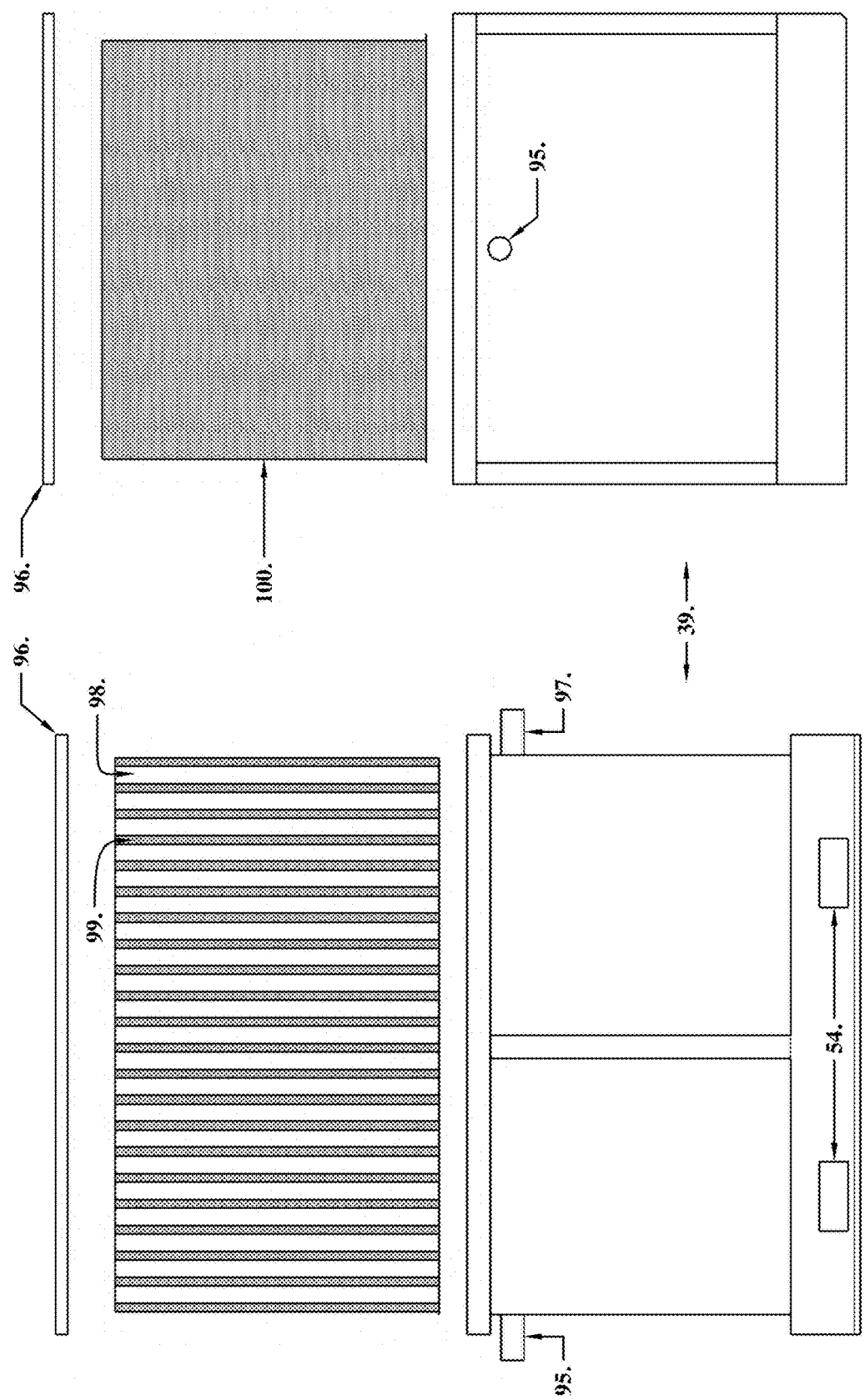
Figure 42:
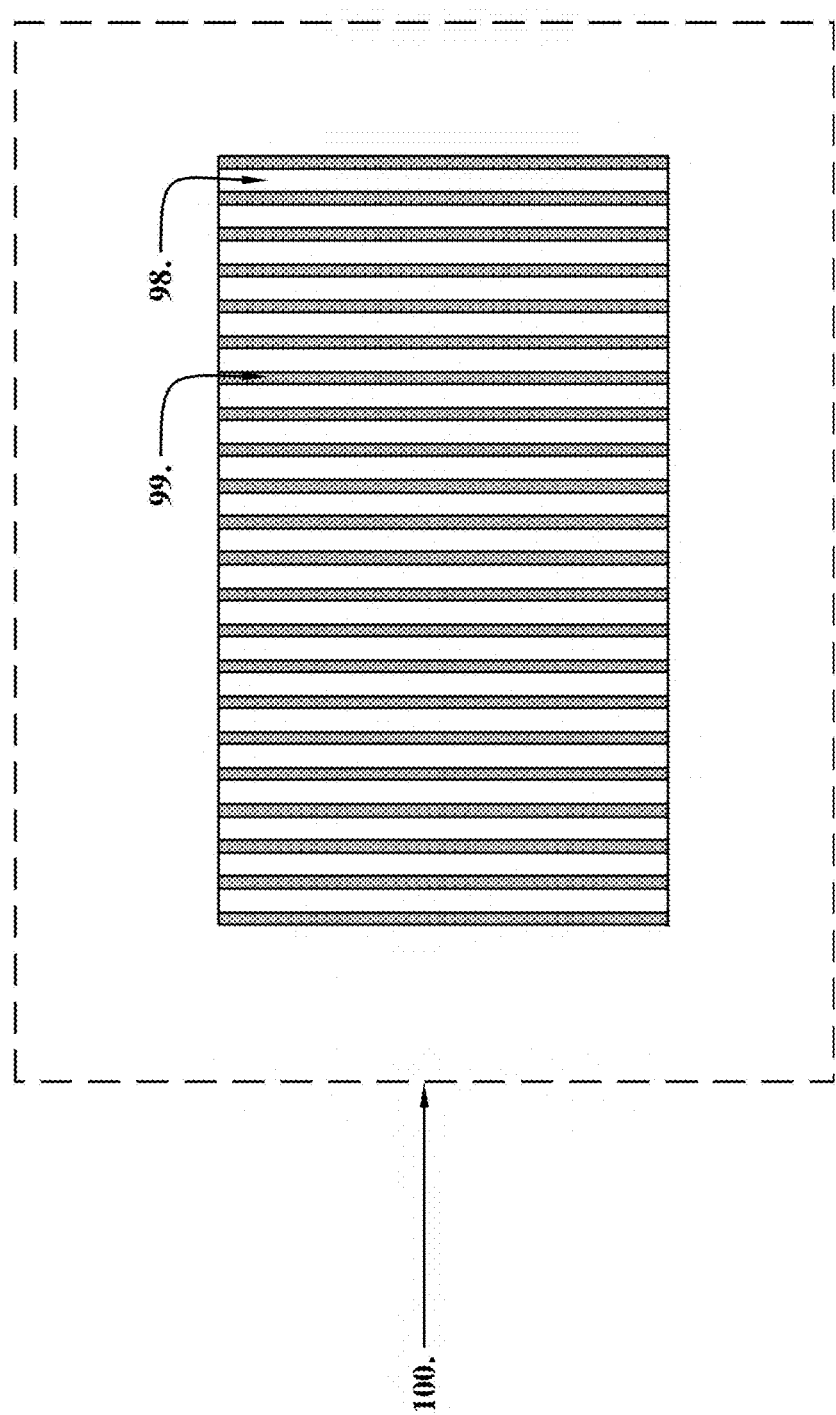

The second Fluids Treatment apparatus is intended to treat residual monomeric PFAS that passed through the Surface Excess Concentrator (37). The Aqueous Phase Galvanic Separator (39) is deployed, two in series, as seen in FIGS. 2 and 3. FIGS. 38, 39, and 40 present the Aqueous Phase Galvanic Separator (39) in Perspective, Cross Section and Map Views respectively. FIG. 41 presents Aqueous Phase Galvanic Separator Assemblies Cross Section and FIG. 42 presents Aqueous Phase Galvanic Separator Filter Media Cross Section. The Aqueous Phase Galvanic Separator is the same size as a Soil Slip (50) where fluids enter into the Aqueous Phase Galvanic Separator Inlet (95) and exit the Aqueous Phase Galvanic Separator Outlet (97). The Aqueous Phase Galvanic Separator Lid (96) secures the vessel providing a water tight seal and access to the Aqueous Phase Galvanic Separator Rechargeable Filter Media (100). The Galvanic Separator Rechargeable Filter Media (100) consists of alternating Aqueous Phase Galvanic Separator Granular Metal Slot (98) and Aqueous Phase Galvanic Separator Granular Molecular Sieve Bridge Slot (99). The slot design provides a flexible method to create a galvanic metal series of high surface area for amphiphilic PFAS self-assembly. Doubling the cathodic metal mass (more slots filled with cathodic granular metal) increases voltage across the galvanic cell. The Second Fluids Pump (in series) (40) as shown in FIGS. 2 and 3 provide vacuum pressure on the fluids treatment line to overcome the applied vapor vacuum in the Surface Excess Concentrator (37). Fork Pockets (54) allow easy transport of the unit.

Figure 43:
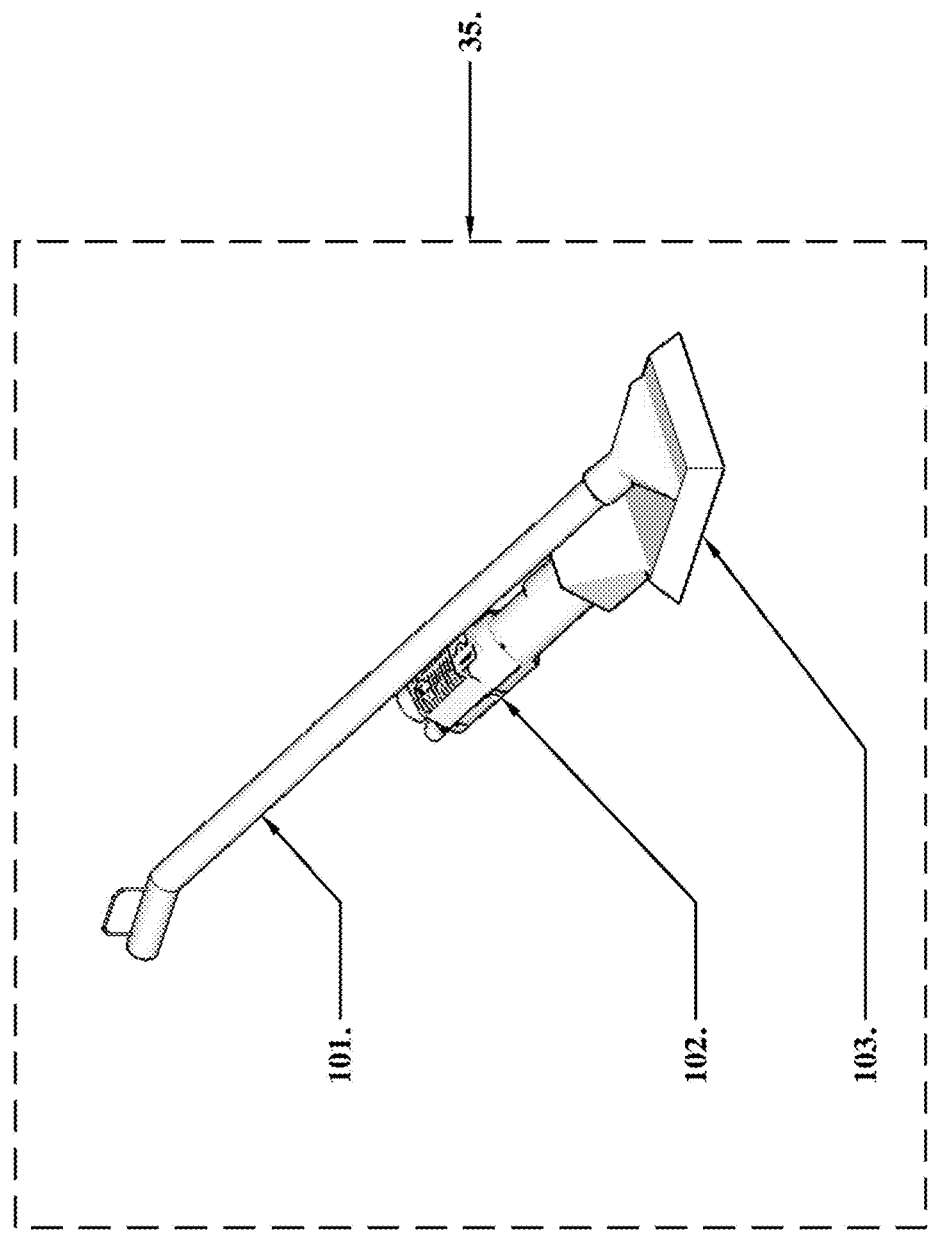

FIG. 43 presents Amphiphilic Decontamination Wand Perspective View. The Amphiphilic Decontamination Wand (35) is used to decontaminate hard surfaces such as concrete airport taxiways or dump truck beds. The Wand (35) can be made to any size ranging from a walk behind unit to a unit mounted on a vehicle. The Amphiphilic Decontamination Wand (35) assembly is connected to the Brine Pot Evaporator (29) through the Amphiphilic Decontamination Wand Flexible Extraction Line/Valve (34) where system vacuum provides vapor conveyance for emissions treatment as shown in FIGS. 2, 3, 28, 30, and 31. The Wand (35) is equipped with a Amphiphilic Wand Hard Pipe Vapor Extraction Handle (101) to facilitate easy movement of the device. The Amphiphilic Wand Heater/Blower Assembly (102) provides modulated heat and treatment gas velocity to a given treatment area. Hot air is directed to the area targeted for treatment within the Amphiphilic Wand Shroud (103) where treatment gases are promptly removed by the applied system vacuum. Treatment gas temperature and velocity are used to thermally disorganize surface polarity to release amphiphilic PFAS and associated mixtures and films. Treatment gas vapors are drawn into the Brine Pot Evaporator (29) and subsequently through the vapor treatment line assemble.

FIG. 44 presents Implement and Object Decontamination Base Framework in Perspective (45). Objects are simply placed on the Soil Slip Base Framework (44), transported with a forklift and placed in the Polarity Conversion Unit (1) for treatment. Treatment gas temperature and velocity are used to convert the surface polarity of the objects releasing amphiphilic PFAS mixtures and films.

We claim:

1. An apparatus for recovering contaminants that are Per- and Polyfluoroalkyl Substances (PFAS), comprising:
    a vapor conversion assembly, wherein the vapor conversion assembly includes
        a cooling chase that receives a heated PFAS-containing vapor from one or more sources of PFAS-containing vapor;
        a misting chamber that receives the PFAS-containing vapor from the cooling chase;
        a cooling fluid line that injects droplets of a cooling fluid into the cooling chase and the misting chamber to cool the PFAS-containing vapor to produce a cooled PFAS-containing vapor, where the cooling fluid has a temperature that is cooler than a temperature of the PFAS-containing vapor and warmer than an ambient temperature;
        a vapor conversion tank that receives the cooled PFAS-containing vapor, and that includes a supply of the cooling fluid for injecting into the cooling chase, where the vapor conversion tank cools and aerates the cooling fluid using one or more internal purge lines delivering outside air to the cooling fluid, maintaining a temperature of the cooling fluid that is above the ambient temperature;
        a demister tower, including a demister screen, coupled to the vapor conversion tank so that droplets of fluid are removed from a mixture of the cooled PFAS-containing vapor and air from the one or more internal purge lines as the mixture passes through the demister tower;
        a vapor conversion assembly filter within a filter housing that removes PFAS pre-micellar aggregates and liquid crystals from the cooling fluid as it is cooled within the vapor conversion tank; and
        a brine pot evaporator assembly that receives the PFAS pre-micellar aggregates and liquid crystals removed by the vapor conversion assembly filter and combines the received PFAS pre-micellar aggregates and liquid crystals with additional PFAS-containing fluids and foams to create a resulting mixture, and treats the resulting mixture with heated gas flow in combination with an applied vacuum in a batch process that yields a dried PFAS-containing powder.

2. The apparatus of claim 1, further comprising a permeable Gibbs energy curtain disposed within the vapor conversion assembly so that the cooled PFAS-containing vapor passes through the permeable Gibbs energy curtain before entering the vapor conversion tank, wherein the permeable Gibbs energy curtain is configured to provide an enhanced surface area and includes a material having a surface energy profile selected to match a known contaminant of the heated PFAS-containing vapor, so as to promote condensation of the known contaminant onto and/or into the Gibbs energy curtain.

3. The apparatus of claim 1, further comprising one or more vapor phase galvanic separators, each of the vapor phase galvanic separators including a vapor inlet, a vapor outlet, and an internal volume; wherein
    the vapor inlet receives vapor received from the demister tower of the vapor conversion assembly;
    the internal volume includes a plurality of panels that include granulated metals and desiccant media, where the granulated metals of alternating panels are selected so as to create a Galvanic series; and
    the vapor outlet draws the received vapor through the internal volume as a treated vapor;
    such that the vapor received from the demister tower passes through the plurality of panels, thereby promoting amphiphilic self-assembly of PFAS monolayers from residual PFAS present in the received vapor.

4. The apparatus of claim 3, further comprising one or more vessels containing activated carbon, wherein the vessels are configured to receive the treated vapor from the vapor outlet of the vapor phase galvanic separators, and the activated carbon absorbs residual PFAS in the treated vapor before the treated vapor stream is vented.

5. The apparatus of claim 1, wherein the one or more sources of heated PFAS-containing vapor for the vapor conversion assembly includes one or both of the brine pot evaporator and a polarity conversion unit;
    wherein the polarity conversion unit includes a sealable media treatment vessel that includes two pairs of opposed side walls, an upper lid including a plurality of air injection heads, a lower extraction pad, and a shaping screen assembly; wherein
    the plurality of air injection heads are configured to deliver a heated treatment air to the sealable treatment vessel;
    the shaping screen assembly includes a plurality of planar and parallel shaping screens;
    the extraction pad includes a plurality of vapor extraction lines each extending across a width of the extraction pad, each vapor extraction line being capable of drawing the heated treatment air from the sealable media treatment vessel, and each vapor extraction line being capable of being activated individually and in a sequence;
    wherein when the sealable media treatment vessel is loaded with a media to be treated the media is disposed between adjacent shaping screens of the plurality of shaping screens, and the heated treatment air delivered by the plurality of air injection heads is drawn by the vapor extraction lines through the shaping screen assembly within the media, drawing moisture and PFAS contaminants from the media and delivered the PFAS-containing vapor to the vapor conversion assembly.

6. The apparatus of claim 5, wherein the plurality of air injection heads and the plurality of vapor extraction lines can be activated sequentially and in coordination to selectively treat the media disposed in individual lateral sections of the sealable media treatment vessel.

7. The apparatus of claim 5, wherein the media to be treated that is disposed between adjacent shaping screens of the plurality of shaping screens includes a soil, a sludge, or plural panels containing granulated metals from either the one or more vapor phase galvanic separators or the one or more aqueous phase galvanic separators.

8. The apparatus of claim 7, wherein the flow-through treatment vessel is configured to be loaded with the media to be treated from the top.

9. The apparatus of claim 5, wherein the lower extraction pad, the two pairs of opposed side walls and the shaping screen assembly, in combination, define a flow-through treatment vessel for the media.

10. The apparatus of claim 9, wherein after treatment of the media the shaping screen assembly and two pairs of opposed side walls of the flow-through treatment vessel can be removed by lifting them in combination.

11. The apparatus of claim 9, wherein the lower extraction pad is configured so that after the shaping screen assembly and two pairs of opposed side walls are removed, lifting the lower extraction pad permits a treated media to flow through the lower extraction pad as it is lifted.

12. The apparatus of claim 1, further comprising a surface excess concentrator, wherein the surface excess concentrator is configured to receive PFAS-containing aqueous liquids from one or more sources, the surface excess concentrator including:
- a fluids process tank that receives the PFAS-containing aqueous liquids, wherein a vacuum applied to the fluids process tank draws air through the PFAS-containing aqueous liquids and thereby generates one or more surface layers having an increased PFAS content;
- a transporting belt conveyor that moves the one or more generated surface layers from the fluids process tank to a foam tank, which accumulates the transported fluids having an increased PFAS concentration, leaving a treated liquid in the fluids process tank;
- a foam tank outlet that removes the PFAS-containing liquids from the foam tank and transports them to the brine pot evaporator; and
- a fluids process tank outlet that removes the treated liquid from the fluids process tank.

13. The apparatus of claim 12, further comprising one more aqueous galvanic separators, each aqueous galvanic separator including a liquid inlet, a liquid outlet, and an internal liquids volume; wherein
the liquid inlet receives aqueous liquids from the fluids process tank outlet of the surface excess concentrator;
the internal liquids volume includes a plurality of panels that include granulated metals and granular molecular sieves, where the granulated metals of alternating panels are selected so as to create a Galvanic series; and
the liquid outlet draws the received fluids through the internal liquids volume as the treated liquid;
such that the aqueous liquids received by the liquid inlet pass through the plurality of panels, thereby promoting amphiphilic self-assembly of PFAS monolayers from residual PFAS present in the received liquids.

14. A method for recovering contaminants that are Per- and Polyfluoroalkyl Substances (PFAS) from a medium, comprising:
loading the medium into a sealable media treatment vessel of a polarity conversion unit;
wherein the sealable media treatment vessel includes two pairs of opposed side walls, an upper lid including a plurality of air injection heads, a lower extraction pad, and a shaping screen assembly; wherein
the plurality of air injection heads are configured to deliver a heated treatment air to the sealable treatment vessel;
the shaping screen assembly includes a plurality of planar and parallel shaping screens;
the extraction pad includes a plurality of vapor extraction lines each extending across a width of the extraction pad, each vapor extraction line being capable of drawing heated treatment from the sealable media treatment vessel, and each vapor extraction line being capable of being activated individually and in a sequence;
wherein when the sealable media treatment vessel is loaded with a media to be treated the media is disposed between adjacent shaping screens of the plurality of shaping screens, and the heated treatment air delivered by the plurality of air injection heads is drawn by the vapor extraction lines through the shaping screen assembly within the media and removed from the vapor conversion assembly;
treating the media in the sealable media treatment vessel with heated air and transporting the treatment air from the polarity conversion unit to a vapor conversion assembly;
wherein the vapor conversion assembly includes:
a cooling chase that receives the treatment air from the polarity conversion unit;
a misting chamber that receives the treatment air from the cooling chase;
a cooling fluid line that injects droplets of cooling fluid into the cooling chase and the misting chamber to cool the treatment air, where the cooling fluid has a temperature that is cooler than the treatment air and warmer than an ambient temperature;
a vapor conversion tank that receives cooled treatment air from the cooling chase, the vapor conversion tank including a supply of recycled cooling fluid that is cooled and aerated by one or more internal purge lines delivering outside air to the cooling fluid, maintaining a cooling fluid temperature above the ambient temperature;
a demister tower coupled to the vapor conversion tank so that droplets of fluid are removed from a mixture of the purging air from the cooling fluid supply and the treatment air as the mixture passes through the demister tower;
a filter within a filter housing that removes PFAS pre-micellar aggregates and liquid crystals from the cooling fluid as it is cooled within the vapor conversion tank; and
drying the removed PFAS pre-micellar aggregates and liquid crystals using a brine pot evaporator assembly by treating the removed PFAS pre-micellar aggregates and liquid crystals with a heated gas flow in combination with an applied vacuum in a batch process to yield dried PFAS-containing powders.

15. The apparatus of 1, further comprising an amphiphilic decontamination wand configured to decontaminate PFAS-contaminated surfaces and objects using heated treatment gas, and transfer the resulting PFAS-containing vapor to the vapor conversion assembly via the brine pot evaporator.

16. The apparatus of claim 15, wherein the amphiphilic decontamination wand includes a unit sized to be mounted upon a vehicle and configured to be used to decontaminate hard surfaces.

17. The method of claim 14, wherein loading the medium into the sealable media treatment vessel of the polarity conversion unit includes loading the sealable media treatment vessel from the top.

18. The method of claim 14, further comprising passing the cooled treatment air received from the cooling chase through a permeable Gibbs energy curtain as the cooled treatment air enters the vapor conversion tank, wherein the Gibbs energy curtain is configured to provide.

19. The method of claim 18, further comprising removing the extraction pad from a treated media by lifting the extraction pad and permitting the treated media to flow through the lower extraction pad as it is lifted.

20. The method of claim 14, further comprising passing the mixture of purging air from the cooling fluid supply and treatment air from the demister tower through a vapor phase galvanic separator to promote amphiphilic self-assembly of PFAS monolayers from residual PFAS present in the received mixture to yield a treated vapor.

21. The method of claim 20, further comprising passing the treated vapor received from the vapor phase galvanic separator through one or more vessels containing activated carbon to absorb residual PFAS in the treated vapor.

22. The method of claim 14, further comprising unloading a treated media from the sealable media treatment vessel by removing the sealable lid and lifting the shaping screen assembly and two pairs of opposed side walls, in combination, from the treated media contained therein.

23. The method of claim 14, further comprising:
sampling the treatment air from the polarity conversion unit, treating the sampled treatment air with an electric catalytic oxidizer having a heated catalyst, and measuring a temperature increase across the heated catalyst; wherein the measured temperature increase across the heated catalyst provides a measurement of a mass of hydrocarbons present in the sampled treatment air due to oxidative cleavage of hydrocarbon sidechains from PFAS contaminants within the polarity conversion unit; and
comparing the measured mass of hydrocarbons in the sampled treatment air to an increase in perfluorinated PFAS contaminants in the media provides an indirect measurement of a mass of polyfluorinated PFAS contaminants in the media before treatment in the polarity conversion unit.

* * * * *